US012285037B2

(12) United States Patent
Didzbalis et al.

(10) Patent No.: US 12,285,037 B2
(45) Date of Patent: Apr. 29, 2025

(54) FLAVOR COMPOSITION AND EDIBLE COMPOSITIONS CONTAINING SAME

(71) Applicant: MARS, INCORPORATED, McLean, VA (US)

(72) Inventors: John Didzbalis, Cranford, NJ (US); John P. Munafo, Hackettstown, NJ (US)

(73) Assignee: MARS, INCORPORATED, McLean, VA (US)

( * ) Notice: Subject to any disclaimer, the term of this patent is extended or adjusted under 35 U.S.C. 154(b) by 494 days.

(21) Appl. No.: 17/090,302

(22) Filed: Nov. 5, 2020

(65) Prior Publication Data
US 2021/0076715 A1    Mar. 18, 2021

Related U.S. Application Data

(63) Continuation of application No. 14/758,039, filed as application No. PCT/US2014/012611 on Jan. 22, 2014, now Pat. No. 10,856,562.

(60) Provisional application No. 61/785,795, filed on Mar. 14, 2013, provisional application No. 61/755,422, filed on Jan. 22, 2013.

(51) Int. Cl.
| | |
|---|---|
| *A23L 7/10* | (2016.01) |
| *A23G 9/38* | (2006.01) |
| *A23L 19/18* | (2016.01) |
| *A23L 23/00* | (2016.01) |
| *A23L 25/10* | (2016.01) |
| *A23L 27/00* | (2016.01) |
| *A23L 27/21* | (2016.01) |
| *A23L 27/22* | (2016.01) |
| *A23L 27/40* | (2016.01) |

(52) U.S. Cl.
CPC ............. *A23L 7/101* (2016.08); *A23L 19/18* (2016.08); *A23L 23/00* (2016.08); *A23L 25/10* (2016.08); *A23L 27/21* (2016.08); *A23L 27/22* (2016.08); *A23L 27/40* (2016.08); *A23L 27/45* (2016.08); *A23L 27/88* (2016.08); *A23G 9/38* (2013.01); *A23G 2200/10* (2013.01); *A23V 2002/00* (2013.01)

(58) Field of Classification Search
CPC .......... A23L 7/101; A23L 19/18; A23L 23/00; A23L 25/10; A23L 27/21; A23L 27/22; A23L 27/40; A23L 27/45; A23L 27/88; A23L 27/10; A23G 9/38; A23G 2200/10; A23V 2002/00
USPC ....................................................... 426/650
See application file for complete search history.

(56) References Cited

U.S. PATENT DOCUMENTS

| | | | |
|---|---|---|---|
| 2,965,490 A | 12/1960 | Rusoff | |
| 4,006,261 A | 2/1977 | Pickenhagen et al. | |
| 4,343,818 A | 8/1982 | Eggen | |
| 4,619,916 A | 10/1986 | Di Stazio | |
| 5,280,127 A | 1/1994 | Duby et al. | |
| 5,780,090 A * | 7/1998 | Frerot | A23L 27/21 530/331 |
| 5,919,502 A | 7/1999 | Manez et al. | |
| 6,007,851 A | 12/1999 | Schoenmaker et al. | |
| 6,875,456 B2 * | 4/2005 | Delest | A23J 3/345 435/68.1 |
| 6,927,280 B2 | 8/2005 | Kochhar et al. | |
| 7,049,298 B2 | 5/2006 | Kochhar et al. | |
| 7,176,348 B2 | 2/2007 | Kochhar et al. | |
| 7,615,244 B2 | 11/2009 | Iwasaki et al. | |
| 8,088,426 B2 | 1/2012 | Hofmann et al. | |
| 8,147,892 B2 | 4/2012 | Hofmann et al. | |
| 8,357,418 B2 | 1/2013 | Bouvier et al. | |
| 8,383,183 B2 | 2/2013 | Prakash et al. | |
| 8,541,379 B2 | 9/2013 | Miyaki et al. | |
| 9,005,689 B2 | 4/2015 | Davidek et al. | |
| 2002/0034570 A1 | 3/2002 | Krammer et al. | |
| 2004/0010123 A1 | 1/2004 | Kochhar et al. | |
| 2004/0202619 A1 | 10/2004 | Dewis et al. | |
| 2004/0202761 A1 | 10/2004 | Kochhar et al. | |
| 2005/0090446 A1 * | 4/2005 | Shashoua | A61P 39/06 514/21.5 |
| 2005/0233973 A1 | 10/2005 | Sattin et al. | |
| 2006/0134237 A1 * | 6/2006 | Greene | A61K 31/215 514/456 |
| 2008/0027005 A1 | 1/2008 | Averback et al. | |
| 2008/0153120 A1 | 6/2008 | LeCoutre et al. | |
| 2008/0248175 A1 | 10/2008 | Hofmann et al. | |
| 2009/0130282 A1 | 5/2009 | Hofmann et al. | |
| 2009/0155440 A1 | 6/2009 | Hofmann et al. | |
| 2009/0169704 A1 | 7/2009 | Basavaraju et al. | |
| 2009/0239310 A1 | 9/2009 | Ohsu et al. | |

(Continued)

FOREIGN PATENT DOCUMENTS

AU    2010339305 B2    5/2013
EP    0 783 253 B1    10/2002

(Continued)

OTHER PUBLICATIONS

NPL Yoshira et al. (English translation of JP 2004 033088 A). (Year: 2004).*

(Continued)

*Primary Examiner* — Bhaskar Mukhopadhyay
(74) *Attorney, Agent, or Firm* — Baker Botts L.L.P.

(57) ABSTRACT

A flavor composition containing at least one, two, three, four, five or more peptide compound(s) that can be used to enhance the taste of edible compositions including sweet goods, such as confectionery goods, and savory goods, such as pet foods.

15 Claims, 16 Drawing Sheets

(56) References Cited

U.S. PATENT DOCUMENTS

| | | |
|---|---|---|
| 2010/0136197 A1 | 6/2010 | Eto et al. |
| 2010/0138024 A1 | 6/2010 | Bouvier et al. |
| 2010/0190723 A1 | 7/2010 | Sanada et al. |
| 2011/0027451 A1 | 2/2011 | Shimono et al. |
| 2011/0064861 A1 | 3/2011 | Shimono et al. |
| 2011/0077191 A1 | 3/2011 | Tamiz |
| 2011/0165304 A1 | 7/2011 | Kortes |
| 2011/0183925 A1 | 7/2011 | Sato et al. |
| 2011/0269851 A1 | 11/2011 | Bortlik et al. |
| 2011/0280812 A1 | 11/2011 | Bombuwala et al. |
| 2011/0293781 A1 | 12/2011 | Guthrie et al. |
| 2012/0201944 A1 | 8/2012 | Tanizawa et al. |

FOREIGN PATENT DOCUMENTS

| | | | |
|---|---|---|---|
| EP | 1 297 753 A1 | 4/2003 | |
| EP | 1 312 268 A1 | 5/2003 | |
| EP | 1 339 850 A2 | 9/2003 | |
| EP | 1 361 799 | 11/2003 | |
| EP | 2 253 227 A1 | 11/2010 | |
| EP | 2 299 271 A2 | 3/2011 | |
| EP | 2 389 815 A1 | 11/2011 | |
| EP | 2 484 219 A1 | 8/2012 | |
| JP | S54/019966 A | 2/1979 | |
| JP | S60/009465 A | 1/1985 | |
| JP | S63/13661 B2 | 3/1988 | |
| JP | H8252075 A | 10/1996 | |
| JP | H9100297 A | 4/1997 | |
| JP | 2002253171 A | 9/2002 | |
| JP | 2002281932 A * | 10/2002 | ............ A23L 27/22 |
| JP | 2012029616 A | 2/2012 | |
| WO | WO 96/38472 A1 | 12/1996 | |
| WO | WO 97/43910 A1 | 11/1997 | |
| WO | WO 02/42327 A2 | 5/2002 | |
| WO | WO 02/063974 A1 | 8/2002 | |
| WO | WO 03/031623 A1 | 4/2003 | |
| WO | WO-03102195 A1 * | 12/2003 | ............... C12N 9/48 |
| WO | WO-2006078615 A2 * | 7/2006 | ................ A23J 3/16 |
| WO | WO 2006/082110 A2 | 8/2006 | |
| WO | WO 2009/013240 A2 | 1/2009 | |
| WO | WO 2010/032322 A1 | 3/2010 | |
| WO | WO 2011/018280 A1 | 2/2011 | |
| WO | WO 2011/053815 A1 | 5/2011 | |

OTHER PUBLICATIONS

NPL dipeptide (IT 1049314 B, 1981) (Year: 1981).*
Google search for dipeptide (Retrieved on Apr. 28, 2023) (Year: 2023).*
NPL Yu et al. (Yu Lu, Ph.D. Oct. 29, 2015, 9:00-10:00 AM EST) (Year: 2015).*
U.S. Appl. No. 14/758,039 (US 2015/0342231), filed Jun. 26, 2015 (Dec. 3, 2015).
U.S. Appl. No. 14/161,508 (US 2014/0205729), filed Jan. 22, 2014 (Jul. 24, 2014).
U.S. Appl. No. 16/113,968 (US 2019/0254318), filed Aug. 27, 2018 (Aug. 22, 2019).
U.S. Appl. No. 16/113,968, Apr. 3, 2020 Final Office Action.
U.S. Appl. No. 16/113,968, Dec. 17, 2019 Response to Non/Final Office Action.
U.S. Appl. No. 16/113,968, Sep. 17, 2019 Non/Final Office Action.
U.S. Appl. No. 14/161,508, Nov. 21, 2019 Response to Non/Final Office Action.
U.S. Appl. No. 14/161,508, Jul. 5, 2019 Non/Final Office Action.
U.S. Appl. No. 14/161,508, Apr. 1, 2019 Response to Non/Final Office Action.
U.S. Appl. No. 14/161,508, Dec. 3, 2018 Non/Final Office Action.
U.S. Appl. No. 14/161,508, Oct. 16, 2018 Applicant Initiated Interview Summary.
U.S. Appl. No. 14/161,508, Aug. 29, 2018 Notice of Withdrawal.
U.S. Appl. No. 14/161,508, Jul. 26, 2018 Issue Fee Payment.
U.S. Appl. No. 14/161,508, May 1, 2018 Notice of Allowance.
U.S. Appl. No. 14/161,508, Dec. 11, 2017 Response to Non/Final Office Action.
U.S. Appl. No. 14/161,508, Aug. 10, 2017 Non/Final Office Action.
U.S. Appl. No. 14/161,508, filed Dec. 21, 2016 Amendment and Request for Continued Examination (RCE).
U.S. Appl. No. 14/161,508, Jul. 28, 2016 Final Office Action.
U.S. Appl. No. 14/161,508, Jun. 6, 2016 Response to Non/Final Office Action.
U.S. Appl. No. 14/161,508, Apr. 20, 2016 Non/Final Office Action.
Machine Translation of JPH09100297 (JP 19950256326).
Hidehiko et al., (JP 2002253171) [English machine translation] (2002).
International Search Report mailed Mar. 20, 2015 for PCT/US2014/012611.
Kaneko et al., "Isolation and Identification of the Umami Enhancing Compounds in Japanese Soy Sauce," Biosci. Biotechnol. Biochem 75 (7): 1275-1282 (2011).
Kiyono et al., "Identification of Pyroglutamyl Peptides in Japanese Rice Wine (Sake): Presence of Hepatoprotective PyroGlu/Leu," J. Agric. Food Chem., 61:11660-11667 (2013).
Liu "Research and Application of Present Flavor Peptides", Meat Research, No. 5, pp. 88-92 (May 2010).
Supervised by Aya Kagawa, Standard Tables of Food Composition in Japan, the fifth edition, Kagawa Nutrition University Publishing Division, Jan. 1994, p. 286/287 (with English translation).
Zhang et al., "Research Progress in Flavor Peptides in Foods and Corresponding Taste Mechanisms", Food vol. 33, No. 7, pp. 320-326 (Apr. 2012).
U.S. Appl. No. 14/758,039, Nov. 5, 2020 Issue Fee Payment.
U.S. Appl. No. 14/758,039, Aug. 17, 2020 Notice of Allowance.
U.S. Appl. No. 14/758,039, May 27, 2020 Response to Non-Final Office Action.
U.S. Appl. No. 14/758,039, Mar. 17, 2020 Non-Final Office Action.
U.S. Appl. No. 14/758,039, Nov. 21, 2019 Response to Non-Final Office Action.
U.S. Appl. No. 14/758,039, Jul. 17, 2019 Non-Final Office Action.
U.S. Appl. No. 14/758,039, Apr. 15, 2019 Response to Non-Final Office Action.
U.S. Appl. No. 14/758,039, Nov. 14, 2018 Non-Final Office Action.
U.S. Appl. No. 14/758,039, Sep. 4, 2018 Notice of Withdrawal.
U.S. Appl. No. 14/758,039, Aug. 27, 2018 Issue Fee Payment.
U.S. Appl. No. 14/758,039, May 31, 2018 Notice of Allowance.
U.S. Appl. No. 14/758,039, Oct. 19, 2017 Advisory Action.
U.S. Appl. No. 14/758,039, May 9, 2017 Request for Continued Examination.
U.S. Appl. No. 14/758,039, May 9, 2017 Response to Final Office Action.
U.S. Appl. No. 14/758,039, Mar. 9, 2017 Final Office Action.
U.S. Appl. No. 14/758,039, Dec. 21, 2016 Response to Non-Final Office Action.
U.S. Appl. No. 14/758,039, Sep. 28, 2016 Non-Final Office Action.

* cited by examiner

HCP Fr. 4

(1) 
Phe-Leu/Ile (5) 
Leu-Phe-Arg-Val (2) 
Leu/Ile-Val-Glu (6) 
Phe-Phe (3) 
Phe-Val-Asp (7) 
Val-Phe-Val (4) 
Val-Asp-Leu/Ile-Leu/Ile (8) 
Phe-Leu/Ile-Val

HCP Fr. 5

(9) 
11-OH-hydroxyjasmonic acid (12A) 
Phe-Leu/Ile-Gly

(10) 
Leu/Ile-Leu/Ile (12B) 
Phe-Leu/Ile-Gly (11A) 
Leu/Ile-Leu/Ile-Gly

(13) 
Phe-Asp-Val (11B) 
Leu/Ile-Leu/Ile-Gly

FLAVOR COMPOSITION AND EDIBLE COMPOSITIONS CONTAINING SAME

CROSS-REFERENCE TO RELATED APPLICATIONS

This application is a continuation of U.S. patent application Ser. No. 14/758,039, filed Jun. 26, 2015, now allowed, which is a U.S. National Stage Patent Application under 35 U.S.C. § 371 of International Application No. PCT/US2014/012611, filed Jan. 22, 2014, which claims priority to U.S. Application Ser. No. 61/755,422 filed Jan. 22, 2013, and U.S. Application Ser. No. 61/785,795 filed Mar. 14, 2013, priority to each of which is claimed, and each of which are incorporated by reference in their entireties herein.

FIELD

The present application relates to peptides and flavor compositions that include at least one, two, three, four, five or more peptide compounds. The flavor compositions can be used to enhance or modify the taste and/or flavor of various edible compositions such as sweet goods and savory goods. The flavor compositions can include combinations of compounds, and can be added to edible compositions in various delivery system formats.

BACKGROUND

Taste profiles for edible compositions include basic tastes such as sweet, salt, bitter, sour, umami and kokumi. Chemical compounds that elicit these tastes are often referred to as tastants. It is hypothesized that tastants are sensed by taste receptors in the mouth and throat which transmit signals to the brain where the tastants and resulting taste profiles are registered. In addition to taste profiles, edible compositions are also known to have flavor profiles. Chemical compounds that contribute to flavor profiles can be aromatic compounds that are often referred to as flavorants. It is hypothesized that flavorants are sensed by receptors in the mouth, nose, and throat. Taken together, the taste and flavor profiles resulting from the various tastants and flavorants contribute to the sensory experience users have when consuming the edible compositions. The sensory experience can also include various texture and temperature/thermal aspects.

While there have been recent advances in taste and flavor technologies, there remains a need for compounds that can enhance or modify the sensory experience of edible compositions by enhancing or modifying the taste, texture, and/or flavor profiles of edible compositions. The enhancement or modification can be to increase the intensity of a desirable attribute, to replace a desirable attribute that is not present or somehow lost in the edible composition, or to decrease the intensity of an undesirable attribute. In particular, it is desirable to increase the intensity of or to replace a salt and/or umami tastant in both sweet and savory goods. It can also be desirable to provide sourness such as the sourness imparted to cocoa beans during fermentation to sweet goods such as chocolate confectionery. It is further desirable to be able to use tastants to enhance or modify the texture of an edible composition.

Vegetable proteins, such as wheat and soy, can be hydrolyzed to produce hydrolysates that can be used as flavor enhancers (i.e. soy sauce). In EP1312268A1 to Nestle, wheat protein forms the starting material that is hydrolyzed to form pyroglutamic acid tripeptides that provide umami taste. Umami taste is known to produce organoleptic affects including providing mouthfeel and roundness. Umami taste effect is usually described in comparison to the taste provided by monosodium glutamate (MSG). Taking a purely synthetic approach to umami compounds, U.S. Pat. No. 5,780,090 to Firmenich describes tripeptides with a hydrophobic amino acid residue and at least one acidic amino acid residue. These tripeptides provide fuller, richer texture (i.e. an umami effect). However, neither of these publications describe a saltiness associated with the compounds. Saltiness can accompany an umami effect because many of the products that use umami tastants are savory products that include sodium chloride. However, a clean salty taste similar to that provided by sodium chloride is distinctly different from the MSG-like effect of umami. Thus, there remains a need for a flavor modifier that can provide clean saltiness to reduce the levels of sodium chloride needed to produce a desired level of saltiness. Additionally, there remains a need for a flavor modifier that can provide an umami taste without a salty taste and there remains a need for a flavor modifier that can provide an umami taste at very low use levels.

SUMMARY OF THE INVENTION

The present application is directed to flavor compositions and methods for making and modifying such compositions across a variety of food compositions. Specifically, the present application is directed to compositions comprising one, two, three, four, five or more peptides.

In certain embodiments, the flavor compositions of the present application comprise a peptide comprising one, two, three, four five or more amino acid residues.

In certain embodiments, the peptide comprises a pyroglutamic acid residue (pGlu).

In certain embodiments, the peptide comprises a γ-glutamic acid residue (γGlu).

In certain embodiments of the present application, the flavor composition comprises a dipeptide comprising a pyroglutamic acid (pGlu) residue and a second amino acid. In certain embodiments, the second amino acid is a hydrophobic amino acid residue. In certain embodiments, the hydrophobic amino acid is selected from the group consisting of glycine (Gly), alanine (Ala), valine (Val), leucine (Leu), isoleucine (Ile), proline (Pro), phenylalanine (Phe), methionine (Met), tyrosine (Tyr) and tryptophan (Trp). In certain embodiments, the second amino acid residue is selected from the group consisting of alanine (Ala), arginine (Arg), asparagine (Asn), aspartic acid (aspartate, Asp), cysteine (Cys), glutamine (Gln), glutamic acid (glutamate, Glu), glycine (Gly), histidine (His), isoleucine (Ile), leucine (Leu), lysine (Lys), methionine (Met), phenylalanine (Phe), proline (Pro), serine (Ser), threonine (Thr), tryptophan (Trp), tyrosine (Tyr) and valine (Val).

In certain embodiments of the present application, the flavor composition comprises a tripeptide comprising a pyroglutamic acid residue (pGlu) in combination with an amino acid selected from the group consisting of a valine (Val), leucine (Leu), isoleucine (Ile), cysteine (Cys) and proline (Pro); and a third amino acid. In certain embodiments, the third amino acid is a hydrophobic amino acid residue. In certain embodiments, the hydrophobic amino acid is selected from the group consisting of glycine (Gly), alanine (Ala), valine (Val), leucine (Leu), isoleucine (Ile), proline (Pro), phenylalanine (Phe), methionine (Met), tyrosine (Tyr) and tryptophan (Trp). In certain embodiments, the third amino acid residue is selected from the group consisting of alanine (Ala), arginine (Arg), asparagine (Asn), aspartic acid (aspartate, Asp), cysteine (Cys), glutamine (Gln), glutamic acid (glutamate, Glu), glycine (Gly), histidine (His), isoleucine (Ile), leucine (Leu), lysine (Lys), methionine (Met), phenylalanine (Phe), proline (Pro), serine (Ser), threonine (Thr), tryptophan (Trp), tyrosine (Tyr) and valine (Val).

In certain embodiments of the present application, the flavor composition comprises a dipeptide comprising a γ-glutamic acid (γGlu) residue and a second amino acid. In certain embodiments, the second amino acid is a hydrophobic amino acid residue. In certain embodiments, the hydrophobic amino acid is selected from the group consisting of glycine (Gly), alanine (Ala), valine (Val), leucine (Leu), isoleucine (Ile), proline (Pro), phenylalanine (Phe), methionine (Met), tyrosine (Tyr) and tryptophan (Trp). In certain embodiments, the second amino acid residue is selected from the group consisting of alanine (Ala), arginine (Arg), asparagine (Asn), aspartic acid (aspartate, Asp), cysteine (Cys), glutamine (Gln), glutamic acid (glutamate, Glu), glycine (Gly), histidine (His), isoleucine (Ile), leucine (Leu), lysine (Lys), methionine (Met), phenylalanine (Phe), proline (Pro), serine (Ser), threonine (Thr), tryptophan (Trp), tyrosine (Tyr) and valine (Val).

In certain embodiments of the present application, the flavor composition comprises a tripeptide comprising a γ-glutamic acid residue (γGlu) in combination with an amino acid selected from the group consisting of a valine (Val), leucine (Leu), isoleucine (Ile), cysteine (Cys) and proline (Pro); and a third amino acid. In certain embodiments, the third amino acid is a hydrophobic amino acid residue. In certain embodiments, the hydrophobic amino acid is selected from the group consisting of glycine (Gly), alanine (Ala), valine (Val), leucine (Leu), isoleucine (Ile), proline (Pro), phenylalanine (Phe), methionine (Met), tyrosine (Tyr) and tryptophan (Trp). In certain embodiments, the third amino acid residue is selected from the group consisting of alanine (Ala), arginine (Arg), asparagine (Asn), aspartic acid (aspartate, Asp), cysteine (Cys), glutamine (Gln), glutamic acid (glutamate, Glu), glycine (Gly), histidine (His), isoleucine (Ile), leucine (Leu), lysine (Lys), methionine (Met), phenylalanine (Phe), proline (Pro), serine (Ser), threonine (Thr), tryptophan (Trp), tyrosine (Tyr) and valine (Val).

In certain embodiments of the application, the tripeptide flavor composition comprises the amino acids pyroglutamic acid, valine and leucine (pGlu-Val-Leu).

In certain embodiments of the application, the tripeptide flavor composition comprises the amino acids pyroglutamic acid, valine, and valine (pGlu-Val-Val).

In certain embodiments of the application, the tripeptide flavor composition comprises the amino acids pyroglutamic acid, valine, and cysteine (pGlu-Val-Cys).

In certain embodiments of the application, the dipeptide flavor composition comprises the amino acids pyroglutamic acid and valine (pGlu-Val).

In certain embodiments of the application, the dipeptide flavor composition comprises the amino acids pyroglutamic acid and cysteine (pGlu-Cys).

In certain embodiments of the application, the tripeptide flavor composition comprises the amino acids pyroglutamic acid, cysteine and glycine (pGlu-Cys-Gly).

In certain embodiments of the application, the tripeptide flavor composition comprises the amino acids pyroglutamic acid, cysteine and cysteine (pGlu-Cys-Cys).

In certain embodiments of the application, the tripeptide flavor composition comprises the amino acids pyroglutamic acid, cysteine and valine (pGlu-Cys-Val).

In certain embodiments of the application, the peptide flavor composition is selected from the group consisting of Phe-Leu/Ile, Leu/Ile-Val-Glu, Phe-Val-Asp, Val-Asp-Leu/Ile-Leu/Ile, Leu-Phe-Arg-Val, Phe-Phe, Val-Phe-Val, Phe-Leu/Ile-Val, 11-OH-hydroxyjasmonic acid, Leu/Ile-Leu/Ile-Gly, Phe-Leu/Ile-Gly, Phe-Asp-Val, Phe-Tyr, Leu/Ile-Val, Phe-Leu/Ile, Gln-Val-Leu, Glu-Val-Leu, pGlu-Phe, pGlu-Gly-Ala-Ile-Phe, pGlu-Pro-Gln, pGlu-Pro-Ser, pGlu-Pro-Glu, pGlu-Pro, pGlu-Val-Leu-Leu, pGlu-Leu-Leu, pGlu-Val-Gln, pGlu-Val-Glu, pGlu-Val-Val-Val, pGlu-Val-Ile, pGlu-Val-Pro, pGlu-Val-Ala, pGlu-Leu, pGlu-Val-Gly, γGlu-Val-Gly, γGlu-Val, γGlu-Val-Leu, γGlu-Cys-Gly, and combinations thereof.

In certain embodiments, the present application provides methods of modifying the taste and/or flavor of a food product, which comprises providing a flavor composition, for example, a peptide compound such as, but not limited to, a dipeptide compound, a tripeptide compound, or combinations thereof, and admixing the flavor composition with a food product.

In certain embodiments of the present application, the flavor composition is admixed with a food product in an amount effective to provide a clean salty taste, wherein the salty taste is not associated with an umami taste. In certain embodiments, the flavor composition is admixed with a food product in an amount effective to increase or decrease a clean salty taste present in the food product.

In certain embodiments of the present application, the flavor composition is admixed with a food product in an amount effective to provide an umami taste. In certain embodiments, the flavor composition is admixed with a food product in an amount effective to increase or decrease an umami taste present in the food product.

In certain embodiments of the present application, the flavor composition is admixed with a food product in an amount effective to provide a bitter taste. In certain embodiments, the flavor composition is admixed with a food product in an amount effective to increase or decrease a bitter taste present in the food product.

In certain embodiments of the present application, the flavor composition is admixed with a food product in an amount effective to provide an astringent mouthfeel. In certain embodiments, the flavor composition is admixed with a food product in an amount effective to increase or decrease an astringent mouthfeel present in the food product.

In certain embodiments, the flavor composition is admixed with a food product at a concentration of from about 0.1 to about 100 ppm (parts-per-million), and values in between. In certain embodiments, the flavor composition is admixed with a food product at a concentration of from about 0.1 to about 50 ppm, and values in between. In certain embodiments, the flavor composition is admixed with a food product at a concentration of from about 0.1 to about 10 ppm, and values in between.

In certain embodiments, the flavor composition is admixed with a food product at a concentration of from about 0.1 to about 100 ppm, or from about 1 to about 90 ppm, or from about 10 to about 80 ppm, or from about 20 to about 70 ppm, or from about 30 to about 60 ppm, or from about 40 to about 50 ppm, and values in between. In certain embodiments, the flavor composition is admixed with a food product at a concentration of from about 0.1 to about 1 ppm, from about 1 to about 5 ppm, from about 5 to about 10 ppm, from about 10 to about 15 ppm, from about 15 to about 20 ppm, from about 20 to about 25 ppm, from about 25 to about 30 ppm, from about 30 to about 35 ppm, from about 35 to about 40 ppm, from about 40 to about 45 ppm, from about 45 to about 50 ppm, from about 50 to about 55 ppm, from about 55 to about 60 ppm, from about 60 to about 65 ppm, from about 65 to about 70 ppm, from about 70 to about 75 ppm, from about 75 to about 80 ppm, from about 80 to about 85 ppm, from about 85 to about 90 ppm from about 90 to about 95 ppm, or from about 95 to about 100 ppm, and values in between.

In certain embodiments, the flavor composition is admixed with a food product at a concentration of from about 0.01 to about 10000 ppb (parts-per-billion), and values in between. In certain embodiments, the flavor composition is admixed with a food product at a concentration of from about 0.1 to about 1000 ppb, and values in between. In certain embodiments, the flavor composition is admixed with a food product at a concentration of from about 1 to about 100 ppb, and values in between. In certain embodiments, the flavor composition is admixed with a food product at a concentration of from about 10 to about 50 ppb, and values in between. In certain embodiments, the flavor composition is admixed with a food product at a concentration of from about 0.1 to about 10 ppb, and values in between.

In certain embodiments, the flavor composition is admixed with a food product at a concentration of from about 0.1 to about 10000 ppb, or from about 1 to about 5000 ppb, or from about 10 to about 2000 ppb, or from about 20 to about 1500 ppb, or from about 30 to about 1000 ppb, or from about 40 to about 500 ppb, or from about 50 to about 250 ppb, or from about 60 to about 200 ppb, or from about 70 to about 150 ppb, or from about 80 to about 100 ppb, and values in between.

In certain embodiments, the flavor composition is admixed with a food product at a concentration of from about 0.1 to about 1 ppb, from about 1 to about 5 ppb, from about 5 to about 10 ppb, from about 10 to about 15 ppb, from about 15 to about 20 ppb, from about 20 to about 25 ppb, from about 25 to about 30 ppb, from about 30 to about 35 ppb, from about 35 to about 40 ppb, from about 40 to about 45 ppb, from about 45 to about 50 ppb, from about 50 to about 55 ppb, from about 55 to about 60 ppb, from about 60 to about 65 ppb, from about 65 to about 70 ppb, from about 70 to about 75 ppb, from about 75 to about 80 ppb, from about 80 to about 85 ppb, from about 85 to about 90 ppb from about 90 to about 95 ppb, from about 95 to about 100 ppb, from about 100 to about 150 ppb, from about 150 to about 200 ppb, from about 200 to about 250 ppb, from about 250 to about 300 ppb, from about 300 to about 350 ppb, from about 350 to about 400 ppb, from about 400 to about 450 ppb, from about 450 to about 500 ppb, from about 500 to about 550 ppb, from about 550 to about 600 ppb, from about 600 to about 650 ppb, from about 650 to about 700 ppb, from about 700 to about 750 ppb, from about 750 to about 800 ppb, from about 800 to about 850 ppb, from about 850 to about 900 ppb, from about 900 to about 950 ppb, or from about 950 to about 1000 ppb, and values in between.

In certain embodiments, the flavor composition is admixed with a food product at a concentration of about 0.1 ppb, 0.5 ppb, 1 ppb, 10 ppb, 40 ppb, 50 ppb, 100 ppb, 250 ppb, 267 ppb, 1000 ppb or 1150 ppb, and values in between.

In certain embodiments, the flavor composition is admixed with a food product at a concentration of from about 0.1 to about 100 ppt (parts-per-trillion), and values in between. In certain embodiments, the flavor composition is admixed with a food product at a concentration of from about 0.1 to about 50 ppt, and values in between. In certain embodiments, the flavor composition is admixed with a food product at a concentration of from about 0.1 to about 10 ppt, and values in between.

In certain embodiments, the flavor composition is admixed with a food product at a concentration of from about 0.1 to about 100 ppt, or from about 1 to about 90 ppt, or from about 10 to about 80 ppt, or from about 20 to about 70 ppt, or from about 30 to about 60 ppt, or from about 40 to about 50 ppt, and values in between.

In certain embodiments, the flavor composition is admixed with a food product at a concentration of from about 0.1 to about 1 ppt, from about 1 to about 5 ppt, from about 5 to about 10 ppt, from about 10 to about 15 ppt, from about 15 to about 20 ppt, from about 20 to about 25 ppt, from about 25 to about 30 ppt, from about 30 to about 35 ppt, from about 35 to about 40 ppt, from about 40 to about 45 ppt, from about 45 to about 50 ppt, from about 50 to about 55 ppt, from about 55 to about 60 ppt, from about 60 to about 65 ppt, from about 65 to about 70 ppt, from about 70 to about 75 ppt, from about 75 to about 80 ppt, from about 80 to about 85 ppt, from about 85 to about 90 ppt from about 90 to about 95 ppt, or from about 95 to about 100 ppt, and values in between. In certain embodiments, the flavor composition is admixed with a food product at a concentration of from about 0.0001 to about 99.9% weight/weight (w/w), and values in between. In certain embodiments, the flavor composition is admixed with a food product at a concentration of from about 0.0001 to about 1.0% w/w, and values in between. In certain embodiments, the flavor composition is admixed with a food product at a concentration of from about 0.0001 to about 0.5% w/w, and values in between.

In certain embodiments, the flavor composition is admixed with a food product at a concentration of from about 0.0001 to about 99.9% w/w, or from 0.001 to about 99% w/w, or from about 0.01 to about 95% w/w, or from about 0.1 to about 90% w/w, or from about 0.5 to about 85% w/w, or from about 1 to about 80% w/w, or from about 1.5 to about 75% w/w, or from about 2 to about 70% w/w, or from about 2.5 to about 65% w/w, or from about 3 to about 60% w/w, or from about 3.5 to about 55% w/w, or from about 4 to about 50% w/w, or from about 5 to about 45% w/w, or from about 10 to about 40% w/w, or from about 15 to about 35% w/w, or from about 20 to about 30% w/w, and values in between.

In certain embodiments, the flavor composition comprises a pGlu-Val-Leu, pGlu-Val, pGlu-Val-Val, pGlu-Val-Cys or pGlu-Pro-Glu peptide, or combination thereof, wherein the peptide, or combination of peptides, is admixed with a food product at a concentration of about 0.1 ppb, 0.5 ppb, 1 ppb, 10 ppb, 40 ppb or 50 ppb.

In certain embodiments, the flavor composition comprises a pGlu-Val-Leu peptide wherein the peptide is admixed with a food product at a concentration of about 0.1 ppb, 0.5 ppb, 1 ppb, 10 ppb, 40 ppb, 50 ppb, 250 ppb, 267 ppb, 1000 ppb or 1150 ppb.

In certain embodiments, the flavor composition comprises a pGlu-Val-Cys peptide wherein the peptide is admixed with a food product at a concentration of about 1 ppb, 10 ppb, 100 ppb or 1000 ppb.

In certain embodiments, the flavor composition comprises a pGlu-Cys, pGlu-Cys-Gly, pGlu-Cys-Cys or pGlu-Cys-Val peptide, or combination thereof, wherein the peptide, or combination of peptides, is admixed with a food product at a concentration of about 1 ppb, 10 ppb or 100 ppb.

In certain embodiments of the present application, the flavor composition is admixed with a food product in an amount effective to modulate, enhance or decrease the taste profile of an edible composition.

In certain embodiments of the present application, the flavor composition is admixed with a food product in an amount effective to modulate, enhance or decrease the flavor profile of an edible composition.

In certain embodiments of the present application, the flavor composition is admixed with a food product in an amount effective to modulate, enhance or decrease the texture profile of an edible composition.

In certain embodiments of the present application, the flavor composition is admixed with a food product comprising a salt, for example, sodium chloride and/or potassium chloride, wherein the flavor composition is admixed in an amount effective to provide a clean salty taste while reducing the concentration of salt in the food product. In certain embodiments, the concentration of salt in the food product is reduced by between about 1 and about 99%, between about 10 and about 90%, between about 20 and about 80%, between about 30 and about 70%, between about 40 and about 60%, or about 50% compared to a food product that has not been admixed with the flavor composition. In certain embodiments, the concentration of salt in the food product is reduced by about 75% or less, about 50% or less, about 25% or less, or about 10% or less, compared to a food product that has not been admixed with the flavor composition.

In other embodiments, the flavor composition is admixed in an amount effective to provide a higher intensity clean salty taste without increasing the concentration of salt in the food product. While in still other embodiments the flavor composition is admixed in an amount effective to provide a clean salty taste where the concentration of salt in the food product would be below the taste threshold needed to perceive saltiness.

In certain embodiments of the present application, the flavor composition is admixed with a food product in an amount effective to increase a saltiness aftertaste.

In certain embodiments, the present application provides methods of preparing a flavor composition. In certain embodiments, the methods comprise hydrolyzing a food product source, for example, cacao, wheat or soy, to produce a hydrolysate comprising the flavor composition. In certain embodiments, the hydrolysate is admixed with a food product.

In certain embodiments the flavor compositions of the present application are prepared from a food product source that is fractionated and/or extracted to form an enriched peptide composition comprising the peptides of the present application. In certain embodiments the flavor compositions of the present application are prepared from a food product source that is hydrolyzed and fractionated and/or extracted to form an enriched peptide composition comprising the peptides of the present application.

In certain embodiments, the methods of preparing a flavor composition comprises synthesizing a peptide flavor composition such as, but not limited to, a dipeptide flavor composition, tripeptide flavor composition, or combinations thereof. In certain embodiments, the synthesis methods are synthetic synthesis methods.

The foregoing has outlined rather broadly the features and technical advantages of the present application in order that the detailed description that follows may be better understood. Additional features and advantages of the application will be described hereinafter which form the subject of the claims of the application. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

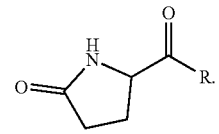

DETAILED DESCRIPTION

Figure 1A:
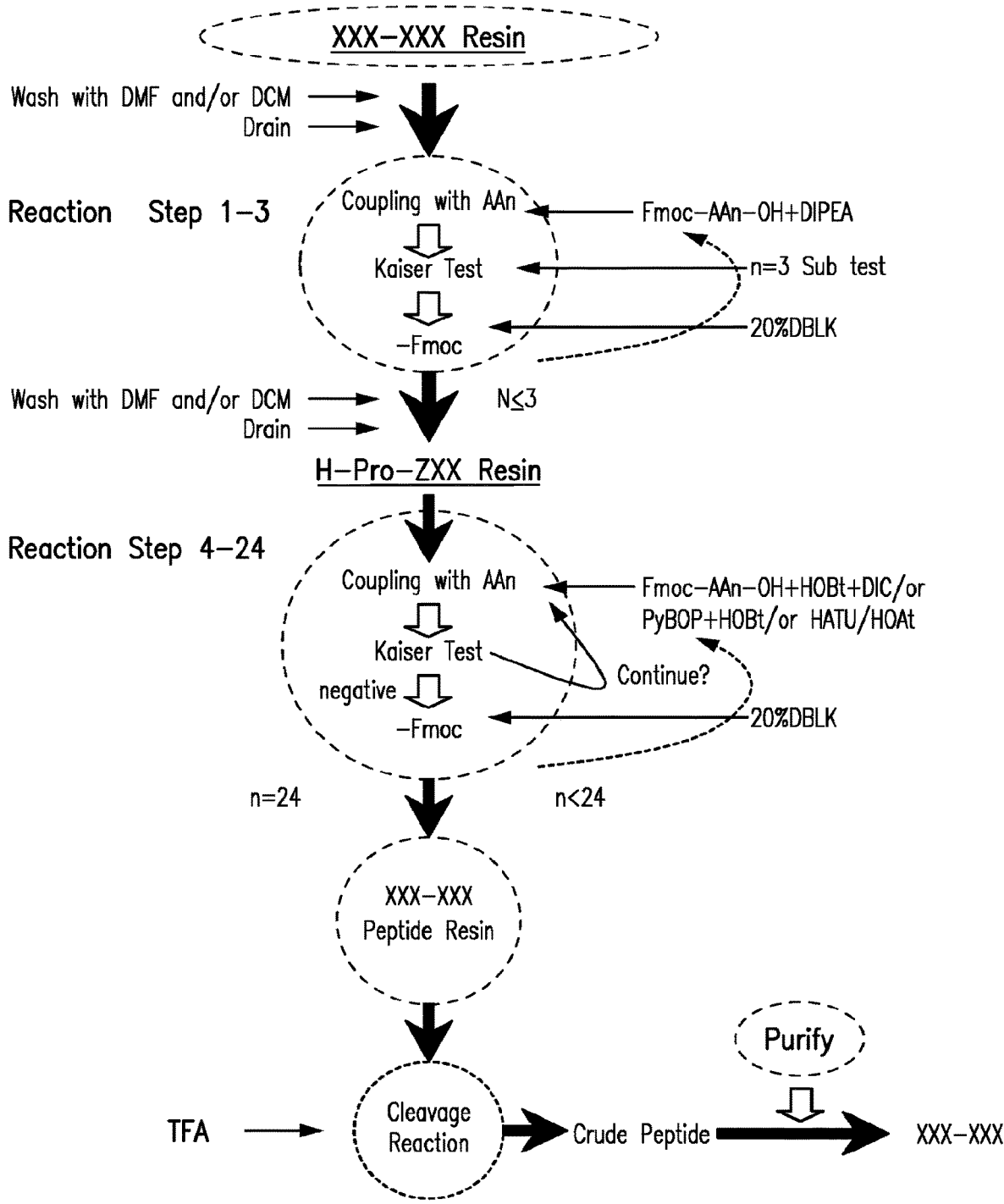
FIGS. 1A-B shows a flow chart describing the chemosynthetic steps (1A) and technological process (1B) of the method used for preparing a pGlu-Val-Leu tripeptide as described in Example 2.

To date, there remains a need for a flavor modifier that can provide a desired level of clean saltiness in various edible compositions. Additionally, there remains a need for a flavor modifier that can provide an umami taste without a salty taste, and there remains a need for a flavor modifier that can provide an umami taste at very low use levels. The present application relates to flavor compositions that include at least one, two, three, four, five or more peptide compounds. In certain non-limiting embodiments, the peptide is a dipeptide, tripeptide or combination thereof. The flavor compositions can be used to enhance or modify the taste and/or flavor of various edible compositions such as sweet goods and savory goods. The flavor compositions can include combinations of compounds, and can be added to edible compositions in various delivery system formats.

1. Definitions

The terms used in this specification generally have their ordinary meanings in the art, within the context of this invention and in the specific context where each term is used. Certain terms are discussed below, or elsewhere in the specification, to provide additional guidance to the practitioner in describing the compositions and methods of the invention and how to make and use them.

As used herein, the use of the word "a" or "an" when used in conjunction with the term "comprising" in the claims and/or the specification may mean "one," but it is also consistent with the meaning of "one or more," "at least one," and "one or more than one." Still further, the terms "having,"

"including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

As used herein, "taste" refers to a sensation caused by activation or inhibition of receptor cells in a subject's taste buds. In certain embodiments, taste can be selected from the group consisting of sweet, sour, salt, bitter, kokumi and umami. In certain embodiments, a taste is elicited in a subject by a "tastant." In certain embodiments, a tastant is a synthetic tastant. In certain embodiments, the tastant is prepared from a natural source.

As used herein, "taste profile" refers to a combination of tastes, such as, for example, one or more of a sweet, sour, salt, bitter, kokumi and/or umami taste. In certain embodiments, a taste profile is produced by one or more tastant that is present in a composition at the same or different concentrations. In certain embodiments, a taste profile refers to the intensity of a taste or combination of tastes, for example, a sweet, sour, salt, bitter, kokumi and/or umami taste, as detected by a subject or any assay known in the art. In certain embodiments, modifying, changing or varying the combination of tastants in a taste profile can change the sensory experience of a subject.

As used herein, "flavor" refers to one or more sensory stimuli, such as, for example, one or more of taste (gustatory), smell (olfactory), touch (tactile) and temperature (thermal) stimuli. The terms "flavor" and "aroma" are synonymous and are used interchangeably. In certain non-limiting embodiments, the sensory experience of a subject exposed to a flavor can be classified as a characteristic experience for the particular flavor. For example, a flavor can be identified by the subject as being, but not limited to, a floral, citrus, berry, nutty, caramel, chocolate, peppery, smoky, cheesy, meaty, etc. flavor As used herein, a flavor composition can be selected from a liquid, dry powder, spray, paste, suspension and any combination thereof. The flavor can be a natural composition, an artificial composition, a nature identical, or any combination thereof.

As used herein, "flavor profile" refers to a combination of sensory stimuli, for example, tastes, such as sweet, sour, bitter, salty, kokumi and/or umami tastes, and/or olfactory, tactile and/or thermal stimuli. In certain embodiments, the flavor profile comprises one or more flavors which contribute to the sensory experience of a subject. In certain embodiments, modifying, changing or varying the combination of stimuli in a flavor profile can change the sensory experience of a subject.

As used herein, "texture profile" or "mouthfeel" refers to a composition's physical and chemical interaction in the mouth. The texture profile of a composition can include one or more texture, such as, for example, but not limited to, astringency, hardness, cohesiveness, viscosity, elasticity, adhesiveness, brittleness, chewiness, gumminess, moisture content, grittiness, smoothness, oiliness and greasiness. In certain embodiments, the texture profile can comprise one or more texture characteristic in the same or different intensities. In certain embodiments, the texture profile can remain constant or change during a sensory experience, for example, from initial perception of a composition on the palate, to first bite, through mastication and finally, the act of swallowing.

As used herein, "sensory experience" refers to a subject's sensory perception of a taste, taste profile, flavor, flavor profile or texture profile.

As used herein, "ppt" means parts-per-trillion and is a weight relative parameter. A part-per-trillion is a picogram per gram, such that a component that is present at 10 ppt is present at 10 picograms of the specific component per 1 gram of the aggregate mixture.

As used herein, "ppb" means parts-per-billion and is a weight relative parameter. A part-per-billion is a nanogram per gram, such that a component that is present at 10 ppb is present at 10 nanograms of the specific component per 1 gram of the aggregate mixture.

As used herein, "ppm" means parts-per-million and is a weight relative parameter. A part-per-million is a microgram per gram, such that a component that is present at 10 ppm is present at 10 micrograms of the specific component per 1 gram of the aggregate mixture.

As used herein "admixing," for example, "admixing the peptide flavor composition, dipeptide flavor composition, tripeptide flavor composition, or combinations thereof of the present application with a food product," refers to the process where the flavor composition is mixed with or added to the completed product or mixed with some or all of the components of the product during product formation or some combination of these steps. When used in the context of admixing the term "product" refers to the product or any of its components. This admixing step can include a process selected from the step of adding the flavor composition to the product, spraying the flavor composition on the product, coating the flavor composition on the product, suspending the product in the flavor composition, painting the flavor composition on the product, pasting the flavor composition on the product, encapsulating the product with the flavor composition, mixing the flavor composition with the product and any combination thereof. The flavor composition can be a liquid, dry powder, spray, paste, suspension and any combination thereof.

As used herein "food product" refers to an ingestible product, such as, but not limited to, human food, animal (pet) foods, and pharmaceutical compositions.

As used herein "flavor composition" refers to at least one, two, three, four, five, or more compounds or biologically acceptable salts thereof that modulate, including enhancing, multiplying, potentiating, decreasing, suppressing, or inducing, the tastes, smells and/or flavors of a natural or synthetic tastant, flavoring agent, taste profile, flavor profile and/or texture profile in an animal or a human. In certain embodiments, the flavor composition comprises a combination of compounds or biologically acceptable salts thereof. In certain embodiments, the flavor composition includes one or more excipients.

As used herein "savory flavor" refers to a savory, "mouthwatering," sensation. In certain embodiments, a savory flavor is induced by one or more combination of umami tastants, for example, MSG (monosodium glutamate) in an animal or a human.

In certain embodiments, "wet soup category" means wet/liquid soups regardless of concentration or container, including frozen soups. For the purpose of this definition "soup(s)"

means a food prepared from meat, poultry, fish, vegetables, grains, fruit and/or other ingredients, cooked in a liquid which may include visible pieces of some or all of these ingredients. It may be clear (as a broth) or thick (as a chowder), smooth, pureed or chunky, ready-to-serve, semi-condensed or condensed and may be served hot or cold, as a first course or as the main course of a meal or as a between meal snack (sipped like a beverage). Soup may be used as an ingredient for preparing other meal components and may range from broths (consomme) to sauces (cream or cheese-based soups).

As used herein, "dehydrated and culinary food category" means: (i) cooking aid products such as: powders, granules, pastes, concentrated liquid products, including concentrated bouillon, bouillon and bouillon like products in pressed cubes, tablets or powder or granulated form, which are sold separately as a finished product or as an ingredient within a product, sauces and recipe mixes (regardless of technology); (ii) meal solution products such as: dehydrated and freeze dried soups, including dehydrated soup mixes, dehydrated instant soups, dehydrated ready-to-cook soups, dehydrated or ambient preparations of ready-made dishes, meals and single serve entrees including pasta, potato and rice dishes; and (iii) meal embellishment products such as: condiments, marinades, salad dressings, salad toppings, dips, breading, batter mixes, shelf stable spreads, barbecue sauces, liquid recipe mixes, concentrates, sauces or sauce mixes, including recipe mixes for salad, sold as a finished product or as an ingredient within a product, whether dehydrated, liquid or frozen.

As used herein, "beverage category" means beverages, beverage mixes and concentrates, including but not limited to, alcoholic and non-alcoholic ready to drink and dry powdered beverages. Other examples of foods and beverages wherein compounds according to the application may be incorporated included by way of example carbonated and non-carbonated beverages, e.g., sodas, fruit or vegetable juices, alcoholic and non-alcoholic beverages, confectionary products, e.g., salad dressings, and other condiments, cereal, and other breakfast foods, canned fruits and fruit sauces and the like.

As used herein, "frozen food category" means chilled or frozen food products. Non-limiting examples of food products of the frozen food category include ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, frozen ready meals, frozen pizza, chilled pizza, frozen soup, frozen pasta, frozen processed red meat, frozen processed poultry, frozen processed fish/seafood, frozen vegetables, frozen processed vegetables, frozen meat substitutes, frozen potatoes, frozen bakery products and frozen desserts.

As used herein, "snack food category" generally refers to any food that can be a light informal meal including, but not limited to sweet and savory snacks and snack bars. Examples of snack foods include, but are not limited to, fruit snacks, chips/crisps, extruded snacks, tortilla/corn chips, popcorn, pretzels, nuts and other sweet and savory snacks. Examples of snack bars include, but are not limited to granola/muesli bars, breakfast bars, energy bars, fruit bars and other snack bars.

As used herein, "meat food product" refers generally to a food product made by processing the edible remains of any dead animal, including birds, fish, crustaceans, shellfish and mammals. Meat food products include, without limitation, for example, prepared beef, lamb, pork, poultry or seafood products. For example, meat food products include bologna, frankfurters, sausage, luncheon, deli slices, loaves, bacon, meatballs, fish sticks, chicken fingers, and ground meats, e.g., meatloaf, meatballs and hamburgers.

As used herein, "simulated meat food product" includes, without limitation, for example, a meat alternative, meat analog, soy burger, soy bologna, soy frankfurter, soy sausage, soy luncheon loaves, soy bacon and soy meatball.

As used herein, "food product source" refers generally to the raw products from which a food product is made. In certain embodiments, the food product source is a vegetable, fruit or any other plant material. In certain embodiments, the plant material is cacao, cocoa beans, or cocoa liquor. In other embodiments, the food product source comprises the remains of any dead animal, including birds, fish, crustaceans, shellfish and mammals.

2. Peptide Compounds

The present application relates to flavor compositions that include at least one, two, three, four, five or more peptide compounds. In certain non-limiting embodiments, the peptide is a dipeptide, tripeptide or combination thereof. The flavor compositions can be used to enhance or modify the taste or flavor of various edible compositions such as sweet goods and savory goods. The flavor compositions can include combinations of compounds, and can be added to edible compositions in various delivery system formats.

In certain embodiments of the present application, the flavor composition comprises a dipeptide comprising a pyroglutamic acid residue (pGlu) and a second amino acid residue. In certain embodiments the second amino acid is a hydrophobic amino acid residue. In certain embodiments, the hydrophobic amino acid is selected from the group consisting of glycine (Gly), alanine (Ala), valine (Val), leucine (Leu), isoleucine (Ile), proline (Pro), phenylalanine (Phe), methionine (Met), tyrosine (Tyr) and tryptophan (Trp). In certain embodiments, the second amino acid residue is selected from the group consisting of alanine (Ala), arginine (Arg), asparagine (Asn), aspartic acid (aspartate, Asp), cysteine (Cys), glutamine (Gln), glutamic acid (glutamate, Glu), glycine (Gly), histidine (His), isoleucine (Ile), leucine (Leu), lysine (Lys), methionine (Met), phenylalanine (Phe), proline (Pro), serine (Ser), threonine (Thr), tryptophan (Trp), tyrosine (Tyr) and valine (Val).

In certain embodiments of the present application, the flavor composition comprises a tripeptide comprising a pyroglutamic acid (pGlu) residue in combination with an amino acid selected from the group consisting of a valine (Val), leucine (Leu), isoleucine (Ile), cysteine (Cys) and proline; and a third amino acid residue. In certain embodiments the third amino acid is a hydrophobic amino acid residue. In certain embodiments, the hydrophobic amino acid is selected from the group consisting of glycine (Gly), alanine (Ala), valine (Val), leucine (Leu), isoleucine (Ile), proline (Pro), phenylalanine (Phe), methionine (Met), tyrosine (Tyr) and tryptophan (Trp). In certain embodiments, the third amino acid residue is selected from the group consisting of alanine (Ala), arginine (Arg), asparagine (Asn), aspartic acid (aspartate, Asp), cysteine (Cys), glutamine (Gln), glutamic acid (glutamate, Glu), glycine (Gly), histidine (His), isoleucine (Ile), leucine (Leu), lysine (Lys), methionine (Met), phenylalanine (Phe), proline (Pro), serine (Ser), threonine (Thr), tryptophan (Trp), tyrosine (Tyr) and valine (Val).

In certain embodiments of the present application, the flavor composition comprises a dipeptide comprising a γ-glutamic acid (γGlu) residue and a second amino acid. In certain embodiments, the second amino acid is a hydrophobic amino acid residue. In certain embodiments, the hydrophobic amino acid is selected from the group consisting of glycine (Gly), alanine (Ala), valine (Val), leucine (Leu), isoleucine (Ile), proline (Pro), phenylalanine (Phe), methionine (Met), tyrosine (Tyr) and tryptophan (Trp). In certain embodiments, the second amino acid residue is selected from the group consisting of alanine (Ala), arginine (Arg), asparagine (Asn), aspartic acid (aspartate, Asp), cysteine (Cys), glutamine (Gln), glutamic acid (glutamate, Glu), glycine (Gly), histidine (His), isoleucine (Ile), leucine (Leu), lysine (Lys), methionine (Met), phenylalanine (Phe), proline (Pro), serine (Ser), threonine (Thr), tryptophan (Trp), tyrosine (Tyr) and valine (Val).

In certain embodiments of the present application, the flavor composition comprises a tripeptide comprising a γ-glutamic acid residue (γGlu) in combination with an amino acid selected from the group consisting of a valine (Val), leucine (Leu), isoleucine (Ile), cysteine (Cys) and proline (Pro); and a third amino acid. In certain embodiments, the third amino acid is a hydrophobic amino acid residue. In certain embodiments, the hydrophobic amino acid is selected from the group consisting of glycine (Gly), alanine (Ala), valine (Val), leucine (Leu), isoleucine (Ile), proline (Pro), phenylalanine (Phe), methionine (Met), tyrosine (Tyr) and tryptophan (Trp). In certain embodiments, the third amino acid residue is selected from the group consisting of alanine (Ala), arginine (Arg), asparagine (Asn), aspartic acid (aspartate, Asp), cysteine (Cys), glutamine (Gln), glutamic acid (glutamate, Glu), glycine (Gly), histidine (His), isoleucine (Ile), leucine (Leu), lysine (Lys), methionine (Met), phenylalanine (Phe), proline (Pro), serine (Ser), threonine (Thr), tryptophan (Trp), tyrosine (Tyr) and valine (Val).

In certain embodiments of the application, the tripeptide flavor composition comprises the amino acids pyroglutamic acid, valine and leucine (pGlu-Val-Leu). In certain embodiments, the pGlu-Val-Leu tripeptide has a molecular weight of 341.41.

In certain embodiments, the tripeptide flavor composition comprises the amino acids pyroglutamic acid, valine, and valine (pGlu-Val-Val).

In certain embodiments, the tripeptide flavor composition comprises the amino acids pyroglutamic acid, valine, and cysteine (pGlu-Val-Cys).

In certain embodiments, the dipeptide flavor composition comprises the amino acids pyroglutamic acid and valine (pGlu-Val).

In certain embodiments of the application, the dipeptide flavor composition comprises the amino acids pyroglutamic acid and cysteine (pGlu-Cys).

In certain embodiments of the application, the tripeptide flavor composition comprises the amino acids pyroglutamic acid, cysteine and glycine (pGlu-Cys-Gly).

In certain embodiments of the application, the tripeptide flavor composition comprises the amino acids pyroglutamic acid, cysteine and cysteine (pGlu-Cys-Cys).

In certain embodiments of the application, the tripeptide flavor composition comprises the amino acids pyroglutamic acid, cysteine and valine (pGlu-Cys-Val).

In certain embodiments of the application, the peptide flavor composition is selected from the group consisting of Phe-Leu/Ile, Leu/Ile-Val-Glu, Phe-Val-Asp, Val-Asp-Leu/Ile-Leu/Ile, Leu-Phe-Arg-Val, Phe-Phe, Val-Phe-Val, Phe-Leu/Ile-Val, 11-OH-hydroxyjasmonic acid, Leu/Ile-Leu/Ile-Gly, Phe-Leu/Ile-Gly, Phe-Asp-Val, Phe-Tyr, Leu/Ile-Val, Phe-Leu/Ile, Gln-Val-Leu, Glu-Val-Leu, pGlu-Phe, pGlu-Gly-Ala-Ile-Phe, pGlu-Pro-Gln, pGlu-Pro-Ser, pGlu-Pro-Glu, pGlu-Pro, pGlu-Val-Leu-Leu, pGlu-Leu-Leu, pGlu-Val-Gln, pGlu-Val-Glu, pGlu-Val-Val-Val, pGlu-Val-Ile, pGlu-Val-Pro, pGlu-Val-Ala, pGlu-Leu, pGlu-Val-Gly, γGlu-Val-Gly, γGlu-Val, γGlu-Val-Leu, γGlu-Cys-Gly and combinations thereof.

In certain embodiments of the present application, the flavor composition comprises a peptide comprising one, two, three, four, five or more amino acids each independently selected from the group consisting of glycine (Gly), alanine (Ala), valine (Val), leucine (Leu), isoleucine (Ile), proline (Pro), arginine (Arg), asparagine (Asn), aspartic acid (aspartate, Asp), cysteine (Cys), glutamine (Gln), glutamic acid (glutamate, Glu), histidine (His), lysine (Lys), methionine (Met), phenylalanine (Phe), serine (Ser), threonine (Thr), tryptophan (Trp) and tyrosine (Tyr).

In certain embodiments of the present application, the flavor composition comprises a peptide comprising a compound of formula I;

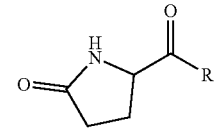

wherein R is selected from the group consisting of:

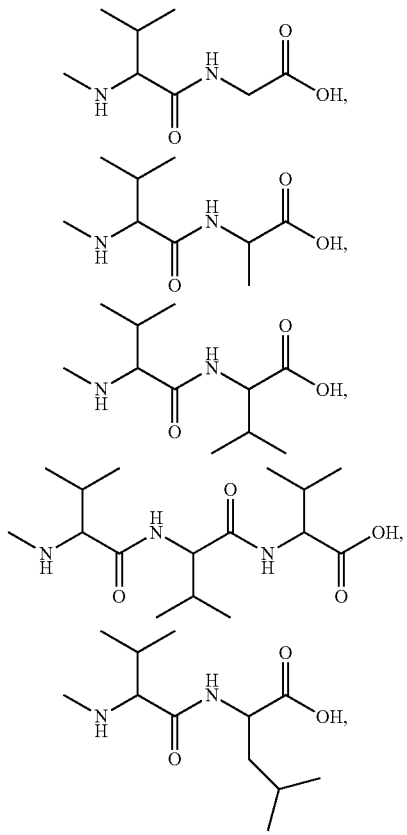

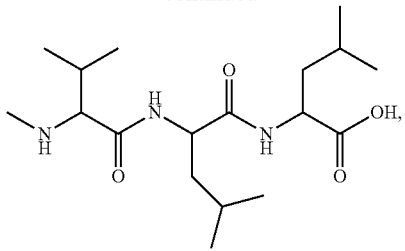
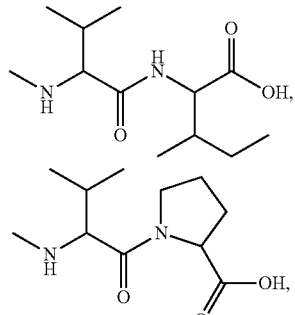
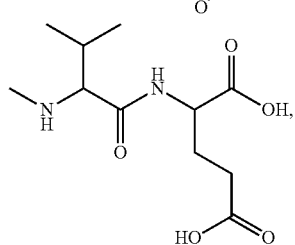
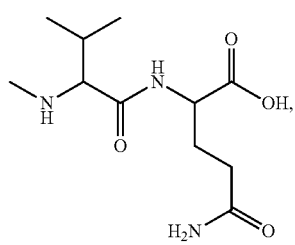
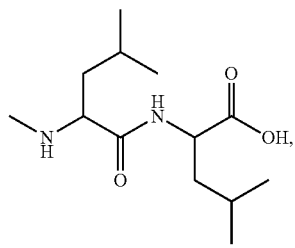
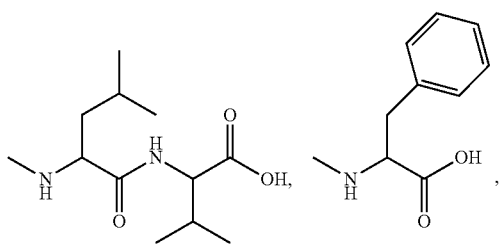

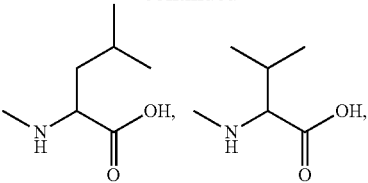

and combinations thereof.

In certain embodiments, the peptide compounds of the present application comprise a salt of the peptide, for example, but not limited to, an acetate salt, a TFA salt, or a formate salt. In certain embodiments, the peptide salt comprises an anion (−) (for example, but not limited to, $Cl^-$, $F^-$, $Br^-$, $O_2^-$, $Co_3^{2-}$, $HCO_3^-$, $OH^-$, $NO_3^-$, $PO_4^{3-}$, $SO_4^{2-}$, $CH_3COO^-$, $HCOO^-$, $C_2O_4^{2-}$ and $CN^-$) bonded via an ionic bond with a cation (+) (for example, but not limited to, $Al^{3+}$, $Ca^{2+}$, $Na^+$, $K^+$, $Cu^{2+}$, $Fe^{3+}$, $Mg^{2+}$, $NH^{4+}$, $H_3O^+$, $Hg_2^{2+}$). In other embodiments, the peptide salt comprises a cation (+) bonded via an ionic bond with an anion (−).

In certain embodiments, the ionic species of the peptide salt act in conjunction with other ionic tastants to modify a sensory impression of said tastants. For example, in some embodiments, the peptide compound is combined with NaCl and/or KCl to provide a salty taste impression that has a higher level of intensity than a composition comprising NaCl and/or KCl in the absence of the peptide.

In certain embodiments, the peptide compound can be combined with a salt or salt mixture. The salt or salt mixture can comprise inorganic, organic, monoatomic as well as polyatomic ions. In certain embodiments, the salts are nontoxic and edible. In certain embodiments, the salt or salt mixtures are inorganic salts, for example, inorganic salts comprising halogen anions or phosphate ions, alkali or earth alkali metal salts. In certain embodiments, the salts are cationic salts such as, but not limited to, NaCl, KCl and $Na_3PO_4$. In certain embodiments, the salts are anionic salts such as, but not limited to acetate salt, TFA salt, and formate salt.

3. Flavor Compositions

The flavor compositions of the present application can be used to enhance or modify the sensory experience of various edible compositions such as sweet goods and savory goods. The flavor compositions can include combinations of compounds, and can be added to edible compositions in various delivery system formats.

In certain embodiments, the application relates to methods for modulating the flavor of an edible product comprising: a) providing at least one comestible food product, or a precursor thereof, and b) combining the comestible food product or precursor thereof with at least a salty, umami, kokumi, bitter, astringent, flinty/mineral, sweet, sour, metallic, numbing and/or savory flavor modulating amount of at least one, two, three, four, fiver or more flavor composition(s), or any of its subgenuses, for example, one, two three, four, five or more peptide compounds, such as a dipeptide compound(s) and/or a tripeptide compound(s), or a comestibly acceptable salt thereof, so as to form a modified edible food product.

In certain embodiments, the flavor compositions of the present application can enhance the salty taste, umami taste, bitter taste, sweet taste, sour taste, kokumi flavor, flinty/mineral flavor, metallic flavor, numbing mouthfeel, astringent mouthfeel and/or savory flavor of a food product, such as, for example, an edible composition including pet foods, pharmaceutical compositions and human foods, such as soup, a confection, and/or a snack food. In certain embodiments, the flavor compositions of the present application can be used to modify, enhance or decrease the salty taste, umami taste, bitter taste, sweet taste, sour taste, kokumi flavor, flinty/mineral flavor, metallic flavor, numbing mouthfeel, astringent mouthfeel and/or savory flavor of one or more of the following subgenuses of comestible compositions: confectioneries, bakery products, ice creams, dairy products, savory snacks, snack bars, meal replacement products, ready meals, soups, pastas, noodles, canned foods, frozen foods, dried foods, chilled foods, oils and fats, baby foods, or spreads, or a mixture thereof.

In certain embodiments of the application, an edible composition can be produced that contains a sufficient amount of at least one, two, three, four, five or more flavor composition(s), or its various subgenuses described herein, for example a peptide compound(s), such as a dipeptide compound(s) and/or a tripeptide compound(s), to produce a composition having the desired flavor, taste and/or mouthfeel characteristics such as "salty" and/or "umami" and/or "kokumi" and/or "savory" and/or "bitter" and/or "sweet" and/or "sour" and/or "flinty/mineral" and/or "metallic" and/or "numbing" and/or "astringent" characteristic.

In certain embodiments, at least a taste and/or flavor and/or mouthfeel modulating amount of one, two, three, four, five or more of the flavor compositions of the present application can be added to the edible food product, so that the taste and/or flavor and/or mouthfeel, for example, salty taste and/or savory flavor, modified edible food product has an increased or decreased taste and/or flavor and/or mouthfeel, for example, salty taste and/or savory flavor, as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide a clean salty taste. In certain embodiments, the salty taste is not associated with an umami taste. In certain embodiments of the present application, the flavor composition is added to a food product in an amount effective to increase a saltiness aftertaste.

In certain embodiments of the present application, the flavor composition is admixed with a food product comprising a salt, for example, sodium chloride and/or potassium chloride, wherein the flavor composition is admixed in an amount effective to provide a clean salty taste while reducing the concentration of salt in the food product. In certain embodiments, the concentration of salt in the food product is reduced by between about 1 and about 99%, between about 10 and about 90%, between about 20 and about 80%, between about 30 and about 70%, between about 40 and about 60%, or about 50% compared to a food product that has not been admixed with the flavor composition.

In certain embodiments of the application, an edible composition can be produced that contains a sufficient amount of at least one, two, three, four, five or more flavor composition(s), or its various subgenuses described herein, for example a peptide compound(s), such as a dipeptide compound(s) and/or a tripeptide compound(s), to produce a composition having the desired flavor or taste characteristics such as an "umami" taste.

In certain embodiments, at least an umami taste modulating amount of one, two, three, four, five or more of the flavor compositions of the present application can be added to the edible food product, so that the umami taste modified edible food product has an increased or decreased umami taste as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide an umami taste.

In certain embodiments of the application, an edible composition can be produced that contains a sufficient amount of at least one, two, three, four, five or more flavor composition(s), or its various subgenuses described herein, for example a peptide compound(s), such as a dipeptide compound(s) and/or a tripeptide compound(s), to produce a composition having the desired flavor or taste characteristics such as a "bitter" taste.

In certain embodiments, at least a bitter taste modulating amount of one, two, three, four, five or more of the flavor compositions of the present application can be added to the edible food product, so that the bitter taste modified edible food product has an increased or decreased bitter taste as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide a bitter taste.

In certain embodiments of the application, an edible composition can be produced that contains a sufficient amount of at least one, two, three, four, five or more flavor composition(s), or its various subgenuses described herein, for example a peptide compound(s), such as a dipeptide compound(s) and/or a tripeptide compound(s), to produce a composition having the desired flavor or taste characteristics such as a "sweet" taste.

In certain embodiments, at least a sweet taste modulating amount of one, two, three, four, five or more of the flavor compositions of the present application can be added to the edible food product, so that the sweet taste modified edible food product has an increased or decreased sweet taste as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide a sweet taste.

In certain embodiments of the application, an edible composition can be produced that contains a sufficient amount of at least one, two, three, four, five or more flavor composition(s), or its various subgenuses described herein, for example a peptide compound(s), such as a dipeptide compound(s) and/or a tripeptide compound(s), to produce a composition having the desired flavor or taste characteristics such as a "sour" taste.

In certain embodiments, at least a sour taste modulating amount of one, two, three, four, five or more of the flavor compositions of the present application can be added to the edible food product, so that the sour taste modified edible food product has an increased or decreased sour taste as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide a sour taste.

In certain embodiments of the application, an edible composition can be produced that contains a sufficient amount of at least one, two, three, four, five or more flavor composition(s), or its various subgenuses described herein, for example a peptide compound(s), such as a dipeptide compound(s) and/or a tripeptide compound(s), to produce a composition having the desired flavor or taste characteristics such as a "kokumi" flavor.

In certain embodiments, at least a kokumi taste modulating amount of one, two, three, four, five or more of the flavor compositions of the present application can be added to the edible food product, so that the kokumi flavor modified edible food product has an increased or decreased kokumi flavor as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide a kokumi flavor.

In certain embodiments of the application, an edible composition can be produced that contains a sufficient amount of at least one, two, three, four, five or more flavor composition(s), or its various subgenuses described herein, for example a peptide compound, such as a dipeptide compound(s) and/or a tripeptide compound(s), to produce a composition having the desired flavor or taste characteristics such as a "savory" flavor.

In certain embodiments, at least a flinty/mineral flavor modulating amount of one, two, three, four, five or more of the flavor compositions of the present application can be added to the edible food product, so that the flinty/mineral flavor modified edible food product has an increased or decreased flinty/mineral flavor as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide a savory flavor.

In certain embodiments of the application, an edible composition can be produced that contains a sufficient amount of at least one, two, three, four, five or more flavor composition(s), or its various subgenuses described herein, for example a peptide compound, such as a dipeptide compound(s) and/or a tripeptide compound(s), to produce a composition having the desired flavor or taste characteristics such as a "flinty/mineral" flavor.

In certain embodiments, at least a flinty/mineral flavor modulating amount of one, two, three, four, five or more of the flavor compositions of the present application can be added to the edible food product, so that the flinty/mineral flavor modified edible food product has an increased or decreased flinty/mineral flavor as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide a flinty/mineral flavor.

In certain embodiments of the application, an edible composition can be produced that contains a sufficient amount of at least one, two, three, four, five or more flavor composition(s), or its various subgenuses described herein, for example a peptide compound(s), such as a dipeptide compound(s) and/or a tripeptide compound(s), to produce a composition having the desired flavor or taste characteristics such as a "metallic" flavor.

In certain embodiments, at least a metallic flavor modulating amount of one, two, three, four, five or more of the flavor compositions of the present application can be added to the edible food product, so that the metallic flavor modified edible food product has an increased or decreased metallic flavor as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide a metallic flavor.

In certain embodiments, the peptide compounds of the present application provide a sour taste to a chocolate confection. In certain embodiments, the peptide compounds are admixed with a chocolate confectionary to provide an acetic acid sourness characteristic to the chocolate confectionery. In certain embodiments, the acetic acid sourness is an acetic acid sourness characteristic associated with chocolate confectionery products made from fully fermented cocoa beans sourced from West Africa.

In certain embodiments, adding peptide compounds of the present application to chocolate confectionery products made from cacao and/or cocoa beans that have been sourced from West Africa but under-fermented, or from cacao and/or cocoa beans that have been sourced from other geographies, provides the same taste and flavor profiles as chocolate confectionery made from fully fermented West African cocoa beans.

In certain embodiments, the flavor composition, or any of its subgenuses, for example, a peptide compound, such as a dipeptide compound and/or a tripeptide compound, or a comestibly acceptable salt thereof, of the present application, can be combined with an edible composition in an amount effective to modify, enhance or otherwise alter a taste or taste profile of the edible composition. The modification can include, for example, an increase or decrease in one or more of a sweet, sour, salty, bitter, kokumi and/or umami taste of the composition.

In certain embodiments, the flavor composition, or any of its subgenuses, for example, a peptide compound, such as a dipeptide compound and/or a tripeptide compound, or a comestibly acceptable salt thereof, of the present application, can be combined with an edible composition in an amount effective to modify, enhance or otherwise alter a flavor or flavor profile of the edible composition. The modification can include, for example, an increase or decrease in the perception of one or more sensory stimuli, such as, for example, one or more of taste (gustatory), smell (olfactory), touch (tactile) and temperature (thermal).

In certain embodiments, the flavor composition, or any of its subgenuses, for example, a peptide compound, such as a dipeptide compound and/or a tripeptide compound, or a comestibly acceptable salt thereof, of the present application, can be combined with an edible composition in an amount effective to modify, enhance or otherwise alter a texture profile of the edible composition. The texture benefit can include, for example, an increased clean mouthfeel sensory attribute. In certain embodiments, admixing the peptide compounds of the present application with a chocolate confectionary reduces a fatty mouth coating texture.

In certain embodiments of the application, an edible composition can be produced that contains a sufficient amount of at least one, two, three, four, five or more flavor composition(s), or its various subgenuses described herein, for example a peptide compound(s), such as a dipeptide compound(s) and/or a tripeptide compound(s), to produce a composition having the desired flavor or taste characteristics such as an "astringent" mouthfeel.

In certain embodiments, at least an astringent mouthfeel modulating amount of one, two, three, four, five or more of the flavor compositions of the present application can be added to the edible food product, so that the astringent mouthfeel modified edible food product has an increased or decreased astringent mouthfeel as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide an astringent mouthfeel.

In certain embodiments of the application, an edible composition can be produced that contains a sufficient amount of at least one, two, three, four, five or more flavor composition, or its various subgenuses described herein, for example a peptide compound(s), such as a dipeptide compound(s) and/or a tripeptide compound(s), to produce a composition having the desired flavor or taste characteristics such as an "numbing" mouthfeel.

In certain embodiments, at least a numbing mouthfeel modulating amount of one, two, three, four, five or more of the flavor compositions of the present application can be added to the edible food product, so that the numbing mouthfeel modified edible food product has an increased or decreased numbing mouthfeel as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide a numbing mouthfeel.

The concentration of flavor composition admixed with an edible food product to modulate or improve the flavor of the edible food product or composition can vary dependent on variables, such as, for example, the specific type of edible composition, what salty, umami, kokumi, savory, bitter, sweet, sour, flinty/mineral, metallic, numbing, and/or astringent compounds are already present in the edible food product and the concentrations thereof, the amount of MSG already present in the food product, and the enhancer effect of the particular flavor composition on such salty, umami, kokumi, savory, bitter, sweet, sour, flinty/mineral, metallic, numbing, and/or astringent compounds.

In certain embodiments, admixing the flavor compositions of the present application with an edible food product modulates, for example, induces, enhances or inhibits, the salty taste, umami taste, bitter taste, sweet taste, sour taste, kokumi flavor, flinty/mineral flavor, metallic flavor, numbing mouthfeel, astringent mouthfeel and/or savory flavor (or other taste or flavor properties) of other natural or synthetic salty tastants, umami tastants, bitter tastants, astringent flavorant and/or savory flavorants, for example, NaCl and/or MSG.

A broad range of concentrations of the flavor compositions can be employed to provide such salty taste, umami taste, bitter taste, astringent mouthfeel and/or savory flavor modification. In certain embodiments of the present application, the flavor composition is admixed with a food product wherein the flavor composition is present in an amount of from about 0.001 to about 500 ppt, or from about 0.005 to about 250 ppt, or from about 0.01 to about 200 ppt, or from about 0.05 to about 150 ppt, or from about 0.1 to about 100 ppt, or from about 0.5 to about 50 ppt, and values in between.

In certain embodiments, the flavor composition is admixed with a food product at a concentration of from about 0.1 to about 100 ppt, and values in between. In certain embodiments, the flavor composition is admixed with a food product at a concentration of from about 0.1 to about 50 ppt, and values in between. In certain embodiments, the flavor composition is admixed with a food product at a concentration of from about 0.1 to about 10 ppt, and values in between.

In certain embodiments, the flavor composition is admixed with a food product at a concentration of from about 0.1 to about 100 ppt, or from about 1 to about 90 ppt, or from about 10 to about 80 ppt, or from about 20 to about 70 ppt, or from about 30 to about 60 ppt, or from about 40 to about 50 ppt, and values in between.

In certain embodiments, the flavor composition is admixed with a food product at a concentration of from about 0.1 to about 1 ppt, from about 1 to about 5 ppt, from about 5 to about 10 ppt, from about 10 to about 15 ppt, from about 15 to about 20 ppt, from about 20 to about 25 ppt, from about 25 to about 30 ppt, from about 30 to about 35 ppt, from about 35 to about 40 ppt, from about 40 to about 45 ppt, from about 45 to about 50 ppt, from about 50 to about 55 ppt, from about 55 to about 60 ppt, from about 60 to about 65 ppt, from about 65 to about 70 ppt, from about 70 to about 75 ppt, from about 75 to about 80 ppt, from about 80 to about 85 ppt, from about 85 to about 90 ppt from about 90 to about 95 ppt, or from about 95 to about 100 ppt, and values in between.

In certain embodiments of the present application, the flavor composition is admixed with a food product wherein the flavor composition is present in an amount of from about 0.001 to about 500 ppb, or from about 0.005 to about 250 ppb, or from about 0.01 to about 200 ppb, or from about 0.05 to about 150 ppb, or from about 0.1 to about 100 ppb, or from about 0.5 to about 50 ppb, and values in between.

In certain embodiments, the flavor composition is admixed with a food product at a concentration of from about 0.01 to about 10000 ppb, and values in between. In certain embodiments, the flavor composition is admixed with a food product at a concentration of from about 0.1 to about 1000 ppb, and values in between. In certain embodiments, the flavor composition is admixed with a food product at a concentration of from about 1 to about 100 ppb, and values in between. In certain embodiments, the flavor composition is admixed with a food product at a concentration of from about 10 to about 50 ppb, and values in between. In certain embodiments, the flavor composition is admixed with a food product at a concentration of from about 0.1 to about 10 ppb, and values in between.

In certain embodiments, the flavor composition is admixed with a food product at a concentration of from about 0.1 to about 10000 ppb, or from about 1 to about 5000 ppb, or from about 10 to about 2000 ppb, or from about 20 to about 1500 ppb, or from about 30 to about 1000 ppb, or from about 40 to about 500 ppb, or from about 50 to about 250 ppb, or from about 60 to about 200 ppb, or from about 70 to about 150 ppb, or from about 80 to about 100 ppb, and values in between.

In certain embodiments, the flavor composition is admixed with a food product at a concentration of from about 0.1 to about 1 ppb, from about 1 to about 5 ppb, from about 5 to about 10 ppb, from about 10 to about 15 ppb, from about 15 to about 20 ppb, from about 20 to about 25 ppb, from about 25 to about 30 ppb, from about 30 to about 35 ppb, from about 35 to about 40 ppb, from about 40 to about 45 ppb, from about 45 to about 50 ppb, from about 50 to about 55 ppb, from about 55 to about 60 ppb, from about 60 to about 65 ppb, from about 65 to about 70 ppb, from about 70 to about 75 ppb, from about 75 to about 80 ppb, from about 80 to about 85 ppb, from about 85 to about 90 ppb from about 90 to about 95 ppb, from about 95 to about 100 ppb, from about 100 to about 150 ppb, from about 150 to about 200 ppb, from about 200 to about 250 ppb, from about 250 to about 300 ppb, from about 300 to about 350 ppb, from about 350 to about 400 ppb, from about 400 to about 450 ppb, from about 450 to about 500 ppb, from about 500 to about 550 ppb, from about 550 to about 600 ppb, from about 600 to about 650 ppb, from about 650 to about 700 ppb, from about 700 to about 750 ppb, from about 750 to about 800 ppb, from about 800 to about 850 ppb, from about 850 to about 900 ppb, from about 900 to about 950 ppb, or from about 950 to about 1000 ppb, and values in between.

In certain embodiments, the flavor composition is admixed with a food product at a concentration of about 0.1 ppb, 0.5 ppb, 1 ppb, 10 ppb, 40 ppb, 50 ppb, 100 ppb, 250 ppb, 267 ppb, 1000 ppb or 1150 ppb.

In certain embodiments, the range of concentrations can include from about 1 ppb to about 100 ppb, less than 100 ppb, at least 30 ppb, and from about 30 ppb to about 1% w/w by weight of the edible composition.

In certain embodiments, the flavor composition comprises a pGlu-Val-Leu, pGlu-Val, pGlu-Val-Val, pGlu-Val-Cys or pGlu-Pro-Glu peptide, or combination thereof, wherein the peptide, or combination of peptides, is admixed with a food product at a concentration of about 0.1 ppb, 0.5 ppb, 1 ppb, 10 ppb, 40 ppb or 50 ppb.

In certain embodiments, the flavor composition comprises a pGlu-Val-Leu peptide wherein the peptide is admixed with a food product at a concentration of about 0.1 ppb, 0.5 ppb, 1 ppb, 10 ppb, 40 ppb, 50 ppb, 250 ppb, 267 ppb, 1000 ppb or 1150 ppb.

In certain embodiments, the flavor composition comprises a pGlu-Val-Cys peptide wherein the peptide is admixed with a food product at a concentration of about 1 ppb, 10 ppb, 100 ppb or 1000 ppb.

In certain embodiments, the flavor composition comprises a pGlu-Cys, pGlu-Cys-Gly, pGlu-Cys-Cys or pGlu-Cys-Val peptide, or combination thereof, wherein the peptide, or combination of peptides, is admixed with a food product at a concentration of about 1 ppb, 10 ppb or 100 ppb, and values in between.

In certain embodiments, the flavor composition is admixed with a food product in an amount effective to increase the salt perception of a salt reference by about 1 to about 10 fold, or from about 1.25 to about 8 fold, or from about 1.5 to about 6 fold, or from about 1.75 to about 4 fold, or from about 2 to about 2.5 fold, and values in between. In certain embodiments, the food product comprises the salt reference. In certain embodiments, the salt reference is the salt perception of the food product prior to admixing the food product with the flavor composition.

In certain embodiments of the present application, the flavor composition is admixed with a food product wherein the flavor composition is present in an amount of from between about 0.1 to about 100 ppb, and values in between.

In certain embodiments of the present application, the flavor composition is admixed with a food product wherein the flavor composition is present in an amount of from about 0.001 ppm to about 100 ppm, or narrower alternative ranges from about 0.1 ppm to about 10 ppm, from about 0.01 ppm to about 30 ppm, from about 0.05 ppm to about 15 ppm, from about 0.1 ppm to about 5 ppm, or from about 0.1 ppm to about 3 ppm, and values in between.

In certain embodiments, the flavor composition is admixed with a food product at a concentration of from about 0.1 to about 100 ppm, and values in between. In certain embodiments, the flavor composition is admixed with a food product at a concentration of from about 0.1 to about 50 ppm, and values in between. In certain embodiments, the flavor composition is admixed with a food product at a concentration of from about 0.1 to about 10 ppm, and values in between.

In certain embodiments, the flavor composition is admixed with a food product at a concentration of from about 0.1 to about 100 ppm, or from about 1 to about 90 ppm, or from about 10 to about 80 ppm, or from about 20 to about 70 ppm, or from about 30 to about 60 ppm, or from about 40 to about 50 ppm, and values in between.

In certain embodiments, the flavor composition is admixed with a food product at a concentration of from about 0.1 to about 1 ppm, from about 1 to about 5 ppm, from about 5 to about 10 ppm, from about 10 to about 15 ppm, from about 15 to about 20 ppm, from about 20 to about 25 ppm, from about 25 to about 30 ppm, from about 30 to about 35 ppm, from about 35 to about 40 ppm, from about 40 to about 45 ppm, from about 45 to about 50 ppm, from about 50 to about 55 ppm, from about 55 to about 60 ppm, from about 60 to about 65 ppm, from about 65 to about 70 ppm, from about 70 to about 75 ppm, from about 75 to about 80 ppm, from about 80 to about 85 ppm, from about 85 to about 90 ppm from about 90 to about 95 ppm, or from about 95 to about 100 ppm, and values in between.

In certain embodiments, the flavor composition is admixed with a food product at a concentration of from about 0.0001 to about 99.9% weight/weight (w/w), and values in between. In certain embodiments, the flavor composition is admixed with a food product at a concentration of from about 0.0001 to about 1.0% w/w, and values in between. In certain embodiments, the flavor composition is admixed with a food product at a concentration of from about 0.0001 to about 0.5% w/w, and values in between.

In certain embodiments, the flavor composition is admixed with a food product at a concentration of from about 0.0001 to about 99.9% w/w, or from about 0.001 to about 99% w/w, or from about 0.01 to about 95% w/w, or from about 0.1 to about 90% w/w, or from about 0.5 to about 85% w/w, or from about 1 to about 80% w/w, or from about 1.5 to about 75% w/w, or from about 2 to about 70% w/w, or from about 2.5 to about 65% w/w, or from about 3 to about 60% w/w, or from about 3.5 to about 55% w/w, or from about 4 to about 50% w/w, or from about 5 to about 45% w/w, or from about 10 to about 40% w/w, or from about 15 to about 35% w/w, or from about 20 to about 30% w/w, and values in between.

In certain embodiments of the present application, the flavor composition is admixed with a food product wherein the flavor composition is present in an amount of from about 0.0000001 to about 99.999% weight/weight (w/w), or from about 0.00005 to about 75% w/w, or from about 0.0001 to about 50% w/w, or from about 0.0005 to about 25% w/w, or from about 0.001 to about 10% w/w, or from about 0.005 to about 5% w/w of the food product, and values in between.

In certain embodiments, the peptide compounds of the present application are blended together in various ratios or are blended together with other compounds to form various flavor compositions. In certain embodiments, the peptide compounds that are blended are peptides, such as for example, dipeptides, tripeptides, and/or combinations thereof. In certain embodiments, the peptide compounds and other compounds are blended together, wherein each of the peptide compounds and other compounds are present in an amount of from about 0.0000001 to about 99.999% weight/weight (w/w), or from about 0.00005 to about 75% w/w, or from about 0.0001 to about 50% w/w, or from about 0.0005 to about 25% w/w, or from about 0.001 to about 10% w/w, or from about 0.005 to about 5% w/w of the flavor composition, and values in between.

In certain embodiments, the flavor composition is admixed with a food product in an effective amount, such that a subject would be able to tell the food product apart from a food product prepared without the flavor composition, wherein the subject is a human being or animal in general, or in the case of formulation testing, as determined by a taste panel of at least one, two, three, four, five or more human taste testers, via procedures known in the art.

In certain embodiments, the flavor composition is admixed with a food product in an amount effective to increase or decrease a taste and/or flavor and/or mouthfeel in a subject that persists after the food product is no longer in contact with the mouth, tongue and/or throat of a subject. In certain embodiments, the increase or decrease persists for between about 0.5 and about 15 minutes, or between about 2 and about 13 minutes, or between about 4 and about 11 minutes, or between about 6 and about 9 minutes.

In certain embodiments, the peptides that are blended together in various ratios or are blended together with other compounds to form various flavor compositions, are peptide compounds, for example dipeptide and/or tripeptide compounds, of the present application. In certain embodiments, the flavor composition comprises one, two, three, four, five or more peptide compound(s) in combination with one or more additional compound with similar solubilities as the peptide compounds. Table 1 below provides non-limiting examples of flavor compositions comprising peptides, such as tripeptide and/or dipeptide compounds in combination with other additional compounds.

TABLE 1

| | Flavor Compositions ("Fl.") | | | |
|---|---|---|---|---|
| Ingredient | Fl. 1 % w/w | Fl. 2 % w/w | Fl. 3 % w/w | Fl. 4 % w/w |
| pGlu-Val-Leu | 0.0005-0.5 | 0-99.999 | 0-99.999 | 0-99.999 |
| pGlu-Val-Val | 0-99.999 | 0.005-5 | 0-99.999 | 0.003-0.005 |
| pGlu-Val | 0-99.999 | 0-99.999 | 0.0001-0.00001 | 0-99.999 |
| Gln-Val-Leu | 0-99.999 | 0-99.999 | 0-99.999 | 0-99.999 |
| Glu-Val-Leu | 0-99.999 | 0-99.999 | 0-99.999 | 0-99.999 |
| pGlu-Phe | 0-99.999 | 0-99.999 | 0-99.999 | 0-99.999 |
| pGlu-Gly-Ala-Ile-Phe | 0-99.999 | 0-99.999 | 0-99.999 | 0-99.999 |
| pGlu-Pro-Gln | 0-99.999 | 0-99.999 | 0-99.999 | 0-99.999 |
| pGlu-Pro-Ser | 0-99.999 | 0-99.999 | 0-99.999 | 0-99.999 |
| pGlu-Pro-Glu | 0-99.999 | 0-99.999 | 0-99.999 | 0-99.999 |
| pGlu-Pro | 0-99.999 | 0-99.999 | 0-99.999 | 0-99.999 |
| pGlu-Val-Leu-Leu | 0-99.999 | 0-99.999 | 0-99.999 | 0-99.999 |
| pGlu-Leu-Leu | 0-99.999 | 0-99.999 | 0-99.999 | 0-99.999 |
| pGlu-Val-Gln | 0-99.999 | 0-99.999 | 0-99.999 | 0-99.999 |
| pGlu-Val-Glu | 0-99.999 | 0-99.999 | 0-99.999 | 0-99.999 |
| pGlu-Val-Val-Val | 0-99.999 | 0-99.999 | 0-99.999 | 0-99.999 |
| pGlu-Val-Ile | 0-99.999 | 0-99.999 | 0-99.999 | 0-99.999 |
| pGlu-Val-Pro | 0-99.999 | 0-99.999 | 0-99.999 | 0-99.999 |
| pGlu-Val-Ala | 0-99.999 | 0-99.999 | 0-99.999 | 0-99.999 |
| pGlu-Leu | 0-99.999 | 0-99.999 | 0-99.999 | 0-99.999 |
| pGlu-Val-Gly | 0-99.999 | 0-99.999 | 0-99.999 | 0-99.999 |
| γGlu-Val-Gly | 0-99.999 | 0-99.999 | 0-99.999 | 0-99.999 |
| γGlu-Val | 0-99.999 | 0-99.999 | 0-99.999 | 0-99.999 |
| γGlu-Val-Leu | 0-99.999 | 0-99.999 | 0-99.999 | 0-99.999 |
| pGlu-Val-Cys | 0-99.999 | 0-99.999 | 0-99.999 | 0-99.999 |
| γGlu-Cys-Gly | 0-99.999 | 0-99.999 | 0-99.999 | 0-99.999 |
| pGlu-Cys | 0-99.999 | 0-99.999 | 0-99.999 | 0-99.999 |
| pGlu-Cys-Gly | 0-99.999 | 0-99.999 | 0-99.999 | 0-99.999 |
| pGlu-Cys-Cys | 0-99.999 | 0-99.999 | 0-99.999 | 0-99.999 |
| pGlu-Cys-Val | 0-99.999 | 0-99.999 | 0-99.999 | 0-99.999 |
| Hydrolyzed cocoa powder | 0-99.999 | 0-99.999 | 0-99.999 | 0-99.999 |
| Hydrolyzed wheat protein | 0-99.999 | 0-99.999 | 0-99.999 | 0-99.999 |
| Hydrolyzed soy protein | 0-99.999 | 0-99.999 | 0-99.999 | 0-99.999 |

TABLE 1-continued

| Flavor Compositions ("Fl.") | | | | |
|---|---|---|---|---|
| Vanilla Extract | 0-99.999 | 0-99.999 | 0-99.999 | 0-99.999 |
| Ethyl vanillin | 0-99.999 | 0-99.999 | 0-99.999 | 0-99.999 |
| Ethyl maltol | 0-99.999 | 0-99.999 | 0-99.999 | 0-99.999 |
| Isoamyl acetate | 0-99.999 | 0-99.999 | 0-99.999 | 0-99.999 |
| Ethyl acetate | 0-99.999 | 0-99.999 | 0-99.999 | 0-99.999 |
| Furaneol | 0-99.999 | 0-99.999 | 0-99.999 | 0-99.999 |
| Myrcene | 0-99.999 | 0-99.999 | 0-99.999 | 0-99.999 |
| Linalool | 0-99.999 | 0-99.999 | 0-99.999 | 0-99.999 |
| Citral | 0-99.999 | 0-99.999 | 0-99.999 | 0-99.999 |
| Geraniol | 0-99.999 | 0-99.999 | 0-99.999 | 0-99.999 |
| NaCl | 99.5-99.9995 | 0-99.999 | 2.5-5 | 0-99.999 |
| KCl | 0-99.999 | 99.5-99.9995 | 0-99.999 | 2.5-5 |
| Garlic flavor | 0-99.999 | 0-99.999 | 14-18 | 0-99.999 |
| Onion flavor | 0-99.999 | 0-99.999 | 0-99.999 | 12-15 |
| Beef Flavor | 0-99.999 | 0-99.999 | 70-80 | 0-99.999 |
| Chicken flavor | 0-99.999 | 0-99.999 | 0-99.999 | 65-75 |
| Acetic acid | 0-99.999 | 0-99.999 | 0-99.999 | 0-99.999 |
| Butyric acid | 0-99.999 | 0-99.999 | 0-99.999 | 0-99.999 |
| Citric acid | 0-99.999 | 0-99.999 | 0-99.999 | 0-99.999 |
| Lactic acid | 0-99.999 | 0-99.999 | 0-99.999 | 0-99.999 |
| Malic acid | 0-99.999 | 0-99.999 | 0-99.999 | 0-99.999 |
| Tartaric acid | 0-99.999 | 0-99.999 | 0-99.999 | 0-99.999 |
| Other base flavor compounds | 0-99.999 | 0-99.999 | 0-99.999 | 0-99.999 |

| Ingredient | Fl. 5 % w/w | Fl. 6 % w/w | Fl. 7 % w/w | Fl. 8 % w/w |
|---|---|---|---|---|
| pGlu-Val-Leu | 0-99.999 | 0-99.999 | 0.00001-0.0001 | 0.00007-0.0007 |
| pGlu-Val-Val | 0-99.999 | 0.0001-0.001 | 0-99.999 | 0-99.999 |
| pGlu-Val | 0.0005-0.005 | 0-99.999 | 0-99.999 | 0-99.999 |
| Gln-Val-Leu | 0-99.999 | 0-99.999 | 0-99.999 | 0-99.999 |
| Glu-Val-Leu | 0-99.999 | 0-99.999 | 0-99.999 | 0-99.999 |
| pGlu-Phe | 0-99.999 | 0-99.999 | 0-99.999 | 0-99.999 |
| pGlu-Gly-Ala-Ile-Phe | 0-99.999 | 0-99.999 | 0-99.999 | 0-99.999 |
| pGlu-Pro-Gln | 0-99.999 | 0-99.999 | 0-99.999 | 0-99.999 |
| pGlu-Pro-Ser | 0-99.999 | 0-99.999 | 0-99.999 | 0-99.999 |
| pGlu-Pro-Glu | 0-99.999 | 0-99.999 | 0-99.999 | 0-99.999 |
| pGlu-Pro | 0-99.999 | 0-99.999 | 0-99.999 | 0-99.999 |
| pGlu-Val-Leu-Leu | 0-99.999 | 0-99.999 | 0-99.999 | 0-99.999 |
| pGlu-Leu-Leu | 0-99.999 | 0-99.999 | 0-99.999 | 0-99.999 |
| pGlu-Val-Gln | 0-99.999 | 0-99.999 | 0-99.999 | 0-99.999 |
| pGlu-Val-Glu | 0-99.999 | 0-99.999 | 0-99.999 | 0-99.999 |
| pGlu-Val-Val-Val | 0-99.999 | 0-99.999 | 0-99.999 | 0-99.999 |
| pGlu-Val-Ile | 0-99.999 | 0-99.999 | 0-99.999 | 0-99.999 |
| pGlu-Val-Pro | 0-99.999 | 0-99.999 | 0-99.999 | 0-99.999 |
| pGlu-Val-Ala | 0-99.999 | 0-99.999 | 0-99.999 | 0-99.999 |
| pGlu-Leu | 0-99.999 | 0-99.999 | 0-99.999 | 0-99.999 |
| pGlu-Val-Gly | 0-99.999 | 0-99.999 | 0-99.999 | 0-99.999 |
| γGlu-Val-Gly | 0-99.999 | 0-99.999 | 0-99.999 | 0-99.999 |
| γGlu-Val | 0-99.999 | 0-99.999 | 0-99.999 | 0-99.999 |
| γGlu-Val-Leu | 0-99.999 | 0-99.999 | 0-99.999 | 0-99.999 |
| pGlu-Val-Cys | 0-99.999 | 0-99.999 | 0-99.999 | 0-99.999 |
| γGlu-Cys-Gly | 0-99.999 | 0-99.999 | 0-99.999 | 0-99.999 |
| pGlu-Cys | 0-99.999 | 0-99.999 | 0-99.999 | 0-99.999 |
| pGlu-Cys-Gly | 0-99.999 | 0-99.999 | 0-99.999 | 0-99.999 |
| pGlu-Cys-Cys | 0-99.999 | 0-99.999 | 0-99.999 | 0-99.999 |
| pGlu-Cys-Val | 0-99.999 | 0-99.999 | 0-99.999 | 0-99.999 |
| Hydrolyzed cocoa powder | 0-99.999 | 0-99.999 | 0-99.999 | 0-99.999 |
| Hydrolyzed wheat protein | 0-99.999 | 0-99.999 | 0-99.999 | 0-99.999 |
| Hydrolyzed soy protein | 0-99.999 | 0-99.999 | 0-99.999 | 0-99.999 |
| Vanilla Extract | 0-99.999 | 10-18 | 0-99.999 | 0-99.999 |
| Ethyl vanillin | 12-16 | 0-99.999 | 0-99.999 | 0-99.999 |
| Ethyl maltol | 0-99.999 | 0-99.999 | 0-99.999 | 0-99.999 |
| Isoamyl acetate | 0-99.999 | 0-99.999 | 2-3 | 0-99.999 |
| Ethyl acetate | 0-99.999 | 0-99.999 | 0-99.999 | 0-99.999 |
| Furaneol | 5-8 | 0-99.999 | 0-99.999 | 0-99.999 |
| Myrcene | 0-99.999 | 0-99.999 | 1-2 | 0-99.999 |
| Linalool | 0-99.999 | 1-3 | 0-99.999 | 0-99.999 |
| Citral | 0-99.999 | 0-99.999 | 0-99.999 | 0-99.999 |
| Geraniol | 0-99.999 | 1-3 | 0-99.999 | 0-99.999 |
| NaCl | 0-99.999 | 0-99.999 | 0-99.999 | 0-99.999 |
| KCl | 0-99.999 | 0-99.999 | 0-99.999 | 0-99.999 |
| Garlic flavor | 0-99.999 | 0-99.999 | 0-99.999 | 0-99.999 |
| Onion flavor | 0-99.999 | 0-99.999 | 0-99.999 | 0-99.999 |
| Beef Flavor | 0-99.999 | 0-99.999 | 0-99.999 | 0-99.999 |
| Chicken flavor | 0-99.999 | 0-99.999 | 0-99.999 | 0-99.999 |
| Acetic acid | 0-99.999 | 0-99.999 | 0-99.999 | 0-99.999 |

TABLE 1-continued

Flavor Compositions ("Fl.")

| | | | | |
|---|---|---|---|---|
| Butyric acid | 0-99.999 | 6-8 | 0-99.999 | 0-99.999 |
| Citric acid | 0-99.999 | 0-99.999 | 95-98 | 42-48 |
| Lactic acid | 50-65 | 70-80 | 0-99.999 | 0-99.999 |
| Malic acid | 0-99.999 | 0-99.999 | 0-99.999 | 28-32 |
| Tartaric acid | 0-99.999 | 0-99.999 | 0-99.999 | 20-25 |
| Other base flavor compounds | 0-99.999 | 0-99.999 | 0-99.999 | 0-99.999 |

4. Delivery Systems

In certain embodiments, the flavor compositions of the present application can be incorporated into a delivery system for use in edible compositions. In certain embodiments, the composition will comprise another flavor or taste modifier such as a salty, umami, bitter, astringent and/or savory tastant. Delivery systems can be liquid or solid, aqueous or non-aqueous. Delivery systems are generally adapted to suit the needs of the flavor composition and/or the edible composition into which the flavor composition will be incorporated.

The flavoring compositions can be employed in liquid form, dried form, and/or solid form. When used in dried form, suitable drying means such as spray drying can be used. Alternatively, a flavoring composition can be encapsulated or absorbed onto water soluble materials, including but not limited to materials such as cellulose, starch, sugar, maltodextrin, gum arabic and so forth. The actual techniques for preparing such dried forms are well-known in the art, and can be applied to the presently disclosed subject matter.

The flavoring compositions of the presently disclosed subject matter can be used in many distinct physical forms well known in the art to provide an initial burst of taste, flavor and/or texture; and/or a prolonged sensation of taste, flavor and/or texture. Without being limited thereto, such physical forms include free forms, such as spray dried, powdered, and beaded forms, and encapsulated forms, and mixtures thereof.

In specific embodiments, as noted above, encapsulation techniques can be used to modify the flavor systems. In certain embodiments, flavor compounds, flavor components, or the entire flavor system can be fully or partially encapsulated. Encapsulating materials and/or techniques can be selected to determine the type of modification of the flavor system.

In specific embodiments, the encapsulating materials and/or techniques are selected to improve the stability of the flavor compounds, flavor components, or flavor systems; while in other embodiments the encapsulating materials and/or techniques are selected to modify the release profile of the flavor compounds, flavor components, or flavor systems.

Suitable encapsulating materials can include, but are not limited to, hydrocolloids such as alginates, pectins, agars, guar gums, celluloses, and the like, proteins, polyvinyl acetate, polyethylene, crosslinked polyvinyl pyrrolidone, polymethylmethacrylate, polylactidacid, polyhydroxyalkanoates, ethylcellulose, polyvinyl acetatephthalate, polyethylene glycol esters, methacrylicacid-co-methylmethacrylate, ethylene-vinylacetate (EVA) copolymer, and the like, and combinations thereof. Suitable encapsulating techniques can include, but are not limited to, spray coating, spray drying, spray chilling, absorption, adsorption, inclusion complexing (e.g., creating a flavor/cyclodextrin complex), coacervation, fluidized bed coating, or other process can be used to encapsulate an ingredient with an encapsulating material.

Encapsulated delivery systems for flavoring agents or sweetening agents contain a hydrophobic matrix of fat or wax surrounding a sweetening agent or flavoring agent core. The fats can be selected from any number of conventional materials such as fatty acids, glycerides or poly glycerol esters, sorbitol esters, and mixtures thereof. Examples of fatty acids include but are not limited to hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Examples of glycerides include but are not limited to monoglycerides, diglycerides, and triglycerides.

Waxes useful can be chosen from the group consisting of natural and synthetic waxes, and mixtures thereof. Non-limiting examples include paraffin wax, petrolatum, carbowax, microcrystalline wax, beeswax, carnauba wax, candelilla wax, lanolin, bayberry wax, sugarcane wax, spermaceti wax, rice bran wax, and mixtures thereof.

The fats and waxes can be use individually or in combination in amounts varying from about 10 to about 70%, and alternatively in amounts from about 30 to about 60%, by weight of the encapsulated system. When used in combination, the fat and wax are preferably present in a ratio from about 70:10 to 85:15, respectively.

Typical encapsulated flavor compositions, flavoring agent or sweetening agent delivery systems are disclosed in U.S. Pat. Nos. 4,597,970 and 4,722,845, the disclosures of which are incorporated herein by reference in their entireties.

Liquid delivery systems can include, but are not limited to, systems with a dispersion of peptide compound(s) or the flavor compositions of the present application, such as in carbohydrate syrups and/or emulsions. Liquid delivery systems can also include extracts where the peptide compound(s) and/or the flavor compositions are solubilized in a solvent. Solid delivery systems can be created by spray drying, spray coating, spray chilling, fluidized bed drying, absorption, adsorption, coacervation, complexation, or any other standard technique. In some embodiments, the delivery system can be selected to be compatible with or to function in the edible composition. In some embodiments, the delivery system will include an oleaginous material such as a fat or oil. In some embodiments, the delivery system will include a confectionery fat such as cocoa butter, a cocoa butter replacer, a cocoa butter substitute, or a cocoa butter equivalent.

When used in dried form, suitable drying means such as spray drying may be used. Alternatively, a flavoring composition may be adsorbed or absorbed onto substrates such as water soluble materials, such as cellulose, starch, sugar, maltodextrin, gum arabic and so forth or may be encapsulated. The actual techniques for preparing such dried forms are well known in the art.

5. End Product Systems

The flavoring compositions of the present disclosed subject matter can be used in a wide variety of ingestible vehicles. Non-limiting examples of suitable ingestible vehicles include chewing gum compositions, hard and soft confections, dairy products, beverage products including juice products and soft drinks, pharmaceuticals, bakery goods, frozen foods, food products and food categories described herein. The combination of the flavoring composition of the presently disclosed subject matter together with an ingestible vehicle and optional ingredients, when desired, provides a flavoring agent that possesses unexpected taste, flavor and/or texture value and imparts, for example, a salty, umami, bitter, astringent and/or savory sensory experience.

In the method for flavoring an ingestible composition of the presently disclosed subject matter, the ingestible composition is prepared by admixing the flavoring agent in an ingestible vehicle, together with any optional ingredients, to form a uniform mixture. The final compositions are readily prepared using standard methods and apparatus generally known by those skilled in the corresponding arts, such as confectionary arts. The apparatus useful in accordance with the presently disclosed subject matter comprises mixing apparatus well known in the art, and therefore the selection of the specific apparatus will be apparent to the artisan.

In certain embodiments, the present application relates to the modified edible food products produced by the methods disclosed herein. In certain embodiments, the food products can be produced by processes for producing comestible products well known to those of ordinary skill in the art, especially if such compositions comprise NaCl and/or MSG, wherein the flavor composition of the present application is employed as a salty tastant, umami tastant, bitter tastant, astringent flavorant and/or savory flavorant enhancer for the NaCl and/or MSG present in the food product.

The flavor composition and its various subgenuses can be combined with or applied to a comestible or medicinal products or precursor thereof in any of innumerable ways known to cooks the world over, or producers of comestible or medicinal products. For example, the flavor compositions can be dissolved in or dispersed in one of many known comestibly acceptable liquids, solids, or other carriers, such as water at neutral, acidic, or basic pH, fruit or vegetable juices, vinegar, marinades, beer, wine, natural water/fat emulsions such as milk or condensed milk, whey or whey products, edible oils and shortenings, fatty acids, certain low molecular weight oligomers of propylene glycol, glyceryl esters of fatty acids, and dispersions or emulsions of such hydrophobic substances in aqueous media, salts such as sodium chloride, vegetable flours, solvents such as ethanol, solid edible diluents such as vegetable powders or flours, and the like, and then combined with precursors of the comestible or medicinal products, or applied directly to the comestible or medicinal products.

In certain embodiments, the flavor compositions of the present application can be admixed with foods, beverages and other comestible compositions wherein savory compounds, especially NaCl, MSG, inosine monophosphate (IMP), or guanosine monophosphate (GMP) are conventionally utilized. These compositions include compositions for human and animal consumption, for example, food or drinks (liquids) for consumption by agricultural animals, pets and zoo animals. Those of ordinary skill in the art of preparing and selling comestible compositions (i.e., edible foods or beverages, or precursors or flavor modifiers thereof) are well aware of a large variety of classes, subclasses and species of the comestible compositions, and utilize well-known and recognized terms of art to refer to those comestible compositions while endeavoring to prepare and sell various of those comestible compositions. Such a list of terms of art is enumerated below, and it is specifically contemplated hereby that the flavor compositions of the present application can be used to modify or enhance the salty taste, umami taste, bitter taste, astringent mouthfeel and/or savory flavor of the following list edible compositions, either singly or in all reasonable combinations or mixtures thereof.

In certain embodiments, the food products to which the flavor compositions of the present application are admixed with comprise, by way of example, the wet soup category, the dehydrated and culinary food category, the beverage category, the frozen food category, the snack food category, and seasonings or seasoning blends, described herein.

In other embodiments, the flavor compositions of the present application are admixed with one or more confectioneries, chocolate confectionery, tablets, countlines, bagged selfmies/softlines, boxed assortments, standard boxed assortments, twist wrapped miniatures, seasonal chocolate, chocolate with toys, allsorts, other chocolate confectionery, mints, standard mints, power mints, boiled sweets, pastilles, gums, jellies and chews, toffees, caramels and nougat, medicated confectionery, lollipops, licorice, other sugar confectionery, gum, chewing gum, sugarised gum, sugar-free gum, functional gum, bubble gum, bread, packaged/industrial bread, unpackaged/artisanal bread, pastries, cakes, packaged/industrial cakes, unpackaged/artisanal cakes, cookies, chocolate coated biscuits, sandwich biscuits, filled biscuits, savory biscuits and crackers, bread substitutes, breakfast cereals, rte cereals, family breakfast cereals, flakes, muesli, other rte cereals, children's breakfast cereals, hot cereals, ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, dairy products, milk, fresh/pasteurized milk, full fat fresh/pasteurized milk, semi skimmed fresh/pasteurized milk, long-life/uht milk, full fat long life/uht milk, semi skimmed long life/uht milk, fat-free long life/uht milk, goat milk, condensed/evaporated milk, plain condensed/evaporated milk, flavored, functional and other condensed milk, flavored milk drinks, dairy only flavored milk drinks, flavored milk drinks with fruit juice, soy milk, sour milk drinks, fermented dairy drinks, coffee whiteners, powder milk, flavored powder milk drinks, cream, cheese, processed cheese, spreadable processed cheese, unspreadable processed cheese, unprocessed cheese, spreadable unprocessed cheese, hard cheese, packaged hard cheese, unpackaged hard cheese, yoghurt, plain/natural yoghurt, flavored yoghurt, fruited yoghurt, probiotic yoghurt, drinking yoghurt, regular drinking yoghurt, probiotic drinking yoghurt, chilled and shelf-stable desserts, dairy-based desserts, soy-based desserts, chilled snacks, fromage frais and quark, plain fromage frais and quark, flavored fromage frais and quark, savory fromage frais and quark, sweet and savory snacks, fruit snacks, chips/crisps, extruded snacks, tortilla/corn chips, popcorn, pretzels, nuts, other sweet and savory snacks, snack bars, granola bars, breakfast bars, energy bars, fruit bars, other snack bars, meal replacement products, slimming products, convalescence drinks, ready meals, canned ready meals, frozen ready meals, dried ready meals, chilled ready meals, dinner mixes, frozen pizza, chilled pizza, soup, canned soup, dehydrated soup, instant soup, chilled soup, uht soup, frozen soup, pasta, canned pasta, dried pasta, chilled/fresh pasta, noodles, plain noodles, instant noodles, cups/bowl instant noodles, pouch instant noodles, chilled noodles, snack noodles, canned food, canned meat and meat products, canned fish/seafood, canned vegetables, canned tomatoes, canned beans, canned fruit, canned ready meals, canned soup, canned pasta, other canned foods, frozen food, frozen processed red meat, frozen processed poultry, frozen processed fish/seafood, frozen processed vegetables, frozen meat substitutes, frozen potatoes, oven baked potato chips, other oven baked potato products, non-oven frozen potatoes, frozen bakery products, frozen desserts, frozen ready meals, frozen pizza, frozen soup, frozen noodles, other frozen food, dried food, dessert mixes, dried ready meals, dehydrated soup, instant soup, dried pasta, plain noodles, instant noodles, cups/bowl instant noodles, pouch instant noodles, chilled food, chilled processed meats, chilled fish/seafood products, chilled processed fish, chilled coated fish, chilled smoked fish, chilled lunch kit, chilled ready meals, chilled pizza, chilled soup, chilled/fresh pasta, chilled noodles, oils and fats, olive oil, vegetable and Seed oil, cooking fats, butter, margarine, spreadable oils and fats, functional spreadable oils and fats, sauces, dressings and condiments, tomato pastes and purees, bouillon/stock cubes, stock cubes, gravy granules, liquid stocks and fonds, herbs and spices, fermented sauces, soy based sauces, pasta sauces, wet sauces, dry sauces/powder mixes, ketchup, mayonnaise, regular mayonnaise, mustard, salad dressings, regular salad dressings, low fat salad dressings, vinaigrettes, dips, pickled products, other sauces, dressings and condiments, baby food, milk formula, standard milk formula, follow-on milk formula, toddler milk formula, hypoallergenic milk formula, prepared baby food, dried baby food, other baby food, spreads, jams and preserves, honey, chocolate spreads, nut-based spreads, and yeast-based spreads.

5.1 Sweet Goods 5.1.1 Chewing Gum

The flavor systems can be used in sugarless gum formulations and can also be used in a sugar chewing gum. The flavor systems can be used in either regular chewing gum or bubble gum. Various specifics of chewing gum compositions are disclosed in U.S. Pat. No. 6,899,911, the disclosure of which is incorporated herein by reference in its entirety.

The chewing gum composition of the presently disclosed subject matter follows the general pattern outlined below. In general, a chewing gum composition typically contain a chewable gum base portion which is essentially free of water and is water-insoluble, a water-soluble bulk portion and flavors which are typically water insoluble. The water-soluble portion dissipates with a portion of the flavor over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that can be used include polyvinyl laureate, polyvinyl alcohol and polyvinyl pyrrolidone.

Elastomers can include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and cocoa butter. Commonly employed waxes include paraffin, microcrystalline and natural waxes such as beeswax and carnauba. Microcrystalline waxes, especially those with a high degree of crystallinity, can be considered bodying agents or textural modifiers.

According to the preferred embodiment of the presently disclosed subject matter, the insoluble gum base constitutes between about 5% to about 95% by weight of the gum. More preferably the insoluble gum base comprises between 10% and 50% by weight of the gum and most preferably about 20% to 35% by weight of the gum.

The gum base typically also includes a filler component. The filler component can be calcium carbonate, magnesium carbonate, talc, dicalcium phosphate or the like. The filler can constitute between about 5% and about 60% by weight of the gum base. Preferably the filler comprises about 5% to 50% by weight of the gum base.

Gum bases typically also contain softeners including glycerol monostearate and glycerol triacetate. Gum bases can also contain optional ingredients such as antioxidants, colors, and emulsifiers. The presently disclosed subject matter contemplates employing any commercially acceptable gum base.

The water-soluble portion of the chewing gum can further comprise softeners, sweeteners, flavors, physiological cooling agents and combinations thereof. The sweeteners often fulfill the role of bulking agents in the gum. The bulking agents typically comprise about 5% to about 95% of the gum composition.

Softeners are added to the chewing gum in order to optimize the chewability and mouth feel of the gum. Softeners, also known in the art as plasticizers or plasticizing agents, generally constitute between about 0.5% to about 15% of the chewing gum. Softeners contemplated by the presently disclosed subject matter include glycerin, lecithin and combinations thereof. Further, aqueous sweetener solutions such as those containing sorbitol, hydrogenated starch hydrolysate, corn syrup and combinations thereof can be used as softeners and binding agents in gum.

As mentioned above, the flavor systems of the presently disclosed subject matter can be used in sugarless gum formulations. However, formulations containing sugar are also within the scope of the invention. Sugar sweeteners generally include saccharide-containing components commonly known in the chewing gum art which comprise, but are not limited to, sucrose, dextrose, maltose, dextrin, dried invert sugar, fructose, galactose, corn syrup solids and the like, alone or in any combination.

The flavor systems of the presently disclosed subject matter can also be used in combination with sugarless sweeteners. Generally sugarless sweeteners include components with sweetening characteristics but which are devoid of the commonly known sugars and comprise, but are not limited to, sugar alcohols such as sorbitol, hydrogenated isomaltulose, mannitol, xylitol, lactitol, erythritol, hydrogenated starch hydrolysate, maltitol and the like alone or in any combination Depending on the particular sweetness release profile and shelf-stability needed, coated or uncoated high-intensity sweeteners can be used in the chewing gum composition, or can be used in a coating applied to centers made from those gum compositions. High-intensity sweeteners, preferably aspartame, can be used at levels from about 0.01% to about 3.0%. Encapsulated aspartame is a high intensity sweetener with improved stability and release characteristics, as compared to free aspartame. Free aspartame can also be added, and a combination of some free and encapsulated aspartame is preferred when aspartame is used.

Other high intensity sweeteners that can be used in the gum center are: saccharin, Thaumatin, alitame, saccharin salts, sucralose, Stevia, and acesulfame K. Overall, the chewing gum composition will preferable comprise about 0.5% to about 90% sweetening agents. Most typically the sweetening agents will comprises at least one bulk sweetener and at least one high-intensity sweetener.

Optional ingredients such as colors, emulsifiers and pharmaceutical agents can also be added as separate components of the chewing gum composition, or added as part of the gum base.

Aqueous syrups, such as corn syrup and hydrogenated corn syrup can be used, particularly if their moisture content is reduced. This can preferably be done by coevaporating the aqueous syrup with a plasticizer, such as glycerin or propylene glycol, to a moisture content of less than 10%. Preferred compositions include hydrogenated starch hydrolysate solids and glycerin. Such syrups and their methods of preparation are discussed in detail in U.S. Pat. No. 4,671,967.

A preferred method of manufacturing chewing gum according to the presently disclosed subject matter is by sequentially adding the various chewing gum ingredients to any commercially available mixer known in the art. After the ingredients have been thoroughly mixed, the gum is discharged from the mixer and shaped into the desired form such as by rolling into sheets and cutting into sticks, extruding into chunks, or casting into pellets.

Generally, the ingredients are mixed by first melting the gum base and adding it to the running mixer. The base can also be melted in the mixer itself. Color or emulsifiers can also be added at this time, along with syrup and a portion of the bulking agent. Further portions of the bulking agent can then be added to the mixer. Flavor systems are typically added with the final portion of the bulking agent. If the flavor system is coated or otherwise modified as when incorporated into a delivery system to modify its release rate, it will preferably be added after the final portion of bulking agent has been added. The entire mixing procedure typically takes from five to twenty minutes, but longer mixing times can sometimes be required. Those skilled in the art will recognize that many variations of the above described procedures can be followed.

If formed into pellets or balls, the chewing gum composition can be coated. The coating is initially present as a liquid syrup which contains from about 30% to about 80% or 85% sugars or sugar alcohols, and from about 15% or 20% to about 70% of a solvent such as water. In general, the coating process is carried out in conventional panning equipment. Gum center tablets to be coated are placed into the panning equipment to form a moving mass.

The material or syrup which will eventually form the coating is applied or distributed over the gum center tablets. The flavor systems of the presently disclosed subject matter can be added before, during and after applying the syrup to the gum centers. Once the coating has dried to form a hard surface, additional syrup additions can be made to produce a plurality of coatings or multiple layers of coating. The flavor systems can be added to any or none of the coatings and/or layers.

In the panning procedure, syrup is added to the gum center tablets at a temperature range of from about 100° F. to about 240° F. Preferably, the syrup temperature is from about 140° F. to about 200° F. Most preferably, the syrup temperature should be kept constant throughout the process in order to prevent the polyol in the syrup from crystallizing.

The syrup can be mixed with, sprayed upon, poured over, or added to the gum center tablets in any way known to those skilled in the art.

In another embodiment, a soft coating is formed by adding a powder coating after a liquid coating. The powder coating can include natural carbohydrate gum hydrolysates, maltodextrin, gelatin, cellulose derivatives, starches, modified starches, sugars, sugar alcohols, natural carbohydrate gums and fillers like talc and calcium carbonate.

Each component of the coating on the gum center can be applied in a single layer or in a plurality of layers. In general, a plurality of layers is obtained by applying single coats, allowing the layers to dry, and then repeating the process. The amount of solids added by each coating step depends chiefly on the concentration of the coating syrup. Any number of coats can be applied to the gum center tablet. Preferably, no more than about 75 coats are applied to the gum center. More preferably, less than about 60 coats are applied and most preferably, about 30 to about 60 coats are applied. In any event, the presently disclosed subject matter contemplates applying an amount of syrup sufficient to yield a coated chewing gum product containing about 10% to about 65% coating. Preferably, the final product will contain from about 20% to about 50% coating.

Those skilled in the art will recognize that in order to obtain a plurality of coated layers, a plurality of premeasured aliquots of coating syrup can be applied to the gum center. It is contemplated, however, that the volume of aliquots of syrup applied to the gum center can vary throughout the coating procedure.

Once a coating of syrup is applied to the gum center, the syrup is dried in an inert medium. A preferred drying medium comprises air. Preferably, forced drying air contacts the wet syrup coating in a temperature range of from about 70° F. to about 110° F. More preferably, the drying air is in the temperature range of from about 80° F. to about 100° F. The invention also contemplates that the drying air possesses a relative humidity of less than about 15 percent. Preferably, the relative humidity of the drying air is less than about 8%.

The drying air can be passed over and admixed with the syrup coated gum centers in any way commonly known in the art. Preferably, the drying air is blown over and around the syrup coated gum center at a flow rate, for large scale operations, of about 2800 cubic feet per minute. If lower quantities of material are being processed, or if smaller equipment is used, lower flow rates would be used. If a flavor is applied after a syrup coating has been dried, the presently disclosed subject matter contemplates drying the flavor with or without the use of a drying medium.

The amount of flavoring agent employed herein is normally a matter of preference subject to such factors as the type of final chewing gum composition, the individual flavor, the gum base employed, and the strength of flavor desired. Thus, the amount of flavoring can be varied in order to obtain the result desired in the final product and such variations are within the capabilities of those skilled in the art without the need for undue experimentation. In gum compositions, the flavoring agent is generally present in amounts from about 0.02% to about 5%, and preferably from about 0.1% to about 2%, and more preferably, from about 0.8% to about 1.8%, by weight of the chewing gum composition.

5.1.2 Sugar Confectionary

Another important aspect of the presently disclosed subject matter includes a confectionery composition incorporating the inventive flavoring agent and a method for preparing the confectionery compositions. The preparation of confectionery formulations is well-known in the art. Confectionery items have been classified as either "hard" confectionery or "soft" confectionery. The flavoring agents of the presently disclosed subject matter can be incorporated into the confections by admixing the compositions of the presently disclosed subject matter into the conventional hard and soft confections.

Hard confectionery can be processed and formulated by conventional means. In general, a hard confectionery has a base composed of a mixture of sugar and other carbohydrate bulking agents kept in an amorphous or glassy condition. The hard confectionery can also be sugarless. This form is considered a solid syrup of sugars generally having from about 0.5% to about 1.5% moisture. Such materials normally contain up to about 92% sugar, up to about 55% corn syrup and from about 0.1% to about 5% water, by weight of the final composition. The syrup component is generally prepared from sucrose and corn syrups, but can include other materials. Further ingredients such as flavorings, sweetening agents, acidulants, colorants and so forth can also be added.

Such confectionery can be routinely prepared by conventional methods, including but not limited to methods involving fire cookers, vacuum cookers, and scraped-surface cookers also referred to as high speed atmospheric cookers. The apparatus useful in accordance with the presently disclosed subject matter comprises cooking and mixing apparatus well known in the confectionery manufacturing arts, and therefore the selection of the specific apparatus will be apparent to the artisan.

Fire cookers involve the traditional method of making a candy base. In this method, the desired quantity of carbohydrate bulking agent is dissolved in water by heating the agent in a kettle until the bulking agent dissolves. Additional bulking agent can then be added and cooked until a final temperature of 145° C. to 156° C. is achieved. The batch is then cooled and worked as a plastic-like mass to incorporate additives such as flavoring agent, colorants and the like.

A high-speed atmospheric cooker uses a heat-exchanger surface, which involves spreading a film of candy on a heat exchange surface, the candy is heated to 165° C. to 170° C. within a few seconds. The candy is then rapidly cooled to 100° C. to 120° C. and worked as a plastic-like mass enabling incorporation of the additives, such as flavoring agent, colorants and the like. In vacuum cookers, the carbohydrate bulking agent is boiled to 125° C. to 132° C., vacuum is applied and additional water is boiled off without extra heating. When cooking is complete, the mass is a semi-solid and has a plastic-like consistency. At this point, flavoring agent, colorants, and other additives are admixed in the mass by routine mechanical mixing operations.

The optimum mixing required to uniformly mix the flavoring agent, colorants and other additives during conventional manufacturing of hard confectionery is determined by the time needed to obtain a uniform distribution of the materials. Generally, mixing times of from 2 to 10 minutes have been found to be acceptable.

Once the candy mass has been properly tempered, it can be cut into workable portions or formed into desired shapes. A variety of forming techniques can be utilized depending upon the shape and size of the final product desired. A general discussion of the composition and preparation of hard confections can be found in H. A. Lieberman, Pharmaceutical Dosage Forms: Tablets, Volume 1 (1989), Marcel Dekker, Inc., New York, N.Y. at pages 419 to 582, which disclosure is incorporated herein by reference.

Compressed tablet confections contain particular materials and are formed into structures under pressure. These confections generally contain sugars in amounts up to about 95%, by weight of the composition, and typical tablet excipients such as binders and lubricants as well as flavoring agent, colorants and so forth. These confections can also be sugarless.

Similar to hard confectionery, soft confectionery can be utilized in the embodiments of the disclosed subject matter. The preparation of soft confections, such as nougat, involves conventional methods, such as the combination of two primary components, namely (1) a high boiling syrup such as a corn syrup, or the like, and (2) a relatively light textured frappe, generally prepared from egg albumin, gum arabic, gelatin, vegetable proteins, such as soy derived compounds, sugarless milk derived compounds such as milk proteins, and mixtures thereof. The frappe is generally relatively light, and can, for example, range in density from about 0.5 to about 0.7 grams/cc.

The high boiling syrup, or "bob syrup" of the soft confectionery is relatively viscous and has a higher density than the frappe component, and frequently contains a substantial amount of carbohydrate bulking agent. Conventionally, the final nougat composition is prepared by the addition of the "bob syrup" to the frappe under agitation, to form the basic nougat mixture. Further ingredients such as flavoring, additional carbohydrate bulking agent, colorants, preservatives, medicaments, mixtures thereof and the like can be added thereafter also under agitation. Soft confectioneries can also be prepared sugarless. A general discussion of the composition and preparation of nougat confections can be found in B. W. Minifie, Chocolate, Cocoa and Confectionery: Science and Technology, 2nd edition, AVI Publishing Co., Inc., Westport, Conn. (1983), at pages 576-580, which disclosure is incorporated herein by reference.

In general, the frappe component is prepared first and thereafter the syrup component is slowly added under agitation at a temperature of at least about 65° C., and preferably at least about 100° C. The mixture of components is continued to be mixed to form a uniform mixture, after which the mixture is cooled to a temperature below 80° C., at which point, the flavor can be added. The mixture is further mixed for an additional period until it is ready to be removed and formed into suitable confectionery shapes.

In accordance with this invention, effective amounts of the flavoring agents of the presently disclosed subject matter can be admixed into the hard and soft confections. The exact amount of flavoring agent employed is normally a matter of preference subject to such factors as the particular type of confection being prepared, the type of bulking agent or carrier employed, the type of flavor employed and the intensity of breath freshening perception desired. Thus, the amount of flavoring agent can be varied in order to obtain the result desired in the final product and such variations are within the capabilities of those skilled in the art without the need for undue experimentation. In general, the amount of flavoring agent normally present in a hard or soft confection will be from about 0.001% to about 20%, preferably from about 0.01% to about 15%, more preferably from about 0.01% to about 10%, and more preferably from about 0.01% to about 5%, and more preferably from about 0.01% to about 0.5% by weight of the confection.

The presently disclosed subject matter extends to methods for making the improved confections. The flavoring agents can be incorporated into an otherwise conventional hard or soft confection composition using standard techniques and equipment known to those skilled in the art. The apparatus useful in accordance with the presently disclosed subject matter comprises mixing and heating apparatus well known in the confectionery manufacturing arts, and therefore the selection of the specific apparatus will be apparent to the artisan.

In such a method, a composition is made by admixing the inventive flavoring agent into the confectionery composition along with the other ingredients of the final desired composition. Other ingredients will usually be incorporated into the composition as dictated by the nature of the desired composition as well known by those having ordinary skill in the art. The ultimate confectionery compositions are readily prepared using methods generally known in the food technology and pharmaceutical arts. Thereafter the confectionery mixture can be formed into desirable confectionery shapes.

The flavoring agents can be formulated with conventional ingredients which offer a variety of textures to suit particular applications. Such ingredients can be in the form of hard and soft confections, tablets, toffee, nougat, chewy candy, chewing gum and so forth, center filled candies, both sugar and sugarless. The acceptable ingredients can be selected from a wide range of materials. Without being limited thereto, such materials include diluents, binders and adhesives, lubricants, disintegrants, bulking agents, humectants and buffers and adsorbents. The preparation of such confections and chewing gum products is well known.

5.1.3 Chocolates and Fillings

The presently disclosed subject matter is also used with and/or in chocolate products, chocolate-flavored confections, and chocolate flavored compositions. Chocolates also include those containing crumb solids or solids fully or partially made by a crumb process. Various chocolates are disclosed, for example, in U.S. Pat. Nos. 7,968,140 and 8,263,168, the disclosures of which are incorporated herein by reference in their entireties. A general discussion of the composition and preparation of chocolate confections can be found in B. W. Minifie, Chocolate, Cocoa and Confectionery: Science and Technology, 2nd edition, AVI Publishing Co., Inc., Westport, Conn. (1982), which disclosure is incorporated herein by reference.

The term "chocolate" as used herein refers to a solid or semi-plastic food and is intended to refer to all chocolate or chocolate-like compositions containing a fat-based component phase or fat-like composition. The term is intended to include standardized or nonstandardized compositions conforming to the U.S. Standards Of Identity (SOI), CODEX Alimentarius and/or other international standards and compositions not conforming to the U.S. Standards Of Identity or other international standards. The term includes dark chocolate, baking chocolate, sweet chocolate, bittersweet or semisweet chocolate, milk chocolate, buttermilk chocolate, skim milk chocolate, mixed dairy product chocolate, white chocolate, sweet cocoa and vegetable fat coating, sweet chocolate and vegetable fat coating, milk chocolate and vegetable fat coating, vegetable fat based coating, pastels including white chocolate or coating made with cocoa butter or vegetable fat or a combination of these, nutritionally modified chocolate-like compositions (chocolates or coatings made with reduced calorie ingredients) and low fat chocolates, aerated chocolates, compound coatings, nonstandardized chocolates and chocolate-like compositions, unless specifically identified otherwise.

Nonstandardized chocolates result when, for example, the nutritive carbohydrate sweetener is replaced partially or completely; or when the cocoa butter, cocoa butter alternative, cocoa butter equivalent, cocoa butter extender, cocoa butter replacer, cocoa butter substitute or milkfat are replaced partially or completely; or when components that have flavors that imitate milk, butter or chocolate are added or other additions or deletions in formula are made outside the FDA standards of identify of chocolate or combinations thereof. Chocolate-like compositions are those fat-based compositions that can be used as substitutes for chocolate in applications such as panning, molding, or enrobing; for example, carob.

In the United States, chocolate is subject to a standard of identity established by the U.S. Food and Drug Administration (FDA) under the Federal Food, Drug and Cosmetic Act. Definitions and standards for the various types of chocolate are well established in the U.S. Nonstandardized chocolates are those chocolates which have compositions that fall outside the specified ranges of the standardized chocolates.

The chocolate can contain a sugar syrup/solids, invert sugar, hydrolyzed lactose, maple sugar, brown sugar, molasses, honey, sugar substitute and the like. The term "sugar substitute" includes bulking agents, sugar alcohols (polyols such as glycerol), or high potency sweeteners or combinations thereof. Nutritive carbohydrate sweeteners with varying degrees of sweetness intensity can be any of those typically used in the art and include, but are not limited to, sucrose, e.g. from cane or beet, dextrose, fructose, lactose, maltose, glucose syrup solids, corn syrup solids, invert sugar, hydrolyzed lactose, honey, maple sugar, brown sugar, molasses and the like. Sugar substitutes can partially replace the nutritive carbohydrate sweetener. High potency sweeteners include aspartame, cyclamates, saccharin, acesulfame-K, neohesperidin dihydrochalcone, sucralose, alitame, stevia sweeteners, glycyrrhizin, thaumatin and the like and mixtures thereof. The preferred high potency sweeteners are aspartame, cyclamates, saccharin, and acesulfame-K. Examples of sugar alcohols can be any of those typically used in the art and include sorbitol, mannitol, xylitol, maltitol, isomalt, lactitol and the like.

The chocolates can also contain bulking agents. The term "bulking agents" as defined herein can be any of those typically used in the art and include polydextrose, cellulose and its derivatives, maltodextrin, gum arabic, and the like.

The chocolate products can contain emulsifiers. Examples of safe and suitable emulsifiers can be any of those typically used in the art and include lecithin derived from vegetable sources such as soybean, safflower, corn, etc., fractionated lecithins enriched in either phosphatidyl choline or phosphatidyl ethanolamine, or both, mono- and digylcerides, diacetyl tartaric acid esters of mono- and diglycerides (also referred to as DATEM), monosodium phosphate derivatives of mono- and diglycerides of edible fats or oils, sorbitan monostearate, hydroxylated lecithin, lactylated fatty acid esters of glycerol and propylene glycol, polyglycerol esters of fatty acids, propylene glycol mono- and di-esters of fats and fatty acids, or emulsifiers that can become approved for the US FDA-defined soft candy category. In addition, other emulsifiers that can be used include polyglycerol polyricinoleate (PGPR), ammonium salts of phosphatidic acid, (e.g. YN) sucrose esters, oat extract, etc., any emulsifier found to be suitable in chocolate or similar fat/solid system or any blend.

The term "chocolate-flavored confection" refers to food products, excluding "chocolate", having a chocolate flavor/aroma and comprising a cocoa fraction. These products are stable at ambient temperatures for extended periods of time (e.g., greater than 1 week) and are characterized as microbiologically shelf-stable at 18-30° C. under normal atmospheric conditions. Examples include chocolate-flavored hard candies, chewables, chewing gums, etc.

The term "chocolate-flavored compositions" refers to chocolate-flavored compositions, excluding "chocolate", containing a cocoa fraction and having a chocolate flavor/aroma. Examples include chocolate-flavored cake mixes, ice creams, syrups, baking goods, etc. The term includes chocolate-flavored compositions (e.g., cakes, nougats, puddings, etc.), as well as compositions not having a chocolate-flavor (e.g., caramels, etc.).

5.2 Savory Goods and Other Food Products

In certain embodiments, the flavor compositions of the present application are incorporated into savory goods to impart, enhance, or modify a salty taste, umami taste, bitter taste, astringent mouthfeel and/or savory taste. In certain embodiments, a savory good is a food product that has savory flavors including, for example, but not limited to, spicy flavor, pepper flavor, dairy flavor, vegetable flavor, tomato flavor, dill flavor, meat flavor, poultry flavor, chicken flavor and reaction flavors that are added or generated during heating of a food product.

In certain embodiments, the flavor compositions are incorporated into a wet soup category food product, which comprises wet/liquid soups regardless of concentration or container, including frozen soups. In certain embodiments, the a soup food product means a food prepared from meat, poultry, fish, vegetables, grains, fruit and/or other ingredients, cooked in a liquid which may include visible pieces of some or all of these ingredients. It may be clear (as a broth) or thick (as a chowder), smooth, pureed or chunky, ready-to-serve, semi-condensed or condensed and may be served hot or cold, as a first course or as the main course of a meal or as a between meal snack (sipped like a beverage). Soup may be used as an ingredient for preparing other meal components and may range from broths (consomme) to sauces (cream or cheese-based soups).

In certain embodiments, the flavor compositions of the present application are incorporated into a dehydrated and culinary food category of food products, which comprises (i) cooking aid products such as: powders, granules, pastes, concentrated liquid products, including concentrated bouillon, bouillon and bouillon like products in pressed cubes, tablets or powder or granulated form, which are sold separately as a finished product or as an ingredient within a product, sauces and recipe mixes (regardless of technology); (ii) meal solutions products such as: dehydrated and freeze dried soups, including dehydrated soup mixes, dehydrated instant soups, dehydrated ready-to-cook soups, dehydrated or ambient preparations of ready-made dishes, meals and single serve entrees including pasta, potato and rice dishes; and (iii) meal embellishment products such as: condiments, marinades, salad dressings, salad toppings, dips, breading, batter mixes, shelf stable spreads, barbecue sauces, liquid recipe mixes, concentrates, sauces or sauce mixes, including recipe mixes for salad, sold as a finished product or as an ingredient within a product, whether dehydrated, liquid or frozen.

In certain embodiments, the flavor compositions of the present application are incorporated into a meat food product. In certain embodiments, meat food products include food product made by processing the edible remains of any dead animal, including birds, fish, crustaceans, shellfish and mammals. Meat food products include, without limitation, for example, prepared beef, lamb, pork, poultry or seafood products. Examples of such meat food products include, for example, bologna, frankfurters, sausage, luncheon, deli slices, loaves, bacon, meatballs, fish sticks, chicken fingers, and ground meats, e.g., meatloaf, meatballs and hamburgers. A meat food product may be combined with a simulated meat food product. Simulated meat food products include, without limitation, for example, a meat alternative, meat analog, soy burger, soy bologna, soy frankfurter, soy sausage, soy luncheon loaves, soy bacon and soy meatball. A simulated meat food product may be combined with a meat food product.

In certain embodiments, the flavor compositions of the present application are incorporated into a snack food category food product. In certain embodiments, snack food products include any food that can be a light informal meal including, but not limited to sweet and savory snacks and snack bars. Examples of snack food include, but are not limited to fruit snacks, chips/crisps, extruded snacks, tortilla/corn chips, popcorn, pretzels, nuts and other sweet and savory snacks. Examples of snack bars include, but are not limited to granola/muesli bars, breakfast bars, energy bars, fruit bars and other snack bars In certain embodiments, the flavor compositions of the present application are incorporated into frozen of food products, which comprises chilled or frozen food products, for example, but not limited to, ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, frozen ready meals, frozen pizza, chilled pizza, frozen soup, frozen pasta, frozen processed red meat, frozen processed poultry, frozen processed fish/seafood, frozen processed vegetables, frozen meat substitutes, frozen potatoes, frozen bakery products and frozen desserts.

In certain embodiments, the flavor compositions of the present application are incorporated into food products for animal consumption. This includes food or drinks (liquids) for consumption by agricultural animals, pets and zoo animals.

The presently disclosed subject matter can be used in a variety of food products. The term "food product" includes any food product, for example, those set forth in 21 CFR 101.12. Nonlimiting examples of such food products include frozen desserts, baked goods, fillings, nutritional drinks, beverages, salad dressing or similar dressing, sauces, icings, puddings and custards, batters, and the like. Various baked goods are disclosed in U.S. Pat. No. 6,536,599, the disclosure of which is herein incorporated by reference in its entirety. Non-limiting examples of bakery goods includes cookies, cakes, rolls, pastries, pie dough, brownies, breads, bagels and the like. The flavor compositions are also suitable as a component in frozen foods.

5.3 Pharmaceuticals

The flavoring compositions can also be in the form of a pharmaceutical. One nonlimiting example of a pharmaceutical form is a suspension. Pharmaceutical suspensions can be prepared by conventional compounding methods. Suspensions can contain adjunct materials employed in formulating the suspensions of the art. The suspensions of the presently disclosed subject matter can comprise preservatives, buffers, suspending agents, antifoaming agents, sweetening agents, flavoring agents, coloring or decoloring agents, solubilizers, and combinations thereof.

Flavoring agents such as those flavors well known to the skilled artisan, such as natural and artificial flavors and mints, such as peppermint, menthol, citrus flavors such as orange and lemon, artificial vanilla, cinnamon, various fruit flavors, both individual and mixed and the like can be utilized in amounts from about 0.01% to about 5%, and more preferably 0.01% to about 0.5% by weight of the suspension.

The pharmaceutical suspensions of the presently disclosed subject matter can be prepared as follows.

(A) admix the thickener with water heated from about 40° C. to about 95° C., preferably from about 40° C. to about 70° C., to form a dispersion if the thickener is not water soluble or a solution if the thickener is water soluble;

(B) admix the sweetening agent with water to form a solution;

(C) admix the flavoring agent with the thickener-water admixture to form a uniform thickener-flavoring agent;

(D) combine the sweetener solution with the thickener-flavoring agent and mix until uniform; and (E) admix the optional adjunct materials such as coloring agents, flavoring agents, decolorants, solubilizers, antifoaming agents, buffers and additional water with the mixture of step (D) to form the suspension.

The flavoring compositions can also be in chewable form. To achieve acceptable stability and quality as well as good taste and mouth feel in a chewable formulation several considerations are important. These considerations include the amount of active substance per tablet, the flavoring agent employed, the degree of compressibility of the tablet and additional properties of the composition.

Chewable pharmaceutical candy is prepared by procedures similar to those used to make soft confectionery. A general discussion of the lozenge and chewable tablet forms of confectionery can be found in H. A. Lieberman and L. Lachman, Pharmaceutical Dosage Forms: Tablets Volume 1, Marcel Dekker, InC, New York, N.Y. (1989) at pages 367 to 418, which disclosure is incorporated herein by reference. In a typical procedure, a boiled sugar-corn syrup blend is formed to which is added a frappe mixture. The boiled sugar-corn syrup blend can be prepared from sugar and corn syrup blended in parts by weight ratio of about 90:10 to about 10:90. The sugar-corn syrup blend is heated to temperatures above about 120° C. to remove water and to form a molten mass. The frappe is generally prepared from gelatin, egg albumin, milk proteins such as casein, and vegetable proteins such as soy protein, and the like, which is added to a gelatin solution and rapidly mixed at ambient temperature to form an aerated sponge like mass. The frappe is then added to the molten candy mass and mixed until homogeneous at temperatures between about 65° C. and about 120° C. The flavor composition can then be added to the homogeneous mixture as the temperature is lowered to about 65° C.-95° C. whereupon additional ingredients can then be added such as flavoring agents and coloring agents. The formulation is further cooled and formed into pieces of desired dimensions.

In other pharmaceutical embodiments, the flavoring agent is incorporated into an ingestible topical vehicle which can be in the form of a mouthwash, rinse, ingestible spray, suspension, dental gel, and the like. Typical non-toxic ingestible vehicles known in the pharmaceutical arts can be used in the presently disclosed subject matter. The preferred ingestible vehicles are water, ethanol, and water-ethanol mixtures. The water-ethanol mixtures are generally employed in a weight ratio from about 1:1 to about 20:1, preferably from about 3:1 to about 20:1, and most preferably from about 3:1 to about 10:1, respectively. The pH value of the ingestible vehicle is generally from about 4 to about 7, and preferably from about 5 to about 6.5. An ingestible topical vehicle having a pH value below about 4 is generally irritating to the ingestible cavity and an ingestible vehicle having a pH value greater than about 7 generally results in an unpleasant mouth feel.

The ingestible topical flavoring agents can also contain conventional additives normally employed in those products. Conventional additives include a fluorine providing compound, a sweetening agent, a flavoring agent, a coloring agent, a humectant, a buffer, and an emulsifier, providing the additives do not interfere with the flavoring properties of the composition. The coloring agents and humectants, and the amounts of these additives to be employed, set out above, can be used in the ingestible topical composition.

The flavoring agents (flavors, flavorants) which can be used include those flavors known to the skilled artisan, such as natural and artificial flavors. Suitable flavoring agents include mints, such as peppermint, citrus flavors such as orange and lemon, artificial vanilla, cinnamon, various fruit flavors, both individual and mixed, and the like.

The amount of flavoring agent employed in the ingestible topical composition is normally a matter of preference subject to such factors as the type of final ingestible composition, the individual flavor employed, and the strength of flavor desired. Thus, the amount of flavoring can be varied in order to obtain the result desired in the final product and such variations are within the capabilities of those skilled in the art without the need for undue experimentation. The flavoring agents, when used, are generally utilized in amounts that can, for example, range in amounts from about 0.05% to about 6%, by weight of the ingestible topical composition.

In accordance with the presently disclosed subject matter, effective amounts of the flavoring agents of the presently disclosed subject matter can be admixed with an ingestible topical vehicle to form a topical composition. These amounts are readily determined by those skilled in the art without the need for undue experimentation. In a preferred embodiment, the ingestible topical flavoring agents will comprise the flavoring agent in an amount from about 0.025% to about 2% and an ingestible topical vehicle in a quantity sufficient to bring the total amount of composition to 100%, by weight of the ingestible topical composition. In a more preferred embodiment, the ingestible topical flavoring agents will comprise the flavoring agent in an amount from about 0.05% to about 1% and an ingestible topical vehicle in a quantity sufficient to bring the total amount of composition to 100%, by weight of the ingestible topical composition.

The presently disclosed subject matter extends to methods for preparing the ingestible topical flavoring agents. In such a method, the ingestible topical composition is prepared by admixing an effective amount of the flavoring agent of the presently disclosed subject matter and an ingestible topical vehicle. The final compositions are readily prepared using standard methods and apparatus generally known by those skilled in the pharmaceutical arts. The apparatus useful in accordance with the presently disclosed subject matter comprises mixing apparatus well known in the pharmaceutical arts, and therefore the selection of the specific apparatus will be apparent to the artisan.

6. Methods of Measuring Taste and Texture Attributes

In certain embodiments of the present application, the taste and texture attributes of a food product can be modified by admixing a flavor composition with the food product as described herein. In certain embodiments, the attribute(s) can be enhanced or reduced by increasing or decreasing the concentration of the flavor composition admixed with the food product. In certain embodiments, the taste or texture attributes of the modified food product can be evaluated as described herein, and the concentration of flavor composition admixed with the food product can be increased or decreased based on the results of the evaluation.

Taste and texture attributes can be reliably and reproducibly measured using sensory analysis methods known as descriptive analysis techniques. The Spectrum™ method of descriptive analysis is described in Morten Meilgaard, D.Sc. et al., Sensory Evaluation Techniques (3d ed. 1999). The Spectrum™ method is a custom design approach meaning that the highly trained panelists who generate the data also develop the terminology to measure the attributes of interest. Further, the method uses intensity scales created to capture the intensity differences being investigated. These intensity scales are anchored to a set of well-chosen references. Using these references helps make the data universally understandable and usable over time. This ability to reproduce the results at another time and with another panel makes the data potentially more valuable than analytical techniques which offer similar reproducibility but lack the ability to fully capture the integrated sensory experiences as perceived by humans.

When conducting quantitative descriptive analysis for compounds that modify other compounds, the testing methodology can be adapted to capture the change in character and intensity of the modified compound. For example, when testing for compounds that modify the saltiness of other compounds, the panelists may first taste a salt reference of agreed upon saltiness in order to establish a reference point for comparison. After tasting the reference, panelists may taste and score the test sample for saltiness as well as any other basic taste, chemical feeling factor, or aromatic notes. To quantify any increase in salt perception, the panelists may then re-taste the reference and again assign scores for saltiness as well as any other basic taste, chemical feeling factor, or aromatic notes. To quantify any lingering aftertaste, panelists may re-taste the salt reference at 1 minute intervals until their saltiness perception returns to the level of the reference. During the aftertaste evaluations, the panelists also note and score any other basic taste, chemical feeling factor, or aromatic notes.

7. Methods of Synthesis

In certain embodiments, the peptides of the present application can be synthesized using standard chemosynthesis processes. In certain embodiments, the chemosynthesis process provides a peptide having a purity of at least 99.999%, or at least 99%, or at least 95%, or at least 90%, or at least 85%, or at least 80%. In certain embodiments, the peptides can be prepared using standard hydrolysis processes such as those employing acids, enzymes, or a combination of acids and enzymes.

In certain embodiments, the chemosynthesis process comprises synthesizing the peptides of the present application through the use of amino acid resins and/or deprotecting and coupling reactions. In certain embodiments, the peptides are synthesized using and automated peptide synthesizer using techniques known to those skilled in the art.

In certain embodiments the peptides of the present application are prepared from a food product source that is fractionated and/or extracted to form an enriched peptide composition comprising the peptides. In certain embodiments, the enriched peptide composition comprises the flavor composition of the present application and is admixed with a food product according to the methods of the present application. In other embodiments, the enriched peptide composition is combined with other compositions to form the flavor composition of the present application, which is then admixed with the food product according to the methods of the present application.

In certain embodiments the peptides of the present application are prepared from a food product source that is hydrolyzed to form a hydrolysate comprising the peptides. In certain embodiments, the food product source is hydrolyzed for between about 0.5 and about 15 hours, or between about 2 and about 13 hours, or between about 4 and about 11 hours, or between about 6 and about 9 hours. In certain embodiments, the hydrolysate comprises the flavor composition of the present application and is admixed with a food product according to the methods of the present application. In other embodiments, the hydrolysate is combined with other compositions to form the flavor composition of the present application, which is then admixed with the food product according to the methods of the present application.

In certain embodiments the peptides of the present application are prepared from a food product source that is hydrolyzed and fractionated and/or extracted to form an enriched peptide hydrolysate composition comprising the peptides. In certain embodiments, the enriched peptide hydrolysate composition comprises the flavor composition of the present application and is admixed with a food product according to the methods of the present application. In other embodiments, the enriched peptide hydrolysate composition is combined with other compositions to form the flavor composition of the present application, which is then admixed with the food product according to the methods of the present application.

8. Non-Limiting Examples of Compositions of the Disclosure

In certain non-limiting embodiments, the present disclosure provides for a flavor composition comprising a peptide, wherein the peptide comprises: (i) pyroglutamic acid (pGlu); and (ii) a second amino acid selected from the group consisting of glycine (Gly), alanine (Ala), valine (Val), leucine (Leu), isoleucine (Ile), proline (Pro), phenylalanine (Phe), methionine (Met), tyrosine (Tyr), tryptophan (Trp) and cysteine (Cys).

In certain non-limiting embodiments, the present disclosure provides for a flavor composition comprising a peptide, wherein the peptide comprises (i) pyroglutamic acid (pGlu); (ii) an amino acid selected from the group consisting of a valine (Val), leucine (Leu), isoleucine (Ile), cysteine (Cys) and proline (Pro); and (iii) a third amino acid selected from the group consisting of glycine (Gly), alanine (Ala), valine (Val), leucine (Leu), isoleucine (Ile), proline (Pro), phenylalanine (Phe), methionine (Met), tyrosine (Tyr), tryptophan (Trp), cysteine (Cys), glutamine (Gln), serine (Ser) and glutamate (Glu).

In certain non-limiting embodiments, the present disclosure provides for a flavor composition comprising a peptide, wherein the peptide comprises (i) γglutamic acid (γGlu); and (ii) a second amino acid selected from the group consisting of glycine (Gly), alanine (Ala), valine (Val), leucine (Leu), isoleucine (Ile), proline (Pro), phenylalanine (Phe), methionine (Met), tyrosine (Tyr), tryptophan (Trp) and cysteine (Cys).

In certain non-limiting embodiments, the present disclosure provides for a flavor composition comprising a peptide, wherein the peptide comprises (i) γglutamic acid (γGlu); (ii) an amino acid selected from the group consisting of a valine (Val), leucine (Leu), isoleucine (Ile) and proline (Pro); and (iii) a third amino acid selected from the group consisting of glycine (Gly), alanine (Ala), valine (Val), leucine (Leu), isoleucine (Ile), proline (Pro), phenylalanine (Phe), methionine (Met), tyrosine (Tyr), tryptophan (Trp) and cysteine (Cys).

In certain non-limiting embodiments, the present disclosure provides for a flavor composition comprising a peptide selected from the group consisting of pGlu-Val, pGlu-Phe, pGlu-Pro, pGlu-Leu, pGlu-Cys and combinations thereof.

In certain non-limiting embodiments, the present disclosure provides for a flavor composition comprising a peptide selected from the group consisting of pGlu-Pro-Gln, pGlu-Val-Val, pGlu-Pro-Ser, pGlu-Pro-Glu, pGlu-Leu-Leu, pGlu-Val-Gln, pGlu-Val-Glu, pGlu-Val-Ile, pGlu-Val-Pro, pGlu-Val-Ala, pGlu-Val-Gly, pGlu-Val-Cys, pGlu-Val-Leu, pGlu-Cys-Gly, pGlu-Cys-Cys, pGlu-Cys-Val and combinations thereof.

In certain non-limiting embodiments, the present disclosure provides for a flavor composition comprising a γGlu-Val peptide.

In certain non-limiting embodiments, the present disclosure provides for a flavor composition comprising a peptide selected from the group consisting of γGlu-Val-Gly, γGlu-Val-Leu, γGlu-Cys-Gly and combinations thereof.

In certain non-limiting embodiments, the present disclosure provides for a flavor composition comprising a peptide selected from the group consisting of Gln-Val-Leu, Glu-Val-Leu, pGlu-Gly-Ala-Ile-Phe, pGlu-Val-Leu-Leu, pGlu-Val-Val-Val and combinations thereof.

In certain non-limiting embodiments, the present disclosure provides for a flavor composition comprising a peptide selected from the group consisting of pGlu-Val-Leu, pGlu-Val, pGlu-Val-Val, pGlu-Val-Cys and combinations thereof.

In certain non-limiting embodiments, the present disclosure provides for a flavor composition comprising a peptide selected from the group consisting of pGlu-Cys, pGlu-Cys-Gly, pGlu-Cys-Cys, pGlu-Cys-Val and combinations thereof.

In certain non-limiting embodiments, the present disclosure provides for a flavor composition comprising a peptide as described herein, wherein the flavor composition is prepared from a food product source, wherein the food product source is subjected to hydrolysis, fractionation, extraction, enrichment or combinations thereof.

In certain non-limiting embodiments, the present disclosure provides for a flavor composition comprising a peptide as described herein wherein the flavor composition is prepared from a food product source selected from the group consisting of cacao, wheat and soy.

In certain non-limiting embodiments, the present disclosure provides for a flavor composition comprising a peptide as described herein, wherein the flavor composition peptide is a synthetic peptide.

In certain non-limiting embodiments, the present disclosure provides for a food product comprising a flavor composition peptide as described herein, wherein the peptide is present at a concentration of from about 0.0000001 to about 1.0% weight/weight of the food product.

In certain non-limiting embodiments, the present disclosure provides for a food product comprising a flavor composition peptide as described herein, wherein the peptide is present at a concentration of from about 0.1 to about 1000 ppb of the food product.

In certain non-limiting embodiments, the present disclosure provides for a food product comprising a flavor composition peptide as described herein, wherein the peptide is present at a concentration of from about 0.1 to about 100 ppb of the food product.

In certain non-limiting embodiments, the present disclosure provides for a food product comprising a flavor composition peptide as described herein, wherein the peptide is present at a concentration of from about 0.1 to about 100 ppt of the food product.

9. Non-Limiting Examples of Methods of the Disclosure

In certain non-limiting embodiments, the present disclosure provides for a method of increasing a saltiness intensity in a food product comprising admixing the food product with a flavor composition comprising a peptide as described herein, wherein the flavor composition peptide is present at a concentration of from about 0.0000001 to about 1.0% in the admixture.

In certain non-limiting embodiments, the present disclosure provides for a method of increasing a saltiness intensity in a food product comprising admixing the food product with a flavor composition comprising a peptide as described herein, wherein the increase in saltiness intensity comprises an increase in saltiness aftertaste.

In certain non-limiting embodiments, the present disclosure provides for a method of increasing a saltiness intensity in a food product comprising admixing the food product with a flavor composition comprising a peptide as described herein, wherein the flavor composition peptide is present at a concentration of from about 0.1 to about 1000 ppb in the admixture.

In certain non-limiting embodiments, the present disclosure provides for a method of increasing a saltiness intensity in a food product comprising admixing the food product with a flavor composition comprising a peptide as described herein, wherein the flavor composition peptide is present at a concentration of from about 0.1 to about 100 ppb in the admixture.

In certain non-limiting embodiments, the present disclosure provides for a method of increasing a saltiness intensity in a food product comprising admixing the food product with a flavor composition comprising a peptide as described herein, wherein the flavor composition peptide is present at a concentration of from about 0.1 to about 50 ppb.

In certain non-limiting embodiments, the present disclosure provides for a method of increasing a saltiness intensity in a food product comprising admixing the food product with a flavor composition comprising a peptide as described herein, wherein the flavor composition peptide is present at a concentration selected from the group consisting of about 0.1 ppb, about 0.5 ppb, about 1 ppb, about 10 ppb, about 40 ppb and about 50 ppb.

In certain non-limiting embodiments, the present disclosure provides for a method of increasing a saltiness intensity in a food product comprising admixing the food product with a flavor composition comprising a peptide as described herein, wherein the flavor composition peptide is present at a concentration of from about 1 to about 100 ppb.

In certain non-limiting embodiments, the present disclosure provides for a method of reducing the amount of sodium chloride in a food product comprising admixing the food product with a flavor composition comprising a peptide as described herein, wherein the flavor composition peptide is present at a concentration of from about 0.1 to about 1000 ppb in the admixture.

In certain non-limiting embodiments, the present disclosure provides for a method of reducing the amount of sodium chloride in a food product comprising admixing the food product with a flavor composition comprising a peptide as described herein, wherein the amount of sodium chloride in the food system is reduced by at least 10%.

In certain non-limiting embodiments, the present disclosure provides for a method of increasing an umami intensity in a food product comprising admixing the food product with a flavor composition comprising a peptide as described herein, wherein the flavor composition peptide is present at a concentration of from about 0.1 to about 1000 ppt in the admixture.

In certain non-limiting embodiments, the present disclosure provides for a method of increasing an umami intensity in a food product comprising admixing the food product with a flavor composition comprising a peptide as described herein, wherein the flavor composition peptide is present at a concentration of from about 0.1 to about 100 ppb in the admixture.

In certain non-limiting embodiments, the present disclosure provides for a method of increasing an umami intensity in a food product comprising admixing the food product with a flavor composition comprising a peptide as described herein, wherein the increase in umami intensity comprises an increase in umami aftertaste.

In certain non-limiting embodiments, the present disclosure provides for a method of increasing an umami intensity in a food product comprising admixing the food product with a flavor composition comprising a peptide as described herein, wherein the flavor composition peptide is present at a concentration of from about 0.1 to about 50 ppb.

In certain non-limiting embodiments, the present disclosure provides for a method of increasing an umami intensity in a food product comprising admixing the food product with a flavor composition comprising a peptide as described herein, wherein the flavor composition peptide is present at a concentration selected from the group consisting of about 0.1 ppb, about 0.5 ppb, about 1 ppb, about 10 ppb, about 40 ppb and about 50 ppb.

In certain non-limiting embodiments, the present disclosure provides for a method of increasing an umami intensity in a food product comprising admixing the food product with a flavor composition comprising a peptide as described herein, wherein the flavor composition peptide is present at a concentration of from about 1 to about 100 ppb.

In certain non-limiting embodiments, the present disclosure provides for a method of increasing a bitter intensity in a food product comprising admixing the food product with a flavor composition comprising a peptide as described herein, wherein the flavor composition peptide is present at a concentration of from about 0.0000001 to about 1.0% in the admixture.

In certain non-limiting embodiments, the present disclosure provides for a method of increasing a bitter intensity in a food product comprising admixing the food product with a flavor composition comprising a peptide as described herein, wherein the flavor composition peptide is present at a concentration of from about 0.1 to about 100 ppb in the admixture.

In certain non-limiting embodiments, the present disclosure provides for a method of increasing an astringent intensity in a food product comprising admixing the food product with a flavor composition comprising a peptide as described herein, wherein the flavor composition peptide is present at a concentration of from about 0.0000001 to about 1.0% in the admixture.

In certain non-limiting embodiments, the present disclosure provides for a method of increasing an astringent intensity in a food product comprising admixing the food product with a flavor composition comprising a peptide as described herein, wherein the flavor composition peptide is present at a concentration of from about 0.1 to about 100 ppb in the admixture.

In certain non-limiting embodiments, the present disclosure provides for a method of increasing a saltiness, umami, bitter and/or astringent intensity in a food product comprising admixing the food product with a flavor composition comprising a peptide as described herein, wherein the flavor composition and/or the food product comprises a salt selected from the group consisting of sodium chloride and potassium chloride, and wherein the method further comprising reducing the concentration of salt in the food product.

In certain non-limiting embodiments, the present disclosure provides for a method of increasing a sourness intensity in a chocolate confection comprising admixing the chocolate confection with a flavor composition comprising a peptide as described herein, wherein the flavor composition peptide is present at a concentration of from about 0.00001 to about 1.0% w/w in the admixture.

In certain non-limiting embodiments, the present disclosure provides for a method of increasing a sourness intensity in a chocolate confection comprising admixing the chocolate confection with a flavor composition comprising a peptide as described herein, wherein the flavor composition peptide is present at a concentration of from about 0.1 to about 100 ppb in the admixture.

In certain non-limiting embodiments, the present disclosure provides for a method of preparing a flavor composition comprising a peptide as described herein, comprising synthesizing a synthetic peptide, wherein the synthetic peptide is at least 99% pure.

In certain non-limiting embodiments, the present disclosure provides for a method of preparing a flavor composition comprising a peptide as described herein, wherein the method comprises (i) providing a food product source, and (ii) subjecting the food product source to fractionation, extraction, or a combination thereof, to produce a composition enriched for the peptide. In certain non-limiting embodiments, the extraction is selected from the group consisting of ethanol extraction and liquid/solid extraction. In certain non-limiting embodiments, the fractionation is solid phase fractionation.

In certain non-limiting embodiments, the present disclosure provides for a method of preparing a flavor composition comprising a peptide as described herein, wherein the method comprises (i) providing a food product source, and (ii) subjecting the food product source to hydrolysis to produce a composition enriched for the peptide.

In certain non-limiting embodiments, the present disclosure provides for a method of preparing a flavor composition comprising a peptide as described herein, wherein the method comprises (i) providing a food product source, and (ii) subjecting the food product source to hydrolysis, fractionation, extraction, or a combination thereof, to produce a composition enriched for the peptide. In certain non-limiting embodiments, the extraction is selected from the group consisting of ethanol extraction and liquid/solid extraction. In certain non-limiting embodiments, the fractionation is solid phase fractionation.

EXAMPLES

The presently disclosed subject matter will be better understood by reference to the following Examples, which are provided as exemplary of the invention, and not by way of limitation.

Example 1—Preparation of a Peptide Composition by Hydrolysis

The present example described the preparation of peptide for use in a flavor composition through the hydrolysis cocoa bean liquor made from West African cocoa beans.

Reagents: A solution of 4N HCl was prepared by adding 100 mL 34-37% HCl in a 250 mL volumetric flask and filling it with water. A solution of 4N NaOH was prepared by dissolving 80 g NaOH pellets in 500 mL of water in a volumetric flask.

Method: Cocoa liquor was run through a sieve and 30.09 g of fine powder was weighed into a 500 mL 3-neck round-bottom flask. The liquor was dissolved in 4N HCl (200 mL) and a stir bar was added to the flask. The sample was stirred at room temperature until the liquor was fully dispersed and flowed freely. A condenser was affixed to the flask and held at 8° C. A digital thermometer was pierced through a rubber stopper to measure the temperature of the solution. The third neck was plugged with a rubber stopper. The flask was wrapped in aluminum foil and heated to approximately 106° C. using a heating mantle. The sample was refluxed for 4.5 hours and left to cool to room temperature. The sample was transferred to a 1 L beaker and neutralized to pH 7 with 4N NaOH using a digital pH meter (pH 6.98 @ 29° C.). The sample was divided equally into 4 250 mL centrifuge tubes and centrifuged for 10 minutes @ 4500 rpm. The supernatant was filtered under vacuum through a Buchner funnel. The filtrate was then transferred to 2 32 oz plastic containers and lyophilized (yield 52.50 g).

Example 1a—Preparation of a Peptide Composition by Extraction and Fractionation of a Cocoa Liquor Hydrolysate 1. Hydrolysis of Cocoa Powder
   Preparation: A solution of 4N HCl was prepared by adding 100 mL 34-37% HCl in a 250 mL volumetric flask and filling it to the line with water. A solution of 4N NaOH was prepared by dissolving 80 g NaOH pellets in 500 mL of water in a volumetric flask.
   Procedure: Cocoa liquor made from West African cocoa beans was run through a sieve and 30.09 g of fine powder was weighed into a 500 mL 3-neck round-bottom flask. The liquor was dissolved in 4N HCl (200 mL) and a stir bar was added to the flask. The sample was stirred at room temperature until the liquor was fully dispersed and flowed freely. A condenser was affixed to the flask and held at 8° C. A digital thermometer was pierced through a rubber stopper to measure the temperature of the solution. The third neck was plugged with a rubber stopper. The flask was wrapped in aluminum foil and heated to approximately 106° C. using a heating mantle. The sample was refluxed for 4.5 hours and left to cool to room temperature. The sample was transferred to a 1 L beaker and neutralized to pH 7 with 4N NaOH using a digital pH meter (pH 6.98 @ 29° C.). The sample was divided equally into 4 250 mL centrifuge tubes and centrifuged for 10 minutes @ 4500 rpm. The supernatant was filtered under vacuum through a Buchner funnel. The filtrate was then transferred to 2 32 oz plastic containers and lyophilized.
2. Ethanol Extraction of Hydrolyzed Cocoa Powder
   The hydrolyzed cocoa powder was extracted with ethanol to remove a bulk of the salts generated during neutralization. Hydrolyzed cocoa powder (50.36 g) was divided equally into 2 500 mL centrifuge tubes. Ethanol (200 mL) was added slowly to each tube as to not disturb the sample. The samples were shaken for 15 minutes on an autoshaker and then centrifuged for 10 minutes @ 4500 rpm. The supernatant was decanted into a 1000 mL round-bottom flask. The residue was scraped off the bottom of the tubes and redissolved in ethanol (200 mL each). The samples were shaken for 15 minutes on an autoshaker and then centrifuged for 10 minutes @ 4500 rpm. The supernatant was combined with the previous supernatant and evaporated under reduced pressure to remove all organic solvent. The remaining solids were redissolved in approximately 100 mL deionized water and lyophilized.
3. SPE (Solid Phase Extraction) Fractionation of HCP (Hydrolysed Cocoa Powder) Ethanol Extract
   The extract previously obtained was further fractionated to exhaustively remove the salts and hydrophilic molecules. HCP ethanol extract was transferred to 14 glass vials (approximately 0.5 g each, 20 mL volume) and dissolved in DI water (10 mL). The samples were shaken until dissolved (approximately 1 minute). The samples were filtered through a syringe and PTFE filter to remove particulates as necessary. A solid phase extraction (SPE) cartridge (20 g/60 mL, C18 stationary phase) was conditioned sequentially with DI water (100 mL), methanol (100 mL), and DI water (100 mL). The sample (10 mL) was then loaded onto cartridge and washed with DI water (100 mL) and extracted with methanol (100 mL). The cartridge was reconditioned and the remaining 13 samples were washed and extracted as previously described. The organic solutions were combined and rotary evaporated under reduced pressure. The residue was redissolved in DI water and lyophilized using a Labconco freeze dryer. The sample was separated by high-performance liquid chromatography (HPLC) to narrow down the taste-active molecules of interest.

Example 1b—Preparation of a Peptide Composition by Extraction and Fractionation of Cocoa Liquor 1. Liquid/Solid Extraction of Liquor
   Cocoa Liquor made from cocoa beans sourced from Papua New Guinea (PNG liquor) (600 g) was frozen in liquid nitrogen and ground into a fine powder with a laboratory mill. The powder was divided equally into six plastic centrifuge tubes (500 mL volume). Each sample (100 g PNG liquor) was extracted with diethyl ether (200 mL) for 15 minutes using an autoshaker to remove the fat. After centrifugation (10 min, 4500 rpm), the supernatant was discarded. The extraction process was repeated three more times for a total of four times. The remaining defatted liquor was left to air dry in a fume hood overnight. Defatted liquor (200 g) was divided equally between four plastic centrifuge bottles (250 mL volume). To each sample (50 g defatted PNG liquor), 150 mL 70:30 acetone:water was added. The bottles were placed on an autoshaker for 15 minutes. Each sample was centrifuged (5 min, 3500 rpm) and then the supernatant was vacuum filtered using Whatman 540 filter paper and a Buchner funnel. The residue was freed from the bottom of the bottles by hand and additional 70:30 acetone:water (100 mL) was added to each sample. The samples were shaken for 15 minutes using an autoshaker. After centrifugation (10 min, 4500 rpm), the supernatant was vacuum filtered again using the same procedure described above. The supernatants from each extraction were combined (~800 mL) and the residue was discarded. The supernatant was rotary evaporated under reduced pressure and the remaining aqueous solution (~250 mL) was transferred into a separatory funnel (1000 mL volume). The aqueous solution was washed with Dichloromethane (3×300 mL) to remove any xanthines. The dichloromethane layer was discarded, then the aqueous solution was washed sequentially with n-butyl acetate (3×300 mL), ethyl acetate (3×300 mL), and methyl acetate (3×300 mL) to remove procyanidins. The organic layers were discarded and the aqueous solution (F7) was rotary evaporated under reduced pressure to remove any remaining solvent. The remaining water solution was lyophilized using a Labconco freeze dryer (100×10$^{-3}$ mbar, −40° C.). Sensory analysis was performed and the savory attribute was found to be in F7.

2. Solid Phase Extraction (SPE)

For removal of any residual salts, treated PNG liquor powder (F7) was transferred to 14 glass vials (20 mL volume, approximately 0.5 g sample in each vial) and dissolved in DI water (10 mL). The samples were shaken until dissolved (approximately 1 minute). A solid phase extraction (SPE) cartridge (20 g/60 mL, C18 stationary phase) was conditioned sequentially with DI water (100 mL), methanol (100 mL), and DI water (100 mL). The vacuum was broken and the sample (10 mL) was then loaded onto cartridge. The vacuum was resumed and the sample was washed with DI water (100 mL). The receptacle flask was changed and the sample was extracted with methanol (100 mL). The cartridge was reconditioned and the remaining 13 samples were washed and extracted as previously described. The organic solutions were combined and rotary evaporated under reduced pressure. The residue was redissolved in DI water and lyophilized using a Labconco freeze dryer (100×10$^{-3}$ mbar, −40° C.). Sensory analysis confirmed the presence of the savory attribute in the organic fraction.

Example 2—Preparation of a Peptide Composition by Synthetic Chemosynthesis

The present example described the preparation of peptide for use in a flavor composition through a synthetic chemosysnthesis method.

Figure 1B:
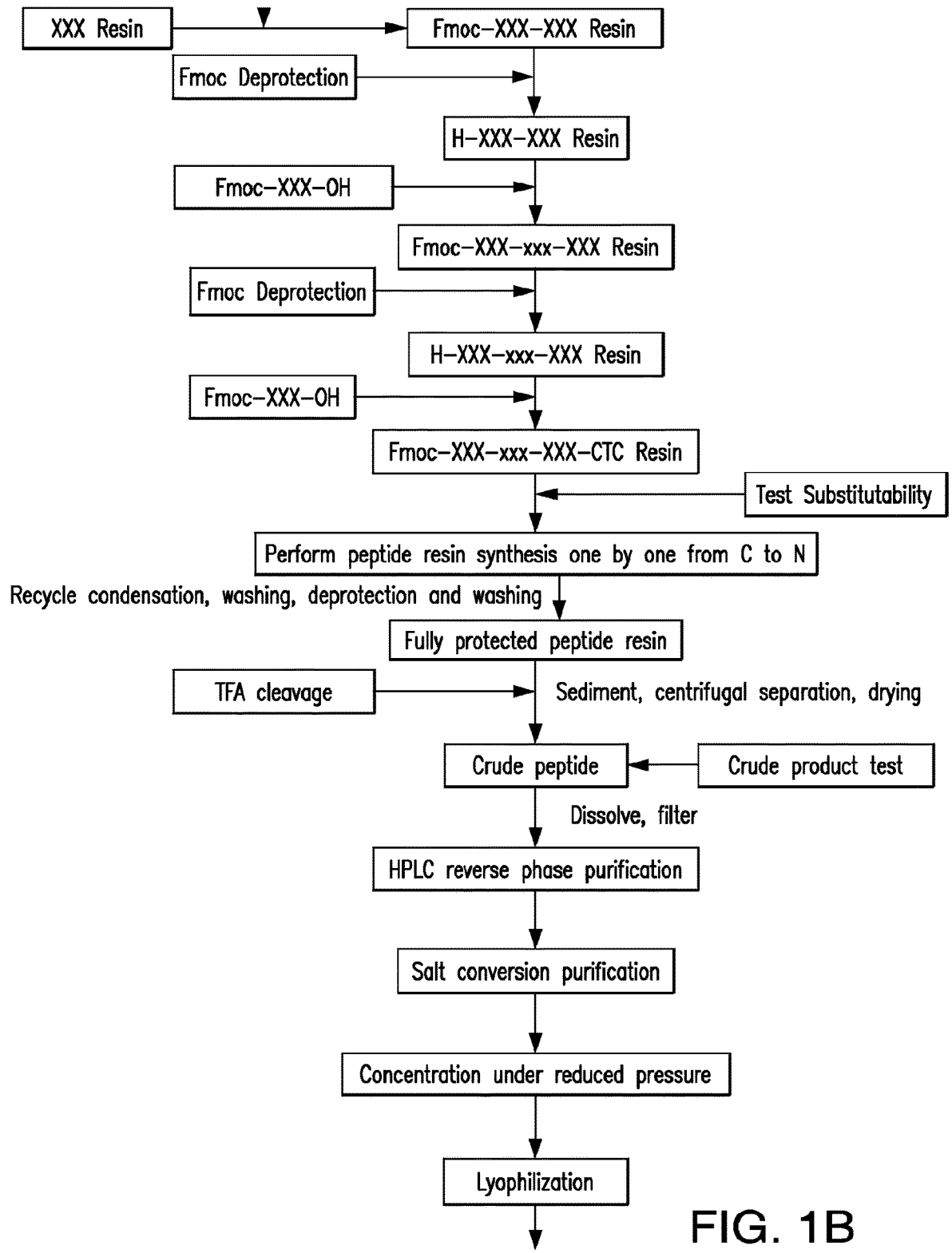
Figure 1B:
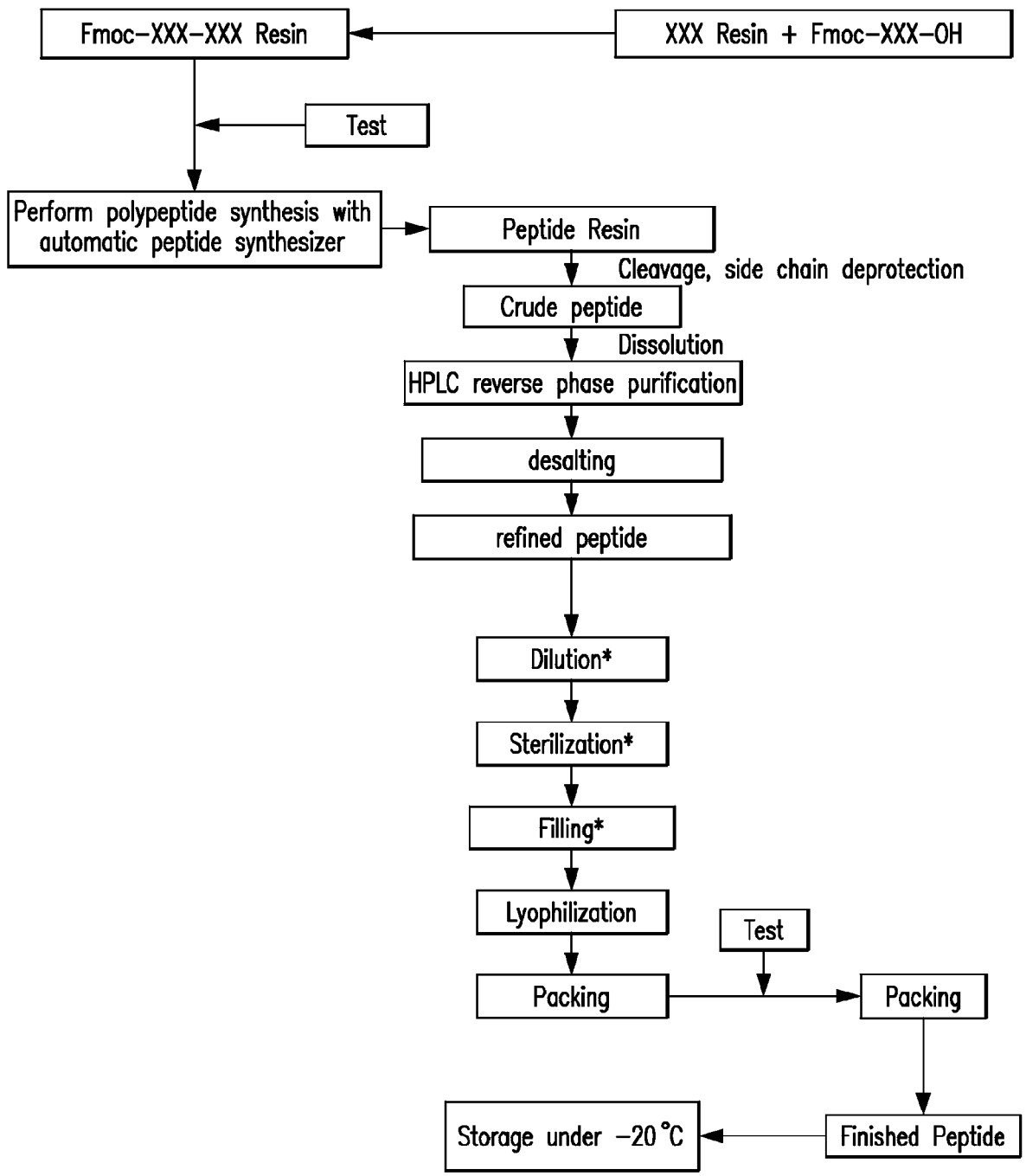
Figure 2:
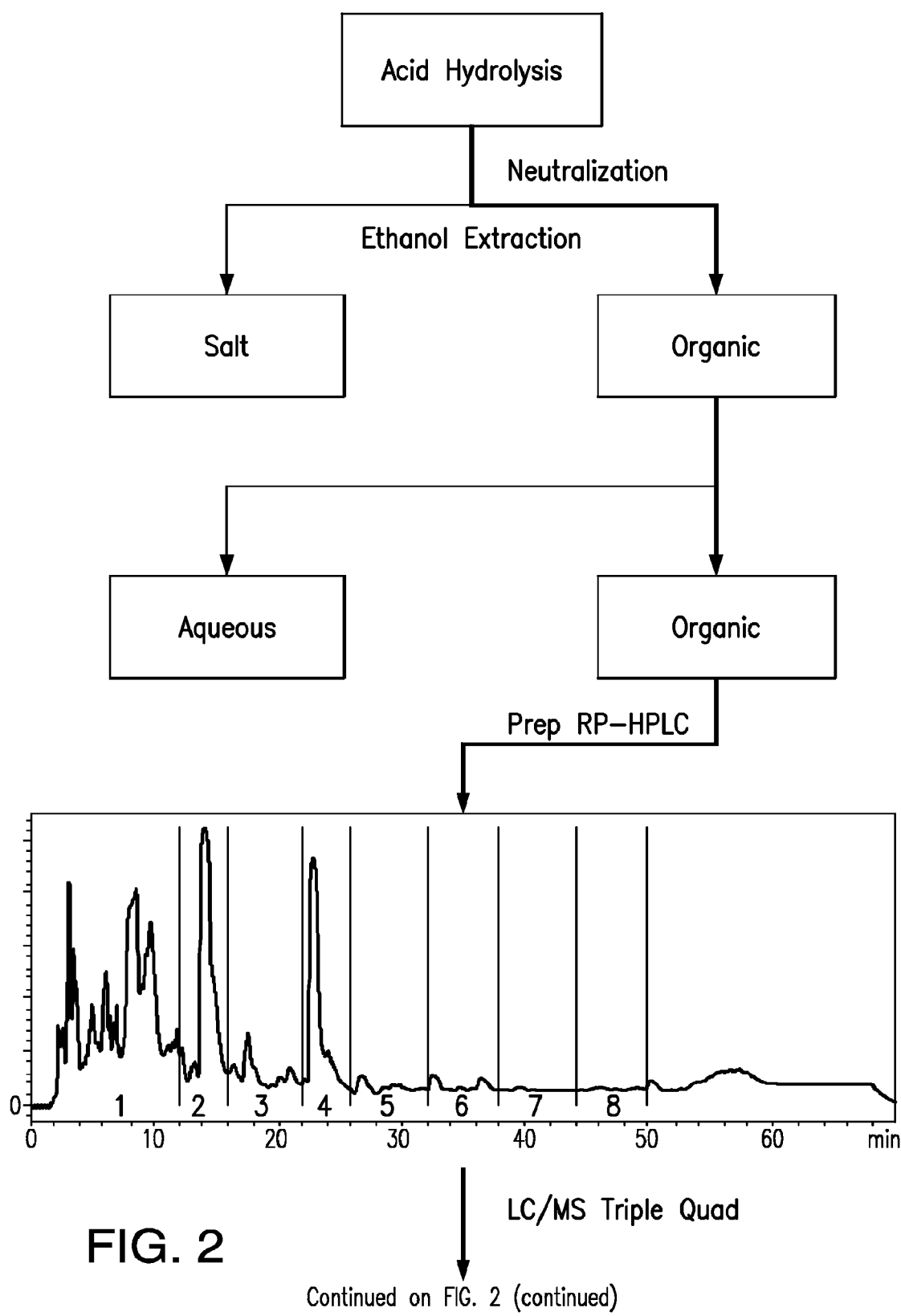
FIG. 2 shows a flowchart describing the stages of a taste-guided fractionation of hydrolyzed cocoa powder (HCP).
Figure 2:
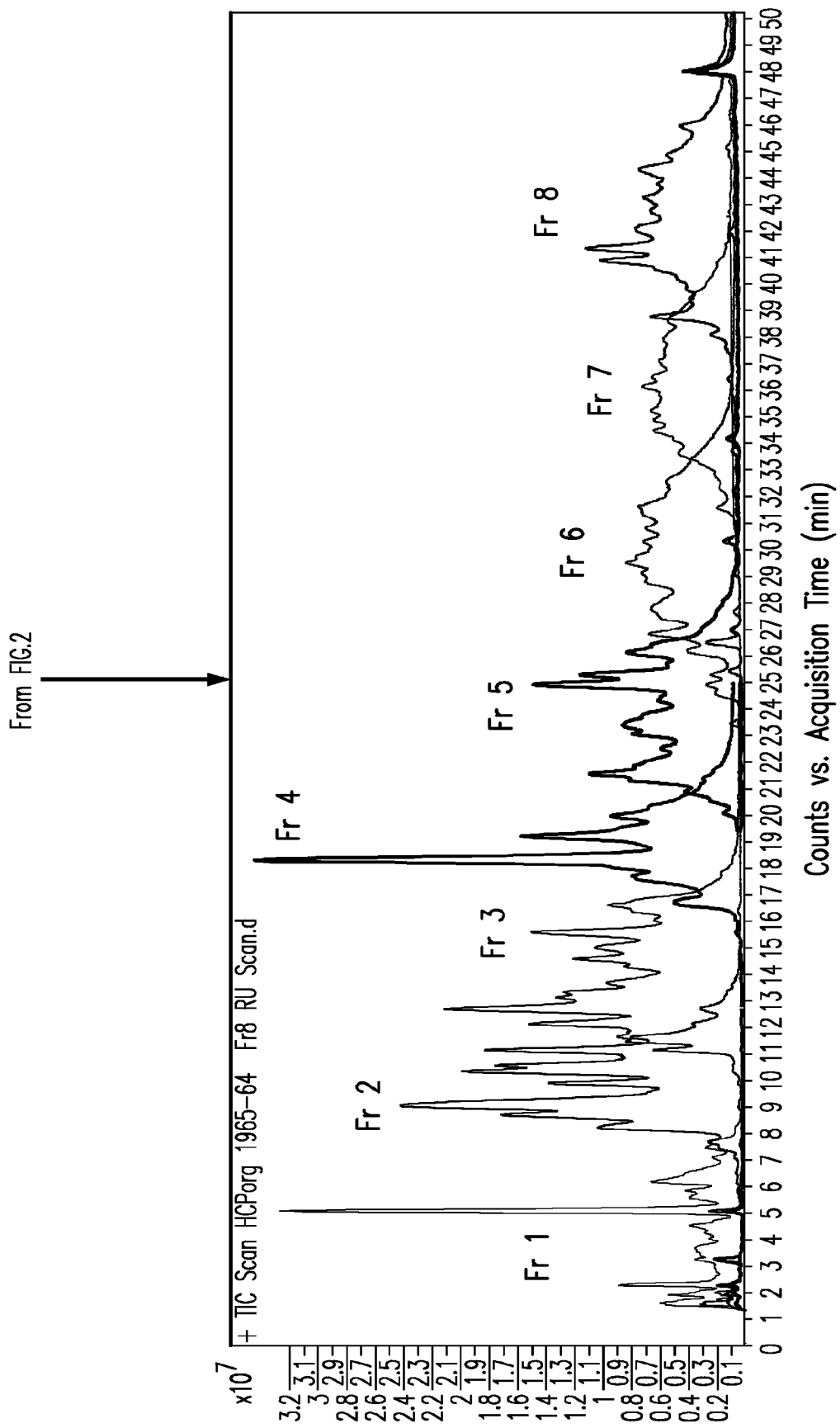
Figure 3:
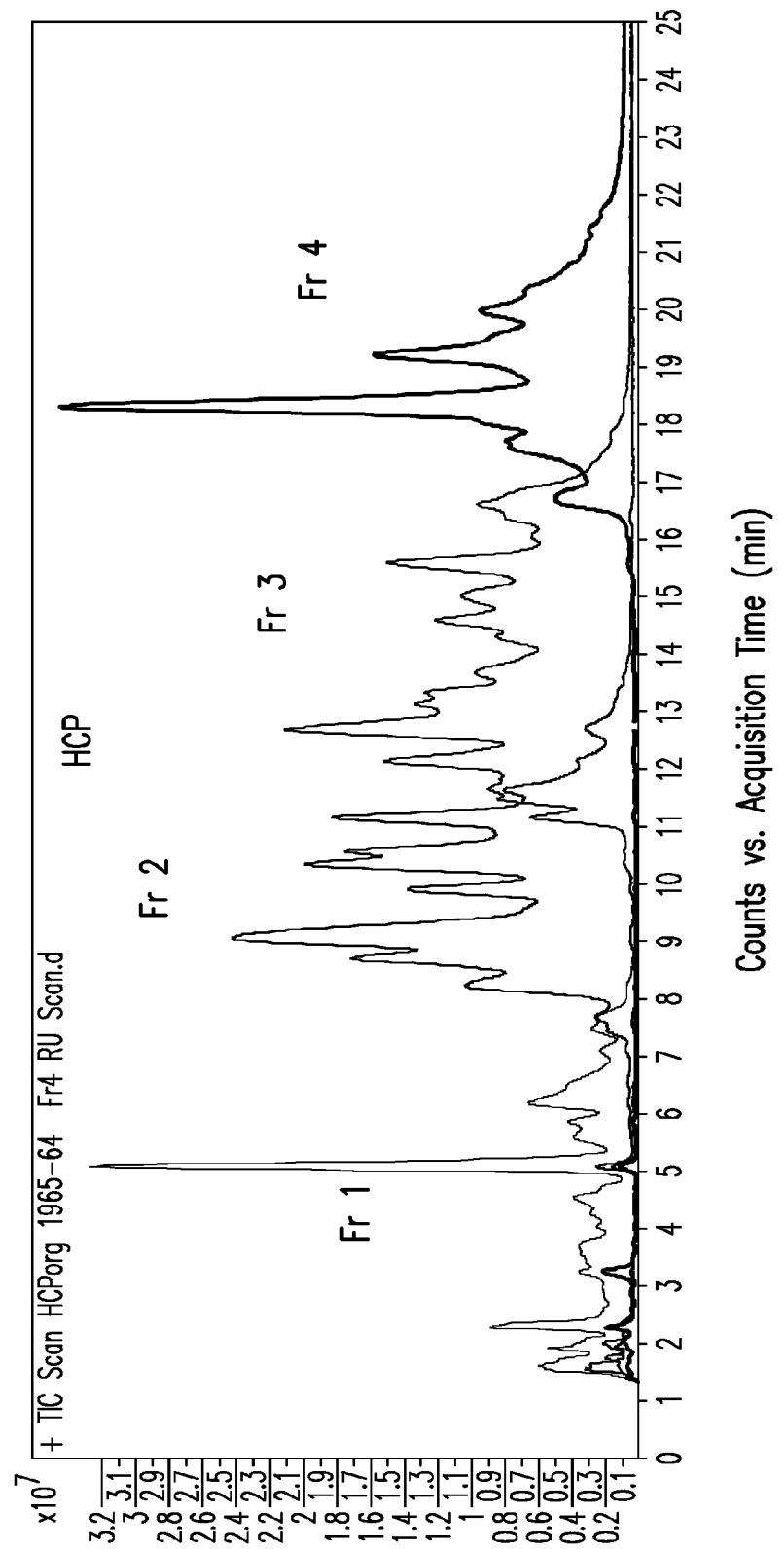
FIG. 3 shows the fractions of a hydrolyzed cocoa powder (HCP). The flavor composition peptide Glu-Val-Leu was isolated from fraction 2, and pGlu-Val-Leu was isolated from fraction 6.
Figure 3:
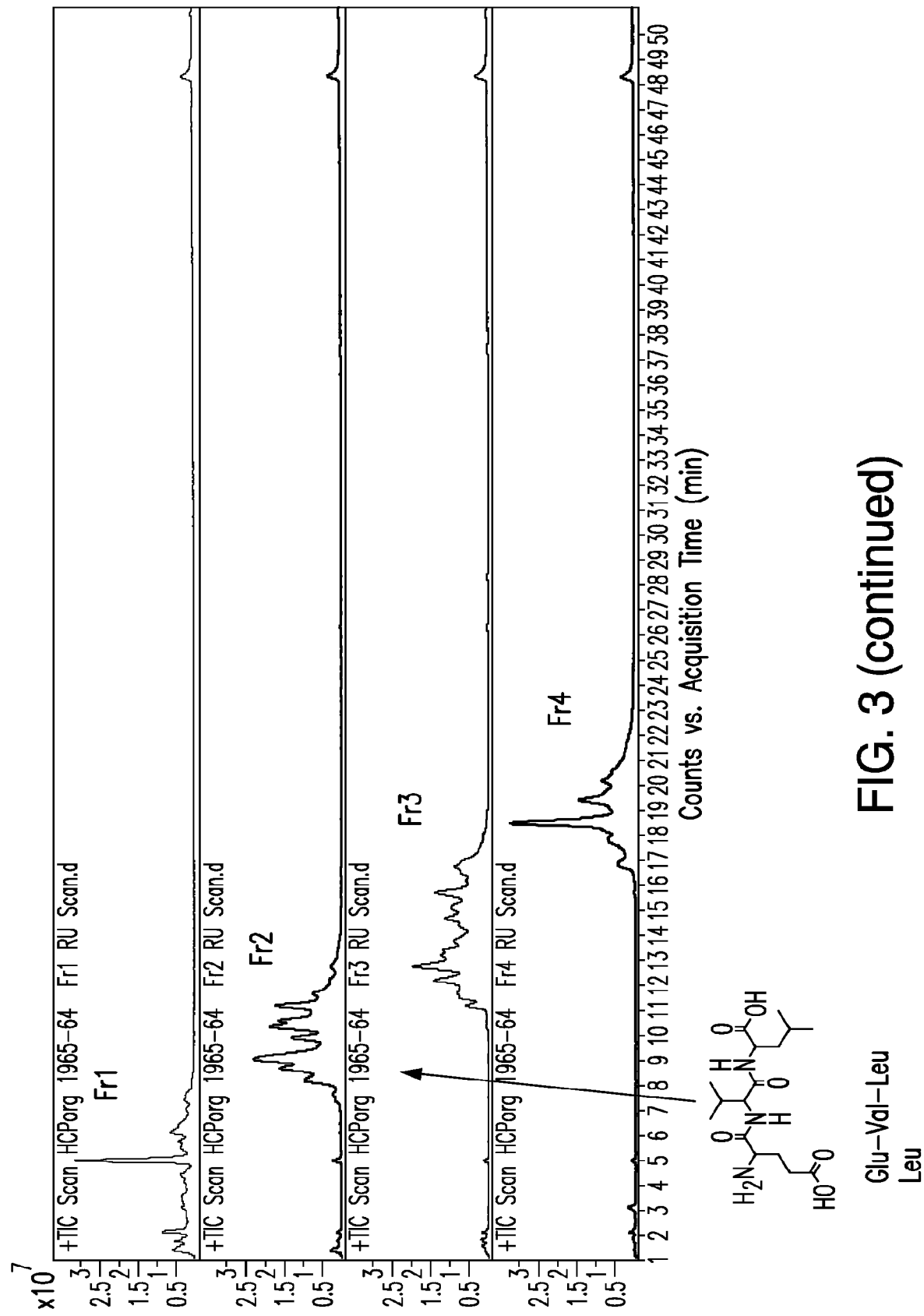
Figure 3:
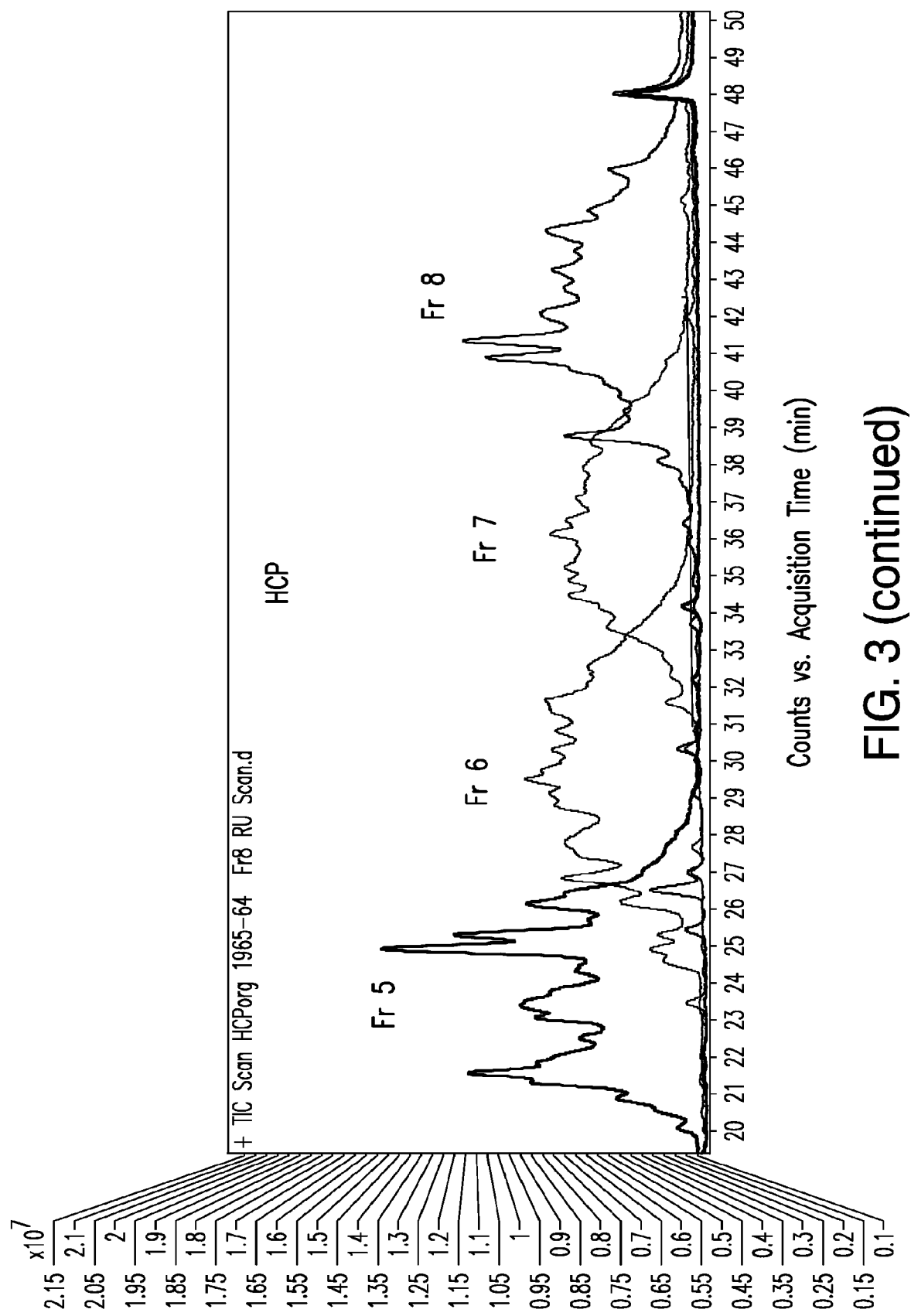
Figure 3:
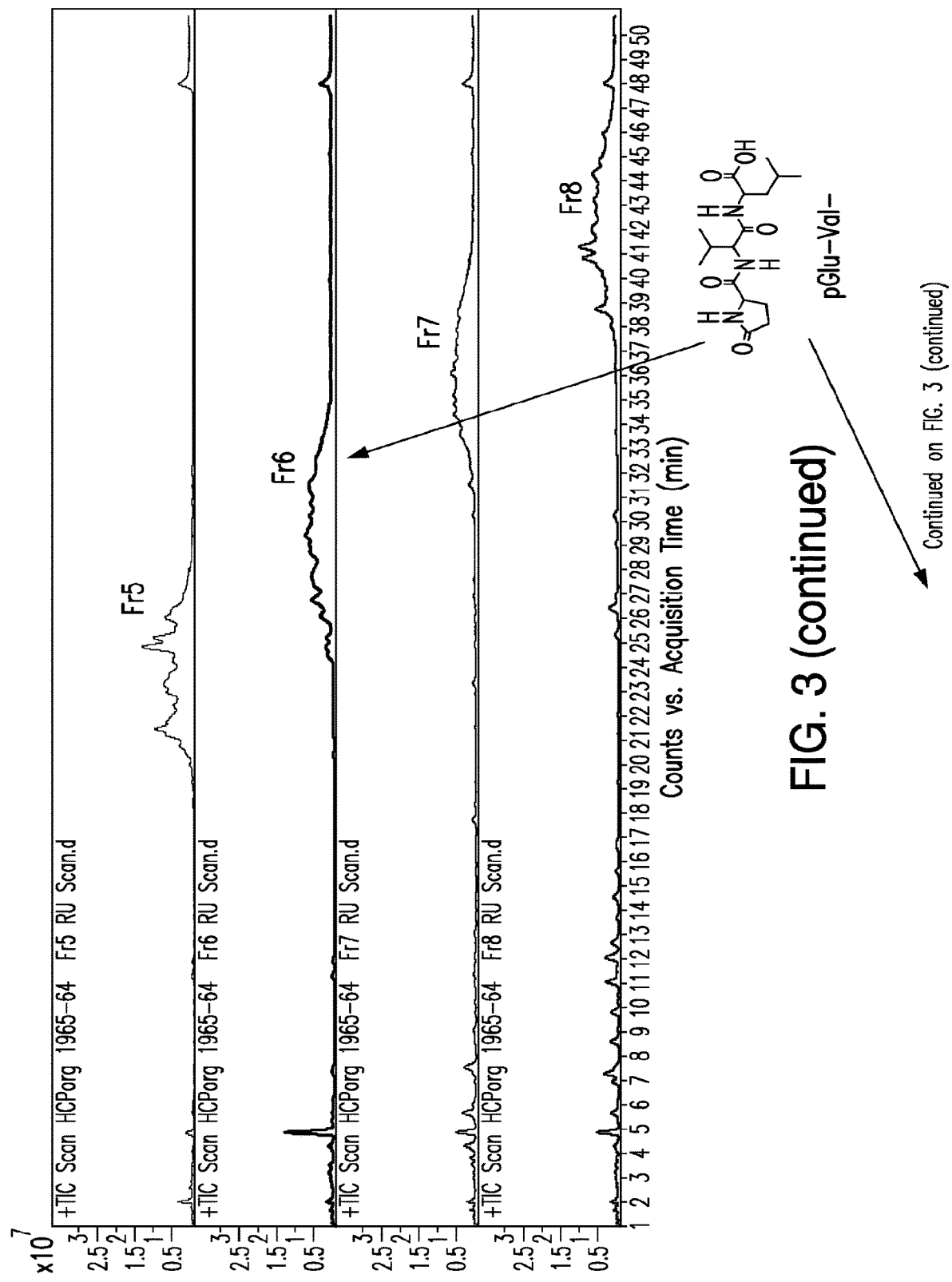
Figure 3:
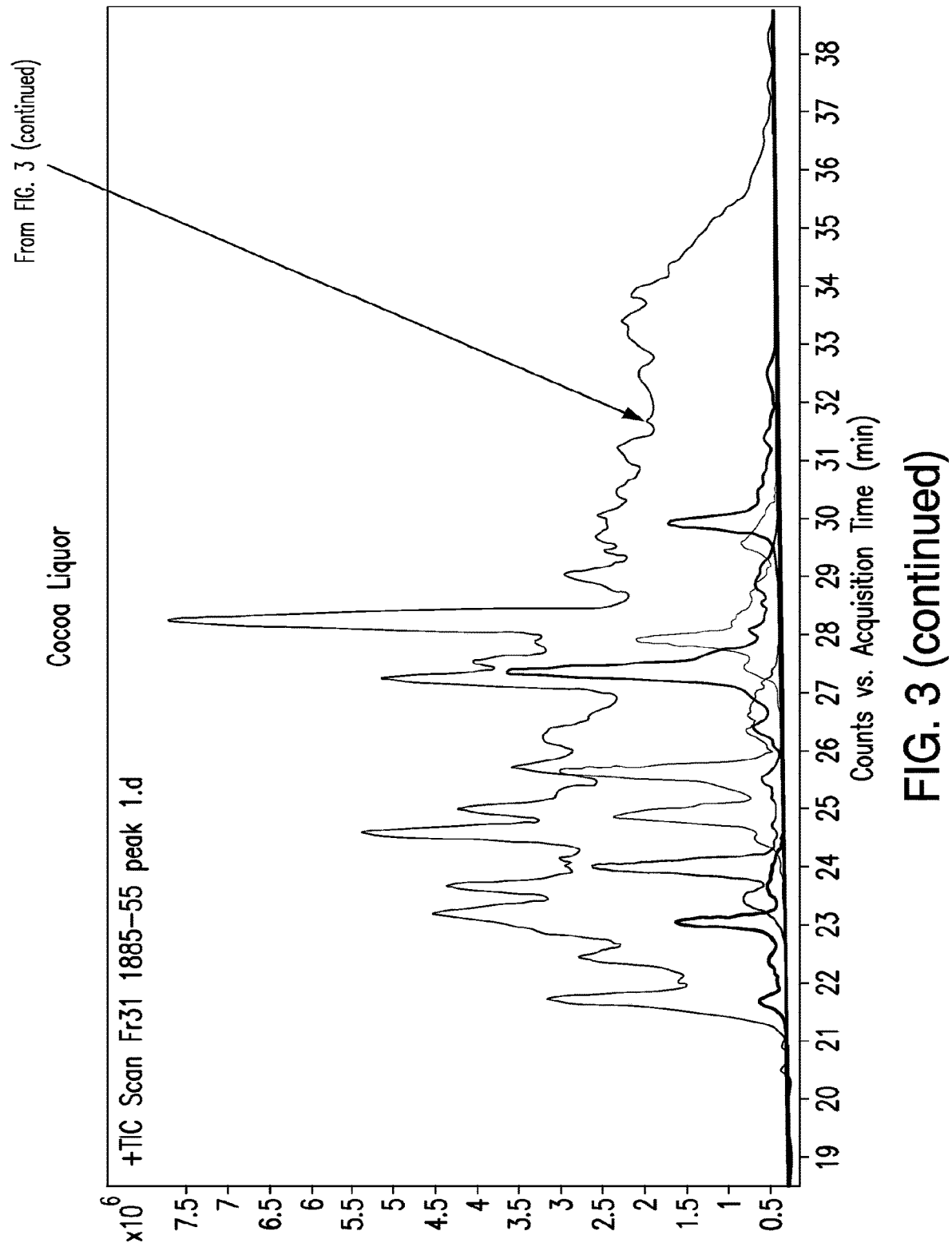
Figure 4:
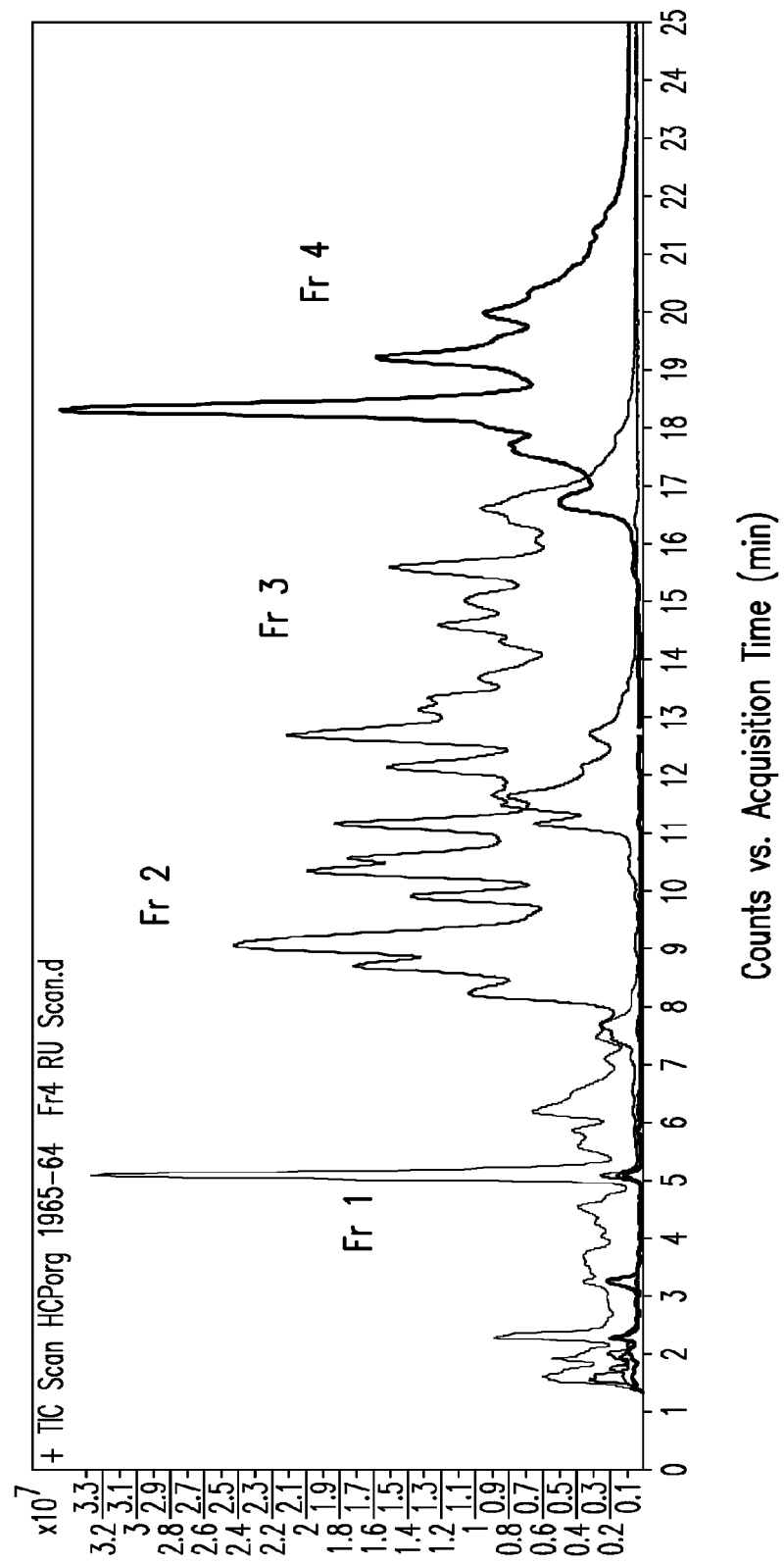
FIG. 4 shows flavor composition peptides isolated from savory fractions 4, 5 and 6 of hydrolyzed cocoa powder (HCP).
Figure 4:
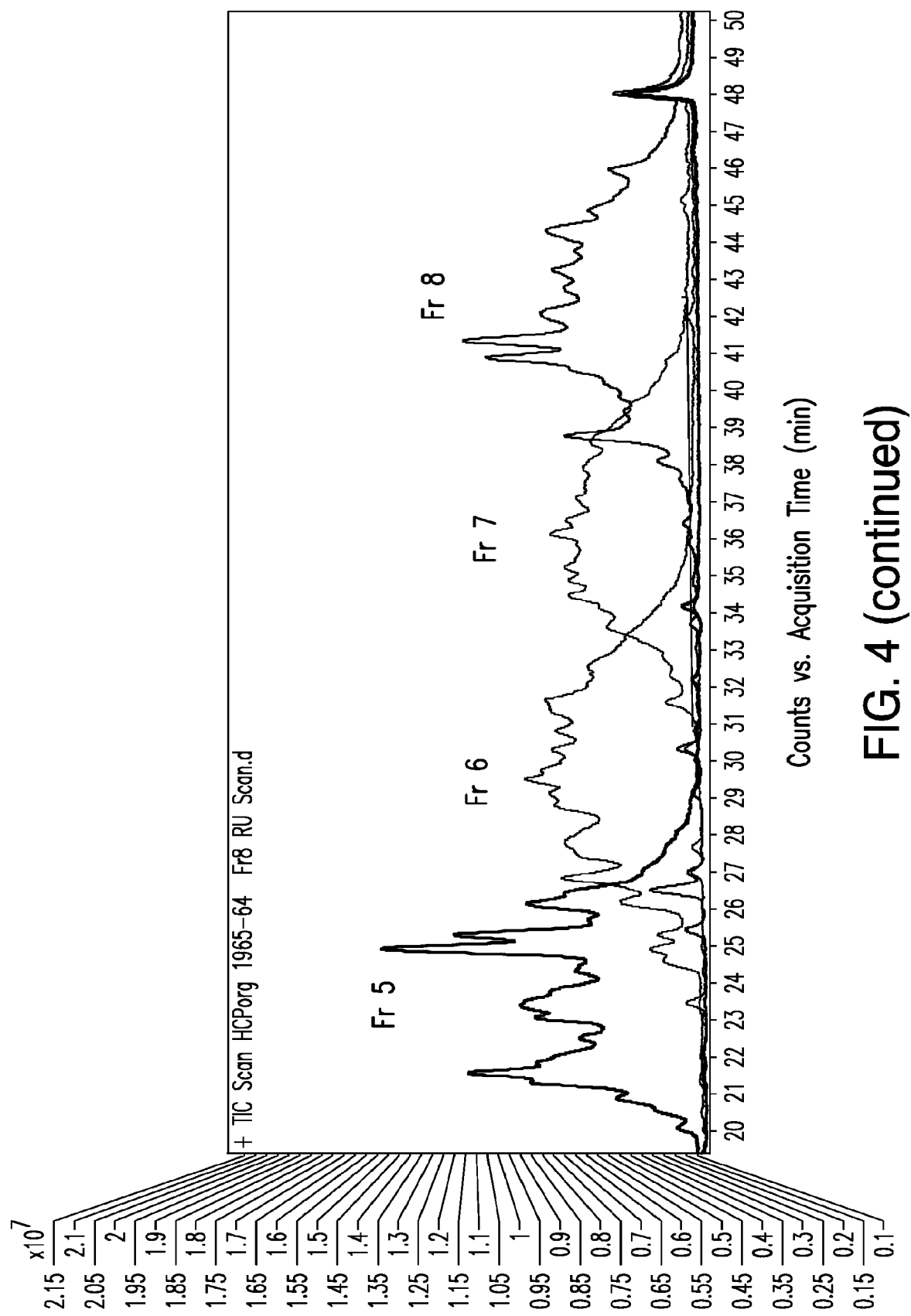
Figure 4:
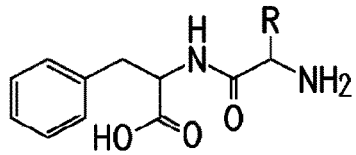
Figure 4:
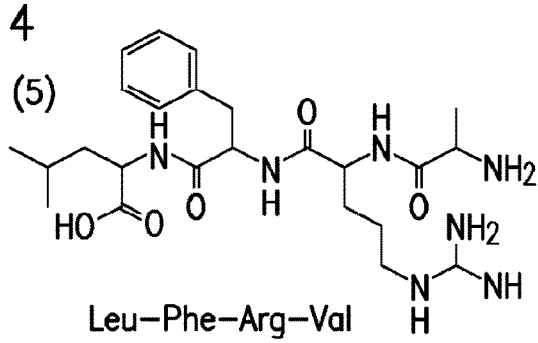
Figure 4:
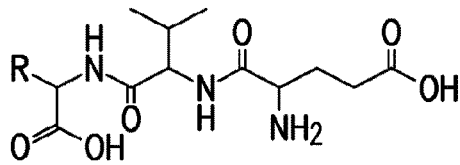
Figure 4:
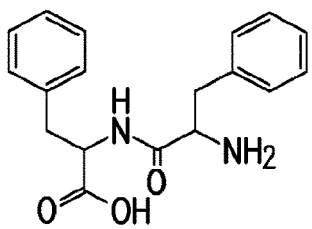
Figure 4:
Figure 4:
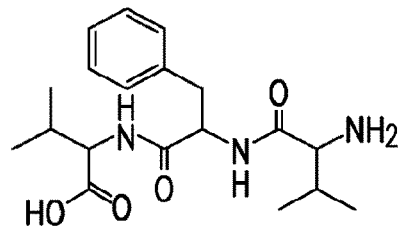
Figure 4:
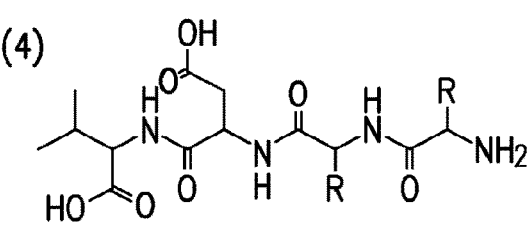
Figure 4:
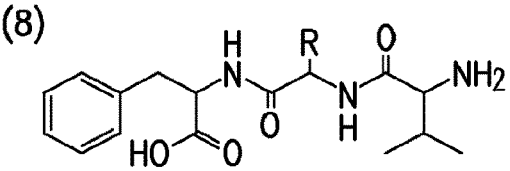
Figure 4:
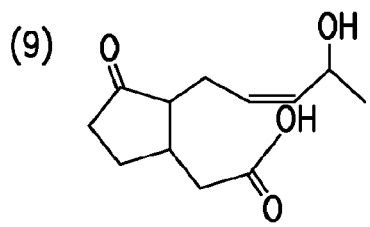
Figure 4:
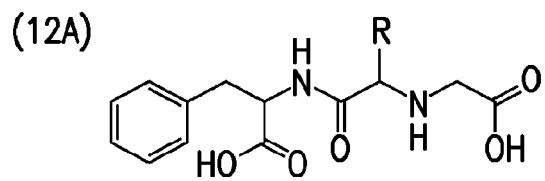
Figure 4:
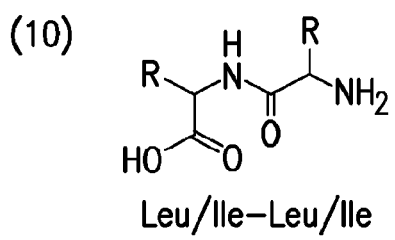
Figure 4:
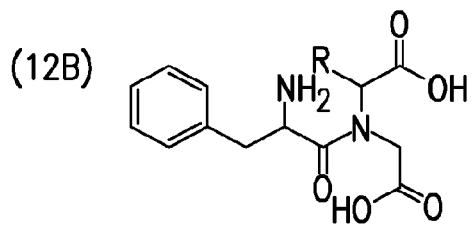
Figure 4:
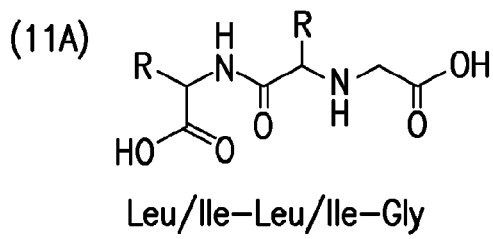
Figure 4:
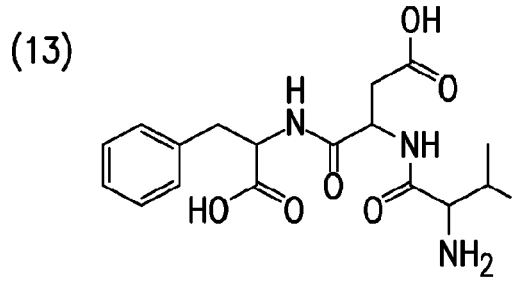
Figure 4:
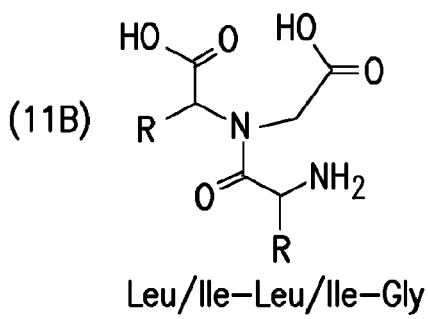
Figure 4:
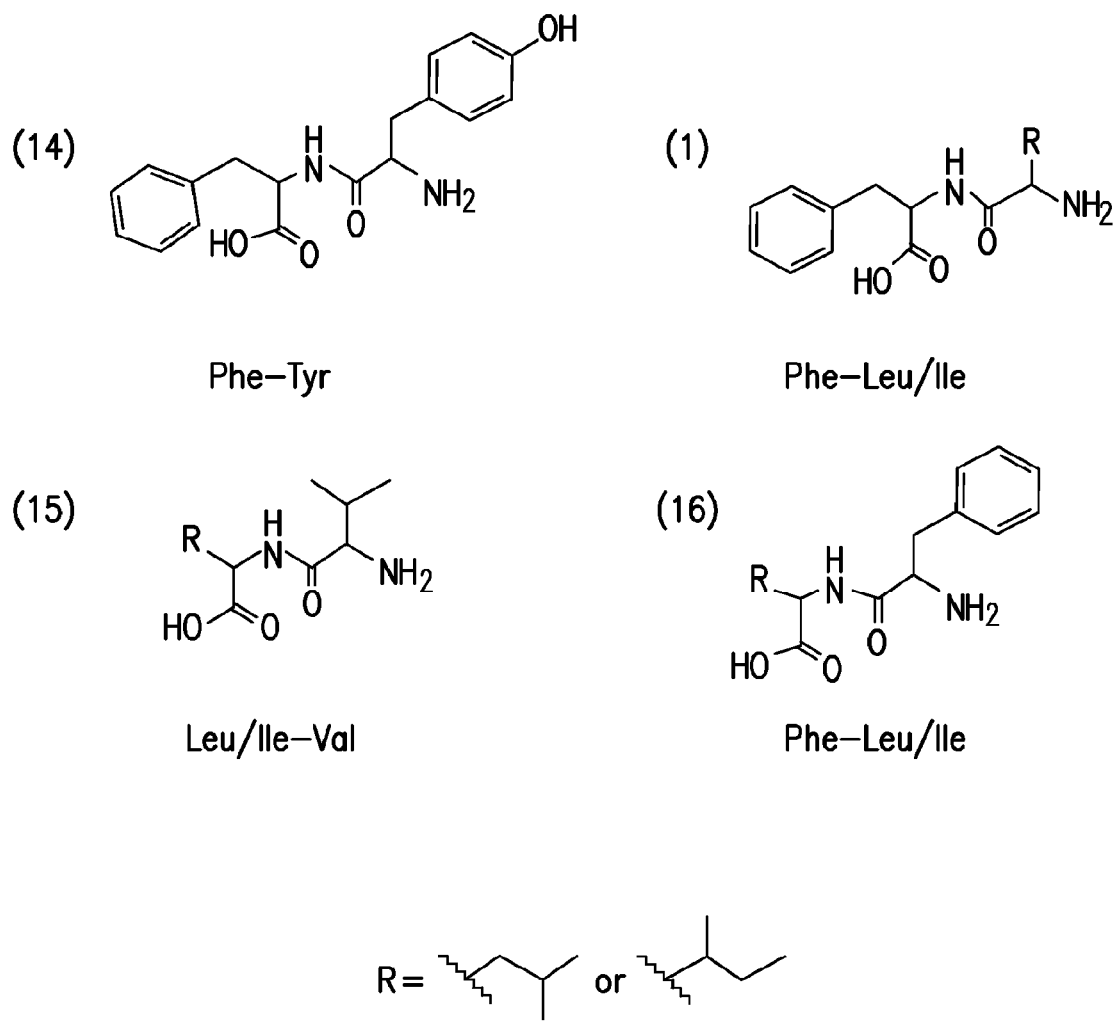
Figure 5:
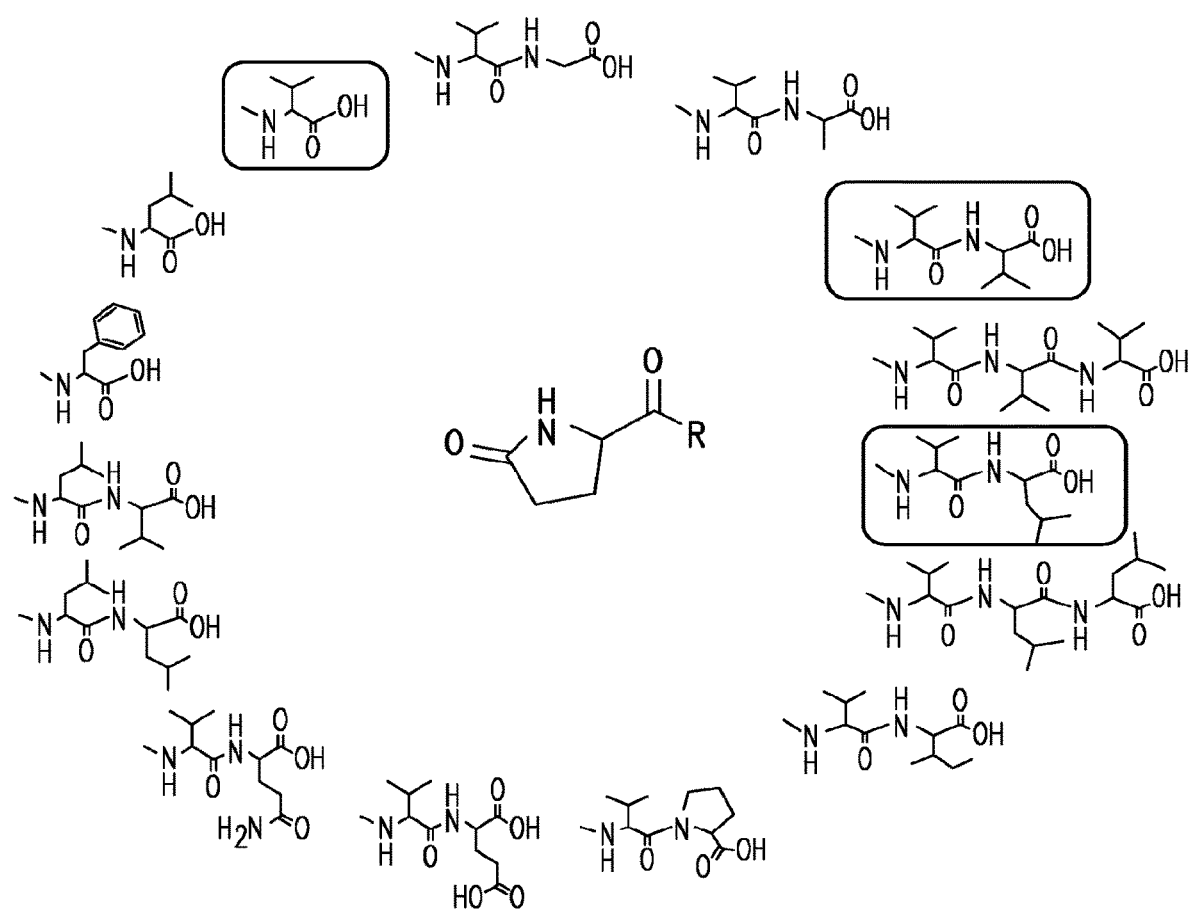
FIG. 5 shows various compounds prepared by modifying the R group of the general structure

Method: A pGlu-Val-Leu tripeptide of the present application having a molecular weight of 341.41 was prepared from a Wang resin according to the following methods, and as described in FIG. 1A-B. The chemosynthetic methods used for preparing the tripeptide are as follows:

1. Synthesis of an Amino Acid Resin (Fmoc-AA)-TA-XXX Resin) (Note: TA=XXX)
   a. Place Wang Resin into the reactor and add DMF swelling resin
   b. Fmoc deprotection: add 20% piperidine/DMF solution to resin reaction mixture
   c. Resin washing: wash the resin 3 times with DMF, and pump out the resin
   d. Add a small quantity of the resin reaction mixture to Fmoc-XXX-OH, HOBt XX and DIPCDI XX reagents, respectively, to dissolve the reagents. Add the solutions into the reactor to react with the resin mixture at room temperature
   e. Remove a 20 mg sample of the reaction mixture, and test the substitutability of the mixture 2. Synthesis of a Peptide Resin
   a. Synthesize the polypeptide with a peptide synthesizer (room temperature: 26-30° C.)
   b. Input the target sequence and configure related parameters
   c. Start synthesis: perform recycled synthesis operations, including deprotection and coupling reaction, etc., according to the synthesis process
   d. After the synthesis and deprotection of the last amino acid, the reaction is over and the resin is pumped out 3. Oxidation and Cyclization
   a. Place peptide resin solution into a reaction column and maintain the column for oxidation and cyclization
   b. Remove the column, and move the peptide resin from the column into a vacuum dryer for vacuum drying 4. Cleavage of Peptide Resin
   a. Place the peptide resin into a container for cleavage. Add cleavage reagent and allow the reaction to proceed out of direct sunlight (i.e., in the shade)
   b. Upon completion of the reaction, filter and freeze the peptide resin for aging, centrifugalize for separation and collect the sediment.
   c. Wash the sediment 3 times with a proper quantity of frozen absolute ether
   d. Dry with a vacuum dryer and obtain the crude product 5. Technological Process of Purification
   a. Process of HPLC purification
      i. Conditions of purification
         Mobile phase:
            A: 0.1% TFA in 100% acetonitrile Solvent
            B: 0.1% TFA in 100% Water
         Gradient:

| Time | A | B |
| --- | --- | --- |
| 0.1 | 10 | 90 |
| 25 | 35 | 65 |
| 25.01 | Stop | |

Chromatographic column: Rampak column packing machine, filler: Vydac-C18
      ii. Process of purification: Dissolve crude peptide in an acetic acid water solution. Concentration the peptide solution, then filter the peptide solution with a 0.45 μm filter membrane. Load the samples, separate and purify, collect the main peaks, concentrate with rotary distillation.
   b. Process of salt conversion
      i. Method One: Sodium ion exchange resin
      ii. Method Two: 10% NaHCO$_3$ and 10% Na2CO3 dissolved microporous resin 6. Lyophilization
   a. Pre-lyophilize (time length: 2.5-3 hours):
      i. Set the shelf temperature as −45° C. After about 30-45 minutes, the shelf temperature reaches the preset temperature and the product temperature reaches −40° C. Keep this status for 2 hours.
  ii. In the course of pre-freeze, the temperature of the cold trap should be controlled as ≤−50° C.
 b. First drying, removing the free moisture:
  i. Start the vacuum pump and decrease the air pressure in the lyophilizer to 10 Pa and keep this air pressure
  ii. Increase the shelf temperature from −45° C. to 10° C. with an even gradient within 12 hours
  iii. Increase the shelf temperature from 10° C. to 30° C. with an even gradient within 1-2 hours
  iv. From the start of the first drying to the product is pumped out, control the product temperature below −20° C. If, as estimated, the product temperature would exceeds −20° C. within the specified timeframe, decrease the shelf temperature by about 3° C. in a timely manner, so as to ensure that the lyophilized product can be dissolved or disintegrated.
 c. Second drying:
  i. Adjust the pressure within the lyophilizer to 5 Pa and keep it with slight fluctuation
  ii. Set the shelf temperature as 35° C., and, when the product temperature reaches 30-33° C., keep for 2 hours
  iii. n such a course, the temperature of the cold trap should be controlled as ≤−50° C. with slight fluctuation.
 d. Nitrogen filling and stopper plugging:
  i. Close the isolating valve and vacuum pump in order, refrigerate the front chamber and decrease the shelf temperature to 15-20° C.
  ii. Open the nitrogen valve and related valves, fill a small quantity of nitrogen into the lyophilization chamber (it should be conducted slowly and only a small quantity of nitrogen can be filled in. Too quick action and too much nitrogen may cause stopper dropping)
  iii. After nitrogen filling, start the automatic stopper plugging device to stopper the vials 4.
  iv. Release the vacuum: after the rubber stopper is tightly plugged, open the vacuum leakage valve to release the vacuum in the chamber and make the pressure return to the normal pressure
 e. Removal from the chamber:
  i. Turn off the lyophilizer and auxiliary equipment according to the lyophilizer operation procedures
  ii. Lift the shelf to the maximum height
  iii. Open the chamber door and remove the products Example 3—Enhancement of Salty Taste by a pGlu-Val-Leu Peptide The present example describes the evaluation of the descriptive profile of a pGlu-Val-Leu peptide of the present application.

Methods:

Descriptive Profiles (Flavor and Chemical Feeling Factors) of five use levels of a pGlu-Val-Leu flavor composition were determined using the Spectrum™ method. The five use levels were as follows: 0.1 ppb, 0.5 ppb, 1.0 ppb, 10.0 ppb and 40.0 ppb.

Data was collected for the flavor and chemical feeling factors of the product in-mouth for each of the five use levels according to the following protocol. One replication was collected for the flavor and chemical feeling factors of the product in-mouth. 6-9 panelists evaluated per session.

Increased Salt Perception Protocol
1. Each panelist tasted a salt reference (0.35% salt solution) with a reference salt intensity of 5.0 which provided a baseline for each panelist for salt intensity.
2. Each panelist tasted a test sample (0.1 ppb, 0.5 ppb, 1.0 ppb, 10.0 ppb or 40.0 ppb all in 0.2% NaCl solution). Only one sample was tasted per session.
3. Each panelist re-tasted the salt reference (5.0 intensity) and rated it for salt intensity as well as any other basic taste, chemical feeling factor, or aromatic perceived. Thus, any increased salt perception as a result of the test sample would be determined, as well as any other perceptions present.

Return to Baseline Protocol

After evaluating the sample for salt and other perceptions (step 3 above), each panelist re-tasted the salt reference (5.0 intensity) at 1 minute intervals until their perception of the saltiness intensity of the reference returned to 5.0. Each panelist recorded salt intensity at each interval and took qualitative notes on other perceptions seen in aftertaste.

The test samples were formulated as described in table 2.

TABLE 2

Test sample formulations.

| Sample | NaCl (g) | pGlu-Val-Leu peptide (5 ppm) in NaCl (g) | Water (g) |
| --- | --- | --- | --- |
| 0.1 ppb | 1.98 | 0.02 | 998 |
| 0.5 ppb | 0.475 | 0.025 | 249.5 |
| 1.0 ppb | 0.45 | 0.05 | 249.5 |

| | NaCl (g) | pGlu-Val-Leu peptide (50 ppm) in NaCl (g) | Water (g) |
| --- | --- | --- | --- |
| 10.0 ppb | 0.45 | 0.05 | 249.5 |
| 40.0 ppb | 0.3 | 0.2 | 249.5 |

Results

Results of the panelists' perceptions of the salt intensity of the pGlu-Val-Leu peptide are shown in table 3.

TABLE 3

Results of the panelists' perceptions of the salt intensity of the pGlu-Val-Leu peptide.

| pGlu-Val-Leu sample | Mean salt perception in-mouth | Mean salt perception after expectoration | Mean time needed to return to baseline |
| --- | --- | --- | --- |
| 0.1 ppb | 2.3 | 6.8 | 7.6 Minutes |
| 0.5 ppb | 2.8 | 6.4 | 9.5 Minutes |
| 1.0 ppb | 2.3 | 7.5 | 8.7 Minutes |
| 10.0 ppb | 3.1 | 8.2 | 8.6 Minutes |
| 40.0 ppb | 2.8 | 8.3 | 13.1 Minutes |

No notable differences in salt perception were seen in-mouth for the samples tested.

As the concentrations of the pGlu-Val-Leu peptide in solution increased, the perception of salt did not significantly increase in-mouth.

The salt perception after expectoration of the test sample, and re-tasting the reference sample increased slightly with increased concentrations of the pGlu-Val-Leu peptide solution.

Salt perception increased after expectoration in all samples. Higher levels of pGlu-Val-Leu peptide resulted in higher levels of saltiness.

The amount of time needed to return to baseline did not necessarily increase with increased concentrations of the pGlu-Val-Leu peptide solution.

The time needed to return to baseline increased notably from 0.1 ppb to 0.5 ppb and from 10.0 ppb to 40.0 ppb. The concentrations in the middle (0.5, 1.0 and 10.0 ppb) did not differ notably from each other in time needed to return to baseline.

Example 4—Descriptive Analysis of Salt Enhancing Flavor Composition Peptides in Solution The present example describes the evaluation of the descriptive profile of pGlu-Val-Leu (identified as "SE-13"), pGlu-Val (identified as "SE-14") and pGlu-Val-Val (identified as "SE-17") peptides of the present application. An objective of the study was to understand the efficacy of salt enhancer compounds SE-13, SE-14 and SE-17 in increasing concentrations, and to understand the amount of time needed for salt perception to return to baseline after the solutions have been expectorated.

Methods:

Descriptive attributes (e.g., taste, flavor and chemical feeling factors) of six use levels of pGlu-Val-Leu (SE-13), pGlu-Val (SE-14) and pGlu-Val-Val (SE-17) flavor composition peptides were determined. The six use levels were as follows: 0.1 ppb, 0.5 ppb, 1.0 ppb, 10.0 ppb, 40.0 ppb and 50.0 ppb.

Data was collected for the attributes of the product in-mouth for the use levels according to the following protocol:

The samples were analyzed for flavor and aftertaste by six-nine members of a panel, trained and experienced in appearance, flavor and texture evaluation using the Spectrum™ method. Samples in solution were evaluated across multiple panel sessions.

The strength of each attribute was rated on a 15-point scale, where 0=none and 15=very strong.

This scale incorporates the ability to use tenths of a point and therefore has the potential of 150 scale differentiations.

The scale may be expanded beyond 15 points to include extreme ratings if necessary.

Attribute Perception Protocol

The panelists evaluated each sample using the following procedure

Descriptive Profiles (flavor and chemical feeling factors) of 5 levels of salt enhancing solutions Individual data was collected for the flavor and chemical feeling factors of the product in-mouth Increased Salt Perception Protocol Each panelist tasted salt 5 reference (0.35% salt solution)—to ground themselves on salt intensity of 5.0.

Each panelist tasted the test sample (0.1 ppb, 0.5 ppb, 1.0 ppb, 10.0 ppb or 40.0/50.0 ppb all in 0.2% NaCl solution: only one per session)

Each panelist then re-tasted the salt 5 reference and rated it for salt intensity as well as any other basic taste, chemical feeling factor, or aromatic perceived. This captured any increased salt perception indicated by the test sample as well as any other perceptions present.

Return to Baseline Protocol

After evaluating the sample for salt & other perceptions, panelists re-tasted the salt 5 reference at 1 minute intervals until their perception of the salt 5 saltiness intensity had returned to 5.0. Each panelist recorded their salt intensity at each interval and took qualitative notes on other perceptions seen in aftertaste.

Sample Preparation

The 0.1, 0.5, 1.0 10, 40, and 50 ppb test samples of the flavor composition peptides were prepared in water as described in table 4.

TABLE 4

0.1, 0.5, 1.0 10, 40, and 50 ppb test sample formulations.

|  | NaCl (g) | SE-13-(5 ppm) in NaCl (g) | Water (g) |
| --- | --- | --- | --- |
| 0.1 ppb | 1.98 | 0.02 | 998 |
| 0.5 ppb | 0.475 | 0.025 | 249.5 |
| 1.0 ppb | 0.45 | 0.05 | 249.5 |

|  | NaCl (g) | SE-13-(50 ppm) in NaCl (g) | Water (g) |
| --- | --- | --- | --- |
| 10 ppb | 0.45 | 0.05 | 249.5 |
| 40 ppb | 0.3 | 0.2 | 249.5 |

|  | NaCl (mg) | SE-14-(5 ppm) | Water (g) |
| --- | --- | --- | --- |
| 0.1 ppb | 1980 | 20 | 998 |
| 0.5 ppb | 475 | 25 | 249.5 |
| 1.0 ppb | 450 | 50 | 249.5 |

|  | NaCl (mg) | SE-14-(50 ppm) | Water (g) |
| --- | --- | --- | --- |
| 10 ppb | 450 | 50 | 249.5 |
| 50 ppb | 300 | 200 | 249.5 |

|  | NaCl (mg) | SE-17-(5 ppm) | Water (g) |
| --- | --- | --- | --- |
| 0.1 ppb | 1980 | 20 | 998 |
| 0.5 ppb | 475 | 25 | 249.5 |
| 1.0 ppb | 450 | 50 | 249.5 |

|  | NaCl (mg) | SE-17-(50 ppm) | Water (g) |
| --- | --- | --- | --- |
| 10 ppb | 450 | 50 | 249.5 |
| 50 ppb | 300 | 200 | 249.5 |

Attributes Analyzed

The panelists evaluated each sample for the attributes described in table 5.

TABLE 5

Attributes evaluated by panelists.

| Attribute | Definition |
| --- | --- |
| Aromatics | |
| Mineral/Flinty | The aromatics associated with metal and mineral deposits, may be reminiscent of wet stones. |
| Basic Tastes | |
| Salt | The taste on the tongue associated with sodium and other salts. |
| Sweet | The taste on the tongue associated with sugars and high potency sweeteners. |
| Sour | The taste on the tongue stimulated by acid, such as citric, malic, phosphoric, etc. |
| Bitter | The taste on the tongue associated with caffeine and other bitter substances, such as quinine and hop bitters. |
| Chemical FF | |
| Metallic | The chemical feeling factor on the surface of the tongue stimulated by metal ions from iron, copper and zinc. It has a flat feel: metal coins placed in the mouth can be used as reference. |

TABLE 5-continued

Attributes evaluated by panelists.

| Attribute | Definition |
|---|---|
| Numbing | The numbing sensation in the mouth (described as loss of feeling on the oral surfaces) - a reference for this is eugenol (clove oil). |
| Astringent | The shrinking or puckering of the tongue surface caused by substances such as tannins or alum. |

Results
SE-13

The mean evaluation scores for the in-mouth perception of the attributes by the panelists are described in table 6.

TABLE 6

Mean evaluation scores for the in-mouth perception of SE-13.

| SE-13 | Flinty/Mineral | Salt | Sweet | Sour | Bitter | Metallic | Numbing | Astringent |
|---|---|---|---|---|---|---|---|---|
| 0.1 ppb | 0.1 | 2.3 | 0.0 | 0.0 | 0.0 | 0.1 | 0.0 | 0.0 |
| 0.5 ppb | 0.3 | 2.8 | 0.2 | 0.0 | 0.0 | 0.3 | 0.0 | 0.0 |
| 1.0 ppb | 0.5 | 2.3 | 0.0 | 0.0 | 0.0 | 0.1 | 0.0 | 0.0 |
| 10.0 ppb | 0.3 | 3.1 | 0.0 | 0.0 | 0.0 | 0.1 | 0.0 | 0.0 |
| 40.0 ppb | 0.4 | 2.8 | 0.0 | 0.0 | 0.0 | 0.1 | 0.0 | 0.0 |

The salt perception level does not increase notably in-mouth as the concentration of SE-13 increases.

Panelists also experience Umami like swelling of lips and tongue in all levels of SE-13.

The level of the aromatics, basic tastes, and chemical feeling factors does not increase with the increasing concentration of SE-13 in-mouth.

The mean evaluation scores for the after-expectoration perception of the attributes by the panelists are described in table 7.

TABLE 7

Mean evaluation scores for the after-expectoration perception of SE-13.

| SE-13 | Flinty/Mineral | Salt | Sweet | Sour | Bitter | Metallic | Numbing | Astringent |
|---|---|---|---|---|---|---|---|---|
| 0.1 ppb | 0.1 | 6.8 | 0.0 | 0.0 | 0.1 | 0.3 | 0.0 | 0.0 |
| 0.5 ppb | 0.1 | 6.4 | 0.0 | 0.0 | 0.0 | 0.3 | 0.1 | 0.0 |
| 1.0 ppb | 0.2 | 7.5 | 0.0 | 0.0 | 0.0 | 0.1 | 0.0 | 0.0 |
| 10.0 ppb | 0.1 | 8.2 | 0.0 | 0.0 | 0.0 | 0.3 | 0.0 | 0.0 |
| 40.0 ppb | 0.3 | 8.3 | 0.0 | 0.0 | 0.0 | 0.2 | 0.0 | 0.0 |

The level of salt perception increases slightly as the concentration of SE-13 increases. However, this is not true for the 0.5 ppb solution which has a slightly lower salt perception than 0.1 ppb (this difference is not notable).

Salt perception increases after expectoration in all samples. Higher levels of SE-13 results in higher levels of saltiness.

Panelists also experience Umami like swelling of lips and tongue in all levels of SE-13.

The level of the aromatics, basic tastes (excluding salt) and chemical feeling factors do not increase with the increasing concentration of SE-13.

The mean time for the panelists' perception of the salt 5 reference to return to baseline is described in table 8.

TABLE 8

Mean time for the panelists' perception of the salt 5 reference to return to baseline.

| SE-13 | Mean time needed to return to baseline |
|---|---|
| 0.1 ppb | 7.6 Minutes |
| 0.5 ppb | 9.5 Minutes |
| 1.0 ppb | 8.7 Minutes |
| 10.0 ppb | 8.6 Minutes |
| 40.0 ppb | 13.1 Minutes |

The time needed to return to baseline increases notably from 0.1 ppb to 0.5 ppb and from 10.0 ppb to 40.0 ppb. 0.5, 1.0 and 10.0 ppb concentrations do not differ notably from each other in time needed to return to baseline.

A summary of the panelists' evaluation of SE-13 is shown in table 9.

TABLE 9

Summary of the panelists' evaluation of SE-13.

| | Mean salt perception in mouth SE-13 | Mean salt perception after expectoration SE-13 | Mean time needed to return to baseline SE-13 |
|---|---|---|---|
| 0.1 ppb | 2.3 | 6.8 | 7.6 Minutes |
| 0.5 ppb | 2.8 | 6.4 | 9.5 Minutes |
| 1.0 ppb | 2.3 | 7.5 | 8.7 Minutes |
| 10.0 ppb | 3.1 | 8.2 | 8.6 Minutes |
| 40.0 ppb | 2.8 | 8.3 | 13.1 Minutes |

The SE-13 salt enhancer:
  Shows a noticeable increase in salt perception from in-mouth to after expectoration (data shown in rows above)
  Does not show a notable increase in salt perception as the concentration increases in-mouth (data shown in columns above)
  Shows a slight increase in salt perception as the concentration increases after expectoration (data shown in columns above)
  The amount of time needed to return to baseline does not necessarily increase with increased concentrations of the SE-13 solution.
  Shows umami like feeling factor of lip and tongue swelling both in-mouth and after expectoration

SE-14

The mean evaluation scores for the in-mouth perception of the attributes by the panelists are described in table 10.

TABLE 10

Mean evaluation scores for the in-mouth perception of SE-14.

| SE-14 | Flinty/Mineral | Salt | Sweet | Sour | Bitter | Metallic | Numbing | Astringent |
|---|---|---|---|---|---|---|---|---|
| 0.1 ppb | 0.8 | 1.8 | 0.0 | 0.0 | 0.0 | 0.3 | 0.0 | 0.0 |
| 0.5 ppb | 0.6 | 2.5 | 0.0 | 0.0 | 0.0 | 0.1 | 0.0 | 0.1 |
| 1.0 ppb | 0.9 | 2.9 | 0.0 | 0.0 | 0.0 | 0.1 | 0.0 | 0.1 |
| 10.0 ppb | 0.9 | 3.3 | 0.0 | 0.0 | 0.0 | 0.3 | 0.0 | 0.0 |
| 50.0 ppb | 0.7 | 3.2 | 0.0 | 0.0 | 0.0 | 0.2 | 0.0 | 0.0 |

The salt perception level increases slightly in-mouth as the concentration of SE-14 increases.
Some panelists also experience Umami like swelling of lips and tongue in all levels of SE-14. However, this feeling factor was more prevalent in the aftertaste as opposed to in-mouth.
The level of the aromatics, basic tastes (excluding salt), and chemical feeling factors does not increase with the increasing concentration of SE-14 in-mouth.

The mean evaluation scores for the after-expectoration perception of the attributes by the panelists are described in table 11.

TABLE 11

Mean evaluation scores for the after-expectoration perception of SE-14.

| SE-14 | Flinty/Mineral | Salt | Sweet | Sour | Bitter | Metallic | Numbing | Astringent |
|---|---|---|---|---|---|---|---|---|
| 0.1 ppb | 1.1 | 6.7 | 0.0 | 0.0 | 0.0 | 0.3 | 0.0 | 0.0 |
| 0.5 ppb | 1.0 | 7.0 | 0.0 | 0.0 | 0.0 | 0.1 | 0.0 | 0.1 |
| 1.0 ppb | 0.5 | 7.0 | 0.0 | 0.0 | 0.0 | 0.1 | 0.0 | 0.1 |
| 10.0 ppb | 1.0 | 7.3 | 0.0 | 0.0 | 0.0 | 0.2 | 0.0 | 0.0 |
| 50.0 ppb | 0.6 | 8.0 | 0.0 | 0.0 | 0.0 | 0.1 | 0.0 | 0.1 |

Salt perception increases after expectoration (from in-mouth) in all samples. Higher levels of SE-14 results in higher levels of saltiness after expectoration.
The level of salt perception after expectoration increases slightly as the concentration of SE-14 increases.
Panelists also experience Umami like swelling of lips and tongue in all levels of SE-14. This feeling factor is seen mostly in the aftertaste.
The level of the aromatics, basic tastes (excluding salt) and chemical feeling factors do not increase with the increasing concentration of SE-14.

The mean time for the panelists' perception of the salt 5 reference to return to baseline is described in table 12.

TABLE 12

Mean time for the panelists' perception of the salt 5 reference to return to baseline.

| SE-14 | Mean time needed to return to baseline |
|---|---|
| 0.1 ppb | 4.6 Minutes |
| 0.5 ppb | 4.6 Minutes |
| 1.0 ppb | 3.9 Minutes |
| 10.0 ppb | 5.8 Minutes |
| 50.0 ppb | 6.6 Minutes |

The time needed to return to baseline increases slightly overall as the concentration of SE-14 increases.
0.1, 0.5, & 1.0 ppb concentrations do not differ notably from each other in time needed to return to baseline.
A summary of panelists' evaluation of SE-14 is shown in table 13.

TABLE 13

Summary of panelists' evaluation of SE-14.

| | Mean salt perception in mouth SE-14 | Mean salt perception after expectoration SE-14 | Mean time needed to return to baseline SE-14 |
|---|---|---|---|
| 0.1 ppb | 1.8 | 6.7 | 4.6 Minutes |
| 0.5 ppb | 2.5 | 7.0 | 4.6 Minutes |
| 1.0 ppb | 2.9 | 7.0 | 3.9 Minutes |
| 10.0 ppb | 3.3 | 7.3 | 5.8 Minutes |
| 50.0 ppb | 3.2 | 8.0 | 6.6 Minutes |

The SE-14 salt enhancer:
  Shows a noticeable increase in salt perception from in-mouth to after expectoration (data shown in rows above)
  Shows a slight increase in salt perception as the concentration increases both in-mouth and after expectoration (data shown in columns above)
  Shows a slight increase overall in time (min.) needed to return to baseline as the concentration increases
  Shows umami like feeling factor of lip and tongue swelling both in-mouth and after expectoration

SE-17

The mean evaluation scores for the in-mouth perception of the attributes by the panelists are described in table 14.

TABLE 14

Mean evaluation scores for the in-mouth perception of SE-17.

| SE-17 | Flinty/Mineral | Salt | Sweet | Sour | Bitter | Metallic | Numbing | Astringent |
|---|---|---|---|---|---|---|---|---|
| 0.1 ppb | 0.7 | 3.1 | 0.0 | 0.0 | 0.0 | 0.0 | 0.0 | 0.0 |
| 0.5 ppb | 0.8 | 4.0 | 0.0 | 0.0 | 0.0 | 0.3 | 0.0 | 0.0 |
| 1.0 ppb | 0.5 | 2.8 | 0.0 | 0.0 | 0.0 | 0.0 | 0.0 | 0.0 |
| 10.0 ppb | 0.5 | 3.6 | 0.0 | 0.0 | 0.0 | 0.0 | 0.0 | 0.0 |
| 50.0 ppb | 0.5 | 3.9 | 0.0 | 0.0 | 0.0 | 0.0 | 0.0 | 0.0 |

The salt perception level does not increase notably in-mouth as the concentration of SE-17 increases.

Some panelists also experience Umami like swelling of lips and tongue in all levels of SE-17. This feeling factor was more prevalent in the aftertaste as opposed to in-mouth.

The level of the aromatics, basic tastes, and chemical feeling factors does not increase with the increasing concentration of SE-17 in-mouth.

The mean evaluation scores for the after-expectoration perception of the attributes by the panelists is described table 15.

TABLE 15

Mean evaluation scores for the after-expectoration perception of SE-17.

| SE-17 | Flinty/Mineral | Salt | Sweet | Sour | Bitter | Metallic | Numbing | Astringent |
|---|---|---|---|---|---|---|---|---|
| 0.1 ppb | 0.6 | 7.3 | 0.0 | 0.0 | 0.0 | 0.0 | 0.0 | 0.0 |
| 0.5 ppb | 0.7 | 8.1 | 0.0 | 0.0 | 0.0 | 0.2 | 0.0 | 0.0 |
| 1.0 ppb | 0.5 | 7.3 | 0.0 | 0.0 | 0.0 | 0.0 | 0.0 | 0.0 |
| 10.0 ppb | 0.3 | 7.2 | 0.0 | 0.0 | 0.0 | 0.0 | 0.0 | 0.0 |
| 50.0 ppb | 0.4 | 7.7 | 0.0 | 0.0 | 0.0 | 0.0 | 0.0 | 0.0 |

Salt perception increases after expectoration (from in-mouth) in all samples. Higher levels of SE-17 results in higher levels of saltiness after expectoration.

The salt perception level does not increase notably after expectoration as the concentration of SE-17 increases.

Panelists also experience Umami like swelling of lips and tongue in all levels of SE-17.

The level of the aromatics, basic tastes, and chemical feeling factors do not increase with the increasing concentration of SE-17.

The mean time for the panelists' perception of the salt 5 reference to return to baseline is described in table 16.

TABLE 16

Mean time for the panelists' perception of the salt 5 reference to return to baseline

| SE-17 | Mean time needed to return to baseline |
|---|---|
| 0.1 ppb | 3.4 Minutes |
| 0.5 ppb | 5.6 Minutes |
| 1.0 ppb | 5.0 Minutes |
| 10.0 ppb | 5.0 Minutes |
| 50.0 ppb | 4.1 Minutes |

The time needed to return to baseline increases notably from 0.1 ppb to 0.5 ppb.

No definitive trends are seen in time to return to baseline with regards to increasing concentrations on SE-17.

A summary of panelists' evaluation of SE-17 is shown in table 17.

TABLE 17

Summary of panelists' evaluation of SE-17.

| | Mean salt perception in mouth SE-17 | Mean salt perception after expectoration SE-17 | Mean time needed to return to baseline SE-17 |
|---|---|---|---|
| 0.1 ppb | 3.1 | 7.3 | 3.4 Minutes |
| 0.5 ppb | 4.0 | 8.1 | 5.6 Minutes |
| 1.0 ppb | 2.8 | 7.3 | 5.0 Minutes |
| 10.0 ppb | 3.6 | 7.2 | 5.0 Minutes |
| 50.0 ppb | 3.9 | 7.7 | 4.1 Minutes |

The SE-17 salt enhancer:
  Shows a noticeable increase in salt perception from in-mouth to after expectoration (data shown in rows above)
  Does not show a notable increase in salt perception as the concentration increases either in-mouth or after expectoration (data shown in columns above)
  Shows no definitive trend in time needed to return to baseline as the concentration increases
  Shows umami like feeling factor of lip and tongue swelling both in-mouth and after expectoration Summary A summary of the results of the panelists' perceptions of the attributes of the pGlu-Val-Leu (SE-13), pGlu-Val (SE-14) and pGlu-Val-Val (SE-17) flavor composition peptides is shown in table 18.

TABLE 18

Summary of the evaluation of the attributes of SE-13, SE-14 and SE-17.

|  | Mean salt perception in mouth | | | Mean salt perception after expectoration | | | Mean time needed to return to baseline (min.) | | |
| --- | --- | --- | --- | --- | --- | --- | --- | --- | --- |
|  | SE-13 | SE-14 | SE-17 | SE-13 | SE-14 | SE-17 | SE-13 | SE-14 | SE-17 |
| 0.1 ppb | 2.3 | 1.8 | 3.1 | 6.8 | 6.7 | 7.3 | 7.6 | 4.6 | 3.4 |
| 0.5 ppb | 2.8 | 2.5 | 4.0 | 6.4 | 7.0 | 8.1 | 9.5 | 4.6 | 5.6 |
| 1.0 ppb | 2.3 | 2.9 | 2.8 | 7.5 | 7.0 | 7.3 | 8.7 | 3.9 | 5.0 |
| 10.0 ppb | 3.1 | 3.3 | 3.6 | 8.2 | 7.3 | 7.2 | 8.6 | 5.8 | 5.0 |
| 40.0 ppb | 2.8 | — | — | 8.3 | — | — | 13.1 | — | — |
| 50.0 ppb | — | 3.2 | 3.9 | — | 8.0 | 7.7 | — | 6.6 | 4.1 |

Overall, SE-17 showed the highest levels of salt perception in-mouth.
  The increasing concentration of SE-17 did not necessarily increase in-mouth salt perception.
The salt perception after expectoration showed no trends with increasing concentrations in any of the three salt enhancers.
The salt perception increased from in-mouth to after expectoration in all three salt enhancing compounds.
The time needed to return to baseline was greatest in the SE-13 compound.
  In all three salt enhancing compounds, increased concentrations did not necessarily increase the amount of time needed to return to baseline.

Example 5—Descriptive Analysis of an Umami Enhancing Flavor Composition Peptide in Solution The present example describes the evaluation of the descriptive profile of a pGlu-Val-Cys (identified as "UE-30") peptide of the present application. An objective of the study was to understand the efficacy of umami enhancer compound UE-30 in increasing concentrations.

Methods:

Descriptive attributes (e.g., taste, flavor and chemical feeling factors) of four use levels of a pGlu-Val-Cys (UE-30) flavor composition peptide was determined. The four use levels were as follows: 1.0 ppb, 10.0 ppb, 100.0 ppb and 1000.0 ppb.

Data was collected for the attributes of the product in-mouth for the use levels according to the following protocol:
  The samples were analyzed for flavor and aftertaste by six-nine members of a panel, trained and experienced in appearance, flavor and texture evaluation using the Spectrum™ method. Samples were evaluated across multiple panel sessions.
  The strength of each attribute was rated on a 15-point scale, where 0=none and 15=very strong.
    This scale incorporates the ability to use tenths of a point and therefore has the potential of 150 scale differentiations.
    The scale may be expanded beyond 15 points to include extreme ratings if necessary.

Attribute Perception Protocol

The panelists evaluated each sample using the following procedure
  Descriptive Profiles (Flavor and Chemical Feeling Factors) of 4 levels of UE-30 (umami enhancer)
  Individual data (1 replication) was collected for the flavor and chemical feeling factors of the product in-mouth Sample Preparation The 01, 10, 100 and 1000 ppb test samples of the flavor composition peptide was prepared in water as described in the table 19.

TABLE 19

01, 10, 100 and 1000 ppb test sample formulations of UE-30

|  | NaCl, (mg) | UE-30-(5 ppm). mg | Water (g) |
| --- | --- | --- | --- |
| 1 ppb | 450 | 50 | 249.5 |
|  | NaCl, (mg) | UE-30-(50 ppm), mg | Water (g) |
| 10 ppb | 450 | 50 | 249.5 |
| 100 ppb | 0 | 500 | 249.5 |
|  | NaCl, (mg) | UE-30-(500 ppm), mg | Water (g) |
| 1000 ppb | 0 | 500 | 249.5 |

Attributes Analyzed

The panelists evaluated each sample for the attributes described in table 20.

TABLE 20

Attributes evaluated by panelists.

| Attribute | Definition |
| --- | --- |
| Aromatics |  |
| Mineral/Flinty | The aromatics associated with metal and mineral deposits, may be reminiscent of wet stones. |

TABLE 20-continued

Attributes evaluated by panelists.

| Attribute | Definition |
|---|---|
| Umani/Brothy | The aromatics associated with HVP and meat based broths. The aromatics associated with boiled meat, soup, and/or stock. |
| Basic Tastes | |
| Salt | The taste on the tongue associated with sodium and other salts. |
| Sweet | The taste on the tongue associated with sugars and high potency sweeteners. |
| Sour | The taste on the tongue stimulated by acid, such as citric, malic, phosphoric, etc. |
| Bitter | The taste on the tongue associated with caffeine and other bitter substances, such as quinine and hop bitters. |
| Chemical FF | |
| Umami | The coated feeling on the soft tissue of the oral cavity caused by monosodium glutamate or other ribonucleotides. |
| Metallic | The chemical feeling factor on the surface of the tongue stimulated by metal ions from iron, copper and zinc. It has a flat feel: metal coins placed in the mouth can be used as reference. |
| Numbing | The numbing sensation in the mouth (described as loss of feeling on the oral surfaces) - a reference for this is eugenol (clove oil). |
| Astringent | The shrinking or puckering of the tongue surface caused by substances such as tannins or alum. |

Results
UE-30
The mean evaluation scores for the in-mouth perception of the attributes by the panelists are described in table 21A.

TABLE 21A

Mean evaluation scores for the in-mouth perception of UE-30.

| UE-30 | Mineral/Flinty | Umami/Brothy | Salt | Sweet | Sour | Bitter | Umami FF | Metallic | Numbing | Astringent |
|---|---|---|---|---|---|---|---|---|---|---|
| 1.0 ppb | 0.5 | 0.7 | 1.9 | 0.0 | 0.0 | 0.0 | 0.5 | 0.0 | 0.0 | 0.0 |
| 10.0 ppb | 0.7 | 1.0 | 2.1 | 0.0 | 0.0 | 0.0 | 1.9 | 0.0 | 0.0 | 0.0 |
| 100.0 ppb | 0.7 | 1.8 | 2.6 | 0.0 | 0.0 | 0.0 | 2.7 | 0.0 | 0.0 | 0.0 |
| 1000.0 ppb | 0.6 | 2.5 | 3.4 | 0.0 | 0.0 | 0.0 | 3.5 | 0.0 | 0.0 | 0.0 |

The salt perception level increases slightly as the concentration of UE-30 increases.
The umami/brothy aromatic increases slightly as the concentration on UE-30 increases.
The umami feeling factor increases slightly as the concentration of UE-30 increases.
The level of the remaining aromatics, basic tastes, and chemical feeling factors does not increase with the increasing concentration of UE-30 in-mouth.

Summary
A summary of the in-mouth results of the panelists' perceptions of the attributes of the pGlu-Val-Cys (UE-30) flavor composition peptides is shown in table 21B.

TABLE 21B

Summary of the in-mouth results of perceptions of the attributes of UE-30.

| | Umami/Brothy | Salt | Umami FF |
|---|---|---|---|
| 1.0 ppb | 0.7 | 1.9 | 0.5 |
| 10.0 ppb | 1.0 | 2.1 | 1.9 |

TABLE 21B-continued

Summary of the in-mouth results of perceptions of the attributes of UE-30.

| | Umami/Brothy | Salt | Umami FF |
|---|---|---|---|
| 100.0 ppb | 1.8 | 2.6 | 2.7 |
| 1000.0 ppb | 2.5 | 3.4 | 3.5 |

The UE-30 umami enhancer:
Shows increases in salt and umami aromatic and feeling factor as the concentration increases Example 6—Descriptive Analysis of Flavor Enhancing Flavor Composition Peptides in Rice and Solution The present example describes the evaluation of the descriptive profile of pGlu-Cys (identified as "FE-35"), pGlu-Cys-Gly (identified as "FE-36"), pGlu-Cys-Cys (identified as "FE-37"), pGlu-Cys-Val (identified as "FE-38") and pGlu-Val-Cys (identified as "UE-30") peptides of the present application. An objective of the study was to understand the efficacy of flavor enhancer compounds FE-35, FE-36, FE-37, FE-38 and UE-30 in increasing concentrations both in solution and in rice, and to determine a Degree of Difference (DOD) score between a control rice sample (which includes NaCl, and no flavor composition peptide) and the test rice samples (with added flavor composition peptides at increasing concentrations).

Methods:
Descriptive attributes (e.g., taste, flavor and chemical feeling factors) of three use levels of pGlu-Cys (FE-35), pGlu-Cys-Gly (FE-36), pGlu-Cys-Cys (FE-37), pGlu-Cys-Val (FE-38) and pGlu-Val-Cys (UE-30) flavor composition peptides were determined. The three use levels were as follows: 1.0 ppb, 10.0 ppb and 100.0 ppb.

Data was collected for the attributes of the product in-mouth for the use levels according to the following protocol:
The samples were analyzed for flavor by six to nine members of a panel, trained and experienced in flavor evaluation using the Spectrum™ method. Samples were evaluated across multiple panel sessions.
The strength of each attribute was rated on a 15-point scale, where 0=none and 15=very strong.
This scale incorporates the ability to use tenths of a point and therefore has the potential of 150 scale differentiations.
The scale may be expanded beyond 15 points to include extreme ratings if necessary.

Preparation of Rice Samples
Each flavor enhancer was tested in Uncle Ben's Garden Vegetable Ready rice matrix at 3 different concentrations: 1 ppb, 10 ppb and 100 ppb. A total of 15 points with flavor enhancers were prepared for sensory evaluation. Additionally, 15 control samples were prepared. Each point had 2 samples (test and control) and was made from one pouch of rice.

Directions to prepare the solutions:

The 15 ready-to eat pouches were microwaved according to the procedure found on the back of the pouch: (1) squeeze pouch to separate rice, (2) tear two inches to vent, (3) heat on High for 90 seconds and (4) remove from microwave using COOL TOUCH area on untorn side.

From each pouch 124.75 g (test sample) and 99.8 g (control) were weighed out. The test sample had the flavor enhancer and/or salt. The control sample only had salt added.

The flavor enhancer and/or salt (non-iodized salt) were weighed in a soufflé cup. The weighed amount of flavor enhancer and/or salt was added to the sub-sampled rice. The rice was stirred and mixed to evenly distribute the salt added.

Some rice was placed back into the soufflé cup, sealed, and the cup was shook to get the flavor enhancer and/or salt that may have been stuck on the walls of the soufflé cup. After shaking the soufflé cup, the rice was added back to the original sub-sampled rice and stirred/mixed again.

Each sample (test and control) was microwaved for another 30 seconds (or until warm) to ensure that the salts/compounds were going completely into the solutions.

All samples (test and control) were tasted at the same temperature.

Each test sample had 0.2% NaCl added and flavor enhancers at the specified concentrations.

The flavor composition peptide compositions used to prepare the rice samples are shown in table 22.

TABLE 22

Flavor composition peptide compositions used to prepare the rice samples

| Materials sent | enhancer | n | Weight, g |
|---|---|---|---|
| UE-30-(5 ppm)-13-AA2389 | UE-30 | 5 ppm | 3 |
| UE-30-(50 ppm)-13-AA2389 | UE-30 | 50 ppm | 3 |
| FE-35-(5 ppm)-13-AA2389 | FE-35 | 5 ppm | 3 |
| FE-35-(50 ppm)-13-AA2389 | FE-35 | 50 ppm | 3 |
| FE-36-(5 ppm)-13-AA2389 | FE-36 | 5 ppm | 3 |
| FE-36-(50 ppm)-13-AA2389 | FE-36 | 50 ppm | 3 |
| FE-37-(5 ppm)-13-AA2389 | FE-37 | 5 ppm | 3 |
| FE-37-(50 ppm)-13-AA2389 | FE-37 | 50 ppm | 3 |
| FE-38-(5 ppm)-13-AA2389 | FE-38 | 5 ppm | 3 |
| FE-38-(50 ppm)-13-AA2389 | FE-38 | 50 ppm | 3 |

A summary of the concentrations of NaCl and flavor composition peptides in the rice samples is described in table 23. The first value of each cell represents a single sample amount of an ingredient in milligrams, and the second number in parenthesis is a doubling of the ingredient (in grams) for use in a doubled size sample.

TABLE 23

Concentrations of NaCl and flavor composition peptides used to formulate the rice samples.

A.

| | NaCl (mg) | UE-30-(5 ppm) in NaCl (mg) | Rice (g) |
|---|---|---|---|
| 1.0 ppb | 225 (0.45 g) | 25 (0.05 g) | 124.75 (249.5 g) |
| Control | 200 (0.40 g) | 0 | 99.8 (199.6 g) |

| | NaCl (mg) | UE-30-(50 ppm) in NaCl (mg) | Rice (g) |
|---|---|---|---|
| 10.0 ppb | 225 (0.45 g) | 25 (0.05 g) | 124.75 (249.5 g) |
| Control | 200 (0.40 g) | 0 | 99.8 (199.6 g) |
| 100 ppb | 0 | 250 (0.50 g) | 124.75 (249.5 g) |
| Control | 200 (0.40 g) | 0 | 99.8 (199.6 g) |

B.

| | NaCl (mg) | FE-35-(5 ppm) in NaCl (mg) | Rice (g) |
|---|---|---|---|
| 1.0 ppb | 225 (0.45 g) | 25 (0.05 g) | 124.75 (249.5 g) |
| Control | 200 (0.40 g) | 0 | 99.8 (199.6 g) |

| | NaCl (mg) | FE-35-(50 ppm) in NaCl (mg) | Rice (g) |
|---|---|---|---|
| 10.0 ppb | 225 (0.45 g) | 25 (0.05 g) | 124.75 (249.5 g) |
| Control | 200 (0.40 g) | 0 | 99.8 (199.6 g) |
| 100 ppb | 0 | 250 (0.50 g) | 124.75 (249.5 g) |
| Control | 200 (0.40 g) | 0 | 99.8 (199.6 g) |

C.

| | NaCl (mg) | FE-36-(5 ppm) in NaCl (mg) | Rice (g) |
|---|---|---|---|
| 1.0 ppb | 225 (0.45 g) | 25 (0.05 g) | 124.75 (249.5 g) |
| Control | 200 (0.40 g) | 0 | 99.8 (199.6 g) |

| | NaCl (mg) | FE-36-(50 ppm) in NaCl (mg) | Rice (g) |
|---|---|---|---|
| 10.0 ppb | 225 (0.45 g) | 25 (0.05 g) | 124.75 (249.5 g) |
| Control | 200 (0.40 g) | 0 | 99.8 (199.6 g) |
| 100 ppb | 0 | 250 (0.50 g) | 124.75 (249.5 g) |
| Control | 200 (0.40 g) | 0 | 99.8 (199.6 g) |

D.

| | NaCl (mg) | FE-37-(5 ppm) in NaCl (mg) | Rice (g) |
|---|---|---|---|
| 1.0 ppb | 225 (0.45 g) | 25 (0.05 g) | 124.75 (249.5 g) |
| Control | 200 (0.40 g) | 0 | 99.8 (199.6 g) |

| | NaCl (mg) | FE-37-(50 ppm) in NaCl (mg) | Rice (g) |
|---|---|---|---|
| 10.0 ppb | 225 (0.45 g) | 25 (0.05 g) | 124.75 (249.5 g) |
| Control | 200 (0.40 g) | 0 | 99.8 (199.6 g) |
| 100 ppb | 0 | 250 (0.50 g) | 124.75 (249.5 g) |
| Control | 200 (0.40g) | 0 | 99.8 (199.6 g) |

E.

| | NaCl (mg) | FE-38-(5 ppm) in NaCl (mg) | Rice (g) |
|---|---|---|---|
| 1.0 ppb | 225 (0.45 g) | 25 (0.05 g) | 124.75 (249.5 g) |
| Control | 200 (0.40 g) | 0 | 99.8 (199.6 g) |

TABLE 23-continued

Concentrations of NaCl and flavor composition peptides used to formulate the rice samples.

| | NaCl (mg) | FE-38-(50 ppm) in NaCl (mg) | Rice (g) |
|---|---|---|---|
| 10.0 ppb | 225 (0.45 g) | 250 (0.05 g) | 124.75 (249.5 g) |
| Control | 200 (0.40 g) | 0 | 99.8 (199.6 g) |
| 100 ppb | 0 | 250 (0.50 g) | 124.75 (249.5 g) |
| Control | 200 (0.40 g) | 0 | 99.8 (199.6 g) |

Preparation of Solution Samples

A summary of the concentrations of NaCl, water and flavor composition peptides in the solution samples is described in table 24.

TABLE 24

Concentrations of NaCl, water and flavor composition peptides used to formulate the solution samples.

A.

| | NaCl (mg) | UE-30-(5 ppm) in NaCl (mg) | Water (g) |
|---|---|---|---|
| 1.0 ppb | 450 (0.45 g) | 50 (0.05 g) | 249.5-590 |

| | NaCl (mg) | UE-30-(50 ppm) in NaCl (mg) | Water (g) |
|---|---|---|---|
| 10.0 ppb | 450 (0.4 5 g) | 50 (0.05 g) | 249.5-674 |
| 100 ppb | 0 | 500 (0.05 g) | 249.5-112 |

B.

| | NaCl (mg) | FE-35-(5 ppm) in NaCl (mg) | Water (g) |
|---|---|---|---|
| 1.0 ppb | 450 (0.45 g) | 50 (0.05 g) | 249.5-475 |

| | NaCl (mg) | FE-35-(50 ppm) in NaCl (mg) | Water (g) |
|---|---|---|---|
| 10.0 ppb | 450 (0.45g) | 50 (0.05 g) | 249.5-358 |
| 100 ppb | 0 | 500 (0.05 g) | 249.5-706 |

C.

| | NaCl (mg) | FE-36-(5 ppm) in NaCl (mg) | Water (g) |
|---|---|---|---|
| 1.0 ppb | 450 (0.45 g) | 50 (0.05 g) | 249.5-628 |

| | NaCl (mg) | FE-36-(50 ppm) in NaCl (mg) | Water (g) |
|---|---|---|---|
| 10.0 ppb | 450 (0.45 g) | 50 (0.05 g) | 249.5-434 |
| 100 ppb | 0 | 500 (0.05 g) | 249.5-335 |

D.

| | NaCl (mg) | FE-37-(5 ppm) in NaCl (mg) | Water (g) |
|---|---|---|---|
| 1.0 ppb | 450 (0.45 g) | 50 (0.05 g) | 249.5-602 |

| | NaCl (mg) | FE-37-(50 ppm) in NaCl (mg) | Water (g) |
|---|---|---|---|
| 10.0 ppb | 450 (0.45 g) | 50 (0.05 g) | 249.5-595 |
| 100 ppb | 0 | 500 (0.05 g) | 249.5-450 |

E.

| | NaCl (mg) | FE-38-(5 ppm) in NaCl (mg) | Water (g) |
|---|---|---|---|
| 1.0 ppb | 450 (0.45 g) | 50 (0.05 g) | 249.5-139 |

| | NaCl (mg) | FE-38-(50 ppm) in NaCl (mg) | Water (g) |
|---|---|---|---|
| 10.0 ppb | 450 (0.45 g) | 50 (0.05 g) | 249.5-291 |
| 100 ppb | 0 | 500 (0.05 g) | 249.5-927 |

Attributes Analyzed

The panelists evaluated each sample for the attributes described by table 25.

TABLE 25

Attributes evaluated by panelists.

| Attribute | Definition |
|---|---|
| Aromatics | |
| Total Aromatics | The total portion of flavor that is perceived by the sense of smell from a substance in the mouth. |
| Cooked White Rice | The aromatics associated with white rice. |
| Vegetable Oil | The aromatics associated with fresh vegetable oil. |
| HVP/Brothy | The aromatics associated with HVP and meat based broths. The aromatics associated with boiled meat, soup, and/or stock. |
| Black Pepper | The aromatics associated with ground black pepper. |
| Dehydrated onion/garlic | The aromatics associated with onion or garlic. It can be further described as being dehydrated. |
| Vegetable Complex | The aromatics associated with the total vegetable impact which may include all types of vegetables. |
| Cooked Green Vegetables | The aromatics associated with green vegetables that have been cooked. |
| Cooked Corn | The aromatics associated with corn flavor which has been gently heated or boiled. |
| Mineral/Flinty | The aromatics associated with metal and mineral deposits, may be reminiscent of wet stones. |
| Basic Tastes | |
| Salt | The taste on the tongue associated with sodium and other salts. |
| Sweet | The taste on the tongue associated with sugars and high potency sweeteners. |
| Bitter | The taste on the tongue associated with caffeine and other bitter substances, such as quinine and hop bitters. |
| Chemical FF | |
| Umami | The coated feeling on the soft tissue of the oral cavity caused by monosodium glutamate or other ribonucleotides. |
| Salt Burn | The burning sensation on the tongue caused by salt. |
| Heat | The burning sensation in the mouth caused by certain substances, such as capsaicin from red peppers or piperin from black peppers, mild heat or warmth is caused by some brown spices |
| Texture | |
| Mouthdrying | The drying sensation in the mouth which are caused by tannins, alum, and strong solutions of vinegar, sucrose, salt, grain alcohol, etc. |
| Residual Mouthcoating | The amount of film left on the surfaces of the mouth. |

Degree of Difference (DOD)

The degree of difference scale is a 0.0 to 10.0 rating indicating how different a product is from a reference product or control, with 0.0 meaning no difference and 10.0 being extremely different The degree of difference rating quantifies the magnitude of the difference but is not directional A degree of difference between 2.0 and 3.0 is considered low enough that a number of consumers would not be able to tell the two samples apart.

A degree of difference of 5.0 or greater is high enough that a number of consumers would be able to tell the samples apart.

A degree of difference of 4.0 is considered a questionable area where consumers may or may not be able to tell the difference.

DOD scale anchors:

0.0=no difference 5.0=noticeable difference 10.0=extreme difference

Perceiving a difference does not necessarily indicate a difference in liking

Appearance differences are not taken into account when assigning a DOD rating

Results

Flavor Composition Peptides in Rice

UE-30

The consensus data scores for the perception of the attributes by the panelists, and the degree of difference from control, are described in table 26.

TABLE 26

Consensus data scores for the perception of attributes and degree of difference for UE-30.

| | | Sample | | |
|---|---|---|---|---|
| | Control | UE 30 (5 ppm) 1.0 ppb | UE 30 (50 ppm) 10.0 ppb | UE 30 (50 ppm) 100 ppb |
| FLAVOR | | | | |
| Total Aromatics | 6.5 | 6.8 | 6.8 | 6.8 |
| Cooked White Rice | 3.0 | 3.0 | 3.0 | 3.0 |
| Vegetable Oil | 0.8 | 0.8 | 0.8 | 0.5 |
| HVP/Brothy | 1.5 | 1.5 | 1.5 | 1.5 |
| Black Pepper | 1.3 | 1.3 | 1.5 | 1.5 |
| Dehydrated onion/garlic | 1.0 | 1.0 | 1.0 | 1.0 |
| Vegetable Complex | 1.0 | 1.5 | 1.8 | 1.8 |
| Cooked Green Vegetable | 0.0 | 0.8 | 1.0 | 1.0 |
| Cooked Corn | 0.5 | 0.8 | 1.0 | 1.0 |
| Mineral/Flint | 0.0 | 0.0 | 0.5 | 0.5 |
| BASIC TASTES | | | | |
| Sweet | 3.0 | 3.0 | 3.5 | 3.5 |
| Salt | 12.5 | 15.0 | 15.0 | 16.0 |
| Chemical Feeling Factors | | | | |
| Umami | 0.8 | 1.5 | 2.0 | 3.0 |
| Salt Burn | 0.0 | 1.0 | 0.8 | 1.3 |
| Texture | | | | |
| Mouthdrying | 0.0 | 0.0 | 1.8 | 1.5 |
| Residual Mouthcoating | 1.0 | 1.0 | 1.0 | 1.5 |
| DOD from Control | — | 4.5 | 5.0 | 5.0 |

A low level of cooked green vegetable is seen in all UE 30 samples, which is not seen in the Control.

All UE 30 samples are saltier than the Control and are higher in umami and salt burn feeling factors.

UE 30 at 10 and 100 ppb have low mouthdrying.

Consumers will likely notice a difference between the Control and 10 and 100 ppb concentrations of UE 30

Consumers may or may not notice a difference between the Control and 1 ppb concentration of UE 30

FE-35

The consensus data scores for the perception of the attributes by the panelists, and the degree of difference from control, are described in table 27.

TABLE 27

Consensus data scores for the perception of attributes and degree of difference for FE-35.

| | | Sample | | |
|---|---|---|---|---|
| | Control | FE 35 (5 ppm) 1.0 ppb | FE 35 (50 ppm) 10.0 ppb | FE 35 (50 ppm) 100 ppb |
| | | Date | | |
| | Oct. 21, 2013 | Oct. 22, 2013 | Oct. 22, 2013 | Oct. 22, 2013 |
| FLAVOR | | | | |
| Total Aromatics | 6.5 | 6.3 | 6.0 | 6.5 |
| Cooked White Rice | 3.0 | 3.0 | 3.0 | 3.0 |
| Vegetable Oil | 0.8 | 0.5 | 0.5 | 0.8 |
| HVP/Brothy | 1.5 | 1.0 | 1.0 | 1.0 |
| Black Pepper | 1.3 | 1.0 | 0.8 | 1.0 |
| Dehydrated onion/garlic | 1.0 | 0.8 | 0.8 | 1.0 |
| Vegetable Complex | 1.0 | 1.0 | 1.3 | 1.5 |
| Cooked Green Vegetable | 0.0 | 0.5 | 0.8 | 0.8 |
| Cooked Corn | 0.5 | 0.5 | 0.8 | 0.8 |
| Mineral/Flint | 0.0 | 0.8 | 1.3 | 1.0 |
| BASIC TASTES | | | | |
| Sweet | 3.0 | 3.5 | 3.5 | 3.5 |
| Salt | 12.5 | 13.0 | 13.5 | 15.0 |
| Chemical Feeling Factors | | | | |
| Umami | 0.8 | 1.0 | 3.0 | 4.0 |
| Heat | 0.0 | 0.8 | 0.5 | 0.5 |
| Texture | | | | |
| Mouthdrying | 0.0 | 1.5 | 1.0 | 1.0 |
| Residual Mouthcoating | 1.0 | 1.0 | 1.0 | 1.0 |
| DOD from Control | — | 3.8 | 5.0 | 5.0 |

FE 35 at 50 ppm is slightly lower in total aromatics, which contributes to the overall DOD score.

A low level of cooked green vegetable is seen in all FE 35 samples, which is not seen in the Control.

FE 35 at 100 ppb is saltier than the Control.

FE 35 at 10 & 100 ppb are higher in umami feeling factor compared to the Control.

All FE 35 concentrations have a low level of heat and mouthdrying that are not seen in the Control.

Consumers will likely notice a difference between the Control and 10 and 100 ppb concentrations of FE 35

Consumers will likely not notice the difference between the Control and 1 ppb concentration of FE 35

FE-36

The consensus data scores for the perception of the attributes by the panelists, and the degree of difference from control, are described in table 28.

TABLE 28

Consensus data scores for the perception of attributes and degree of difference for FE-36.

| | Sample | | | |
|---|---|---|---|---|
| | Control | FE 36 (5 ppm) 1.0 ppb | FE 36 (50 ppm) 10.0 ppb | FE 36 (50 ppm) 100 ppb |
| | Date | | | |
| | Oct. 21, 2013 | Oct. 23, 2013 | Oct. 23, 2013 | Oct. 23, 2013 |
| FLAVOR | | | | |
| Total Aromatics | 6.5 | 6.0 | 6.5 | 6.3 |
| Cooked White Rice | 3.0 | 3.0 | 3.0 | 3.0 |
| Vegetable Oil | 0.8 | 0.8 | 0.8 | 0.8 |
| HVP/Brothy | 1.5 | 1.0 | 1.0 | 1.0 |
| Black Pepper | 1.3 | 1.0 | 1.0 | 0.8 |
| Dehydrated onion/garlic | 1.0 | 1.0 | 1.5 | 1.3 |
| Vegetable Complex | 1.0 | 1.5 | 2.0 | 1.5 |
| Cooked Green Vegetable | 0.0 | 0.5 | 1.0 | 0.8 |
| Cooked Corn | 0.5 | 1.0 | 1.0 | 0.8 |
| BASIC TASTES | | | | |
| Sweet | 3.0 | 3.5 | 3.5 | 3.5 |
| Salt | 12.5 | 11.5 | 13.5 | 13.5 |
| Bitter | 0.0 | 0.5 | 1.0 | 0.5 |
| Chemical Feeling Factors | | | | |
| Umami | 0.8 | 1.5 | 3.0 | 4.0 |
| Salt Burn | 0.0 | 0.0 | 0.0 | 1.0 |
| Texture | | | | |
| Mouthdrying | 0.0 | 1.0 | 1.5 | 2.0 |
| Residual Mouthcoating | 1.0 | 1.0 | 1.0 | 1.0 |
| DOD from Control | — | 5.0 | 5.0 | 5.5 |

A low level of cooked green vegetable is seen in all FE 36 samples, which is not seen in the Control.

All FE 36 samples are slightly bitter and are higher in umami.

FE 36 at 100 ppb has a low level of salt burn.

All FE 36 samples have mouthdrying, which is not seen in the Control.

Consumers will likely notice a difference between the Control and all concentrations of FE 36

FE-37

The consensus data scores for the perception of the attributes by the panelists, and the degree of difference from control, are described in table 29.

TABLE 29

Consensus data scores for the perception of attributes and degree of difference for FE-37.

| | Sample | | | |
|---|---|---|---|---|
| | Control | FE 37 (5 ppm) 1.0 ppb | FE 37 (50 ppm) 10.0 ppb | FE 37 (50 ppm) 100 ppb |
| | Date | | | |
| | Oct. 21, 2013 | Oct. 24, 2013 | Oct. 24, 2013 | Oct. 24, 2013 |
| FLAVOR | | | | |
| Total Aromatics | 6.5 | 6.0 | 6.5 | 6.5 |
| Cooked White Rice | 3.0 | 3.0 | 3.0 | 3.0 |
| Vegetable Oil | 0.8 | 0.8 | 0.8 | 0.8 |
| HVP/Brothy | 1.5 | 1.0 | 1.5 | 1.5 |
| Black Pepper | 1.3 | 1.0 | 1.0 | 1.0 |
| Dehydrated onion/garlic | 1.0 | 1.3 | 1.5 | 1.5 |
| Vegetable Complex | 1.0 | 1.0 | 1.0 | 1.5 |
| Cooked Green Vegetable | 0.0 | 0.5 | 0.5 | 0.8 |
| Cooked Corn | 0.5 | 0.5 | 0.5 | 0.8 |
| Mineral/Flint | 0.0 | 0.8 | 0.8 | 1.0 |
| BASIC TASTES | | | | |
| Sweet | 3.0 | 3.0 | 3.5 | 3.5 |
| Salt | 12.5 | 15.0 | 15.5 | 16.0 |
| Bitter | 0.0 | 0.8 | 1.5 | 1.0 |
| Chemical Feeling Factors | | | | |
| Umami | 0.8 | 1.5 | 2.5 | 3.0 |
| Salt Burn | 0.0 | 0.8 | 1.3 | 1.8 |
| Texture | | | | |
| Mouthdrying | 0.0 | 1.0 | 1.5 | 1.5 |
| Residual Mouthcoating | 1.0 | 1.0 | 1.0 | 1.0 |
| DOD from Control | — | 4.0 | 4.5 | 5.0 |

A low level of cooked green vegetable is seen in all FE 37 samples, which is not seen in the Control.

All FE 37 samples have a low mineral/flint note not seen in the Control.

All FE 37 samples are saltier than the Control, are low in bitter, and are higher in umami and salt burn feeling factors.

All FE 37 concentrations have mouthdrying.

Consumers will likely notice a difference between the Control and 100 ppb concentration of FE 37

Consumers will may or may not notice a difference between the Control and 1 and 10 ppb concentrations of FE 37

FE-38

The consensus data scores for the perception of the attributes by the panelists, and the degree of difference from control, are described in table 30.

TABLE 30

Consensus data scores for the perception of attributes and degree of difference for FE-38.

| | Sample | | | |
|---|---|---|---|---|
| | Control | FE 38 (5 ppm) 1.0 ppb | FE 38 (50 ppm) 10.0 ppb | FE 38 (50 ppm) 100 ppb |
| | Date | | | |
| | Oct. 21, 2013 | Oct. 30, 2013 | Oct. 30, 2013 | Oct. 30, 2013 |
| FLAVOR | | | | |
| Total Aromatics | 6.5 | 6.3 | 6.0 | 6.5 |
| Cooked White Rice | 3.0 | 3.0 | 3.0 | 3.0 |
| Vegetable Oil | 0.8 | 0.8 | 1.0 | 0.8 |
| HVP/Brothy | 1.5 | 1.0 | 1.0 | 1.5 |
| Black Pepper | 1.3 | 1.0 | 1.0 | 1.0 |
| Dehydrated onion/garlic | 1.0 | 1.0 | 0.8 | 1.0 |
| Vegetable Complex | 1.0 | 1.5 | 1.0 | 1.5 |
| Cooked Green Vegetable | 0.0 | 0.8 | 0.0 | 0.8 |
| Cooked Corn | 0.5 | 0.8 | 1.0 | 0.8 |
| Mineral/Flint | 0.0 | 1.0 | 1.5 | 1.0 |
| BASIC TASTES | | | | |
| Sweet | 3.0 | 3.5 | 3.3 | 3.5 |
| Salt | 12.5 | 13.8 | 13.0 | 13.5 |
| Bitter | 0.0 | 0.8 | 1.2 | 0.8 |
| Chemical Feeling Factors | | | | |
| Umami | 0.8 | 2.0 | 2.0 | 3.0 |
| Salt Burn | 0.0 | 1.0 | 1.0 | 1.3 |
| Texture | | | | |
| Mouthdrying | 0.0 | 1.8 | 2.0 | 2.5 |
| Residual Mouthcoating | 1.0 | 1.0 | 1.0 | 1.0 |
| DOD from Control | — | 4.5 | 5.0 | 4.5 |

A low level of cooked green vegetable is seen in FE 38 1 & 100 ppb concentrations, which is not seen in the Control.

All FE 38 concentrations have a low mineral/flint note not seen in the Control.

All FE 38 samples are bitter and are higher in umami and salt burn feeling factors compared to the Control.

All FE 38 samples have mouthdrying.

Consumers will likely notice a difference between the Control and 10 ppb concentration of FE 38

Consumers may or may not notice a difference between the Control and 1 and 100 ppb concentrations of FE 38

Flavor Composition Peptides in Solution

UE-30

A summary of the panelists' attribute perception scores on a 15-point scale for the attributes is described in table 31.

TABLE 31

Attribute perception scores for UE-30 in solution.

| Compound | Concentration | Sample | Mineral/Flinty | Umami/brothy | Salt | Sweet | Sour | Bitter | Umami | Metallic | Numbing | Atringent |
|---|---|---|---|---|---|---|---|---|---|---|---|---|
| UE 30 | 1 | MIN | 0.0 | 0.0 | 1.0 | 0.0 | 0.0 | 0.0 | 0.0 | 0.0 | 0.0 | 0.0 |
| | | MAX | 0.5 | 0.0 | 1.5 | 0.0 | 0.0 | 0.0 | 0.5 | 0.0 | 0.0 | 0.0 |
| | | RANGE | 0.5 | 0.0 | 0.5 | 0.0 | 0.0 | 0.0 | 0.5 | 0.0 | 0.0 | 0.0 |
| | | STDEV | 0.2 | 0.0 | 0.2 | 0.0 | 0.0 | 0.0 | 0.2 | 0.0 | 0.0 | 0.0 |
| | | MEAN | 0.4 | 0.0 | 1.2 | 0.0 | 0.0 | 0.0 | 0.1 | 0.0 | 0.0 | 0.0 |
| UE 30 | 10 | MIN | 0.0 | 0.0 | 1.0 | 0.0 | 00 | 0.0 | 00. | 0.0 | 0.0 | 0.0 |
| | | MAX | 1.0 | 0.8 | 2.0 | 0.0 | 0.0 | 0.0 | 1.0 | 0.0 | 0.0 | 0.0 |
| | | RANGE | 1.0 | 0.8 | 1.0 | 0.0 | 0.0 | 0.0 | 1.0 | 0.0 | 0.0 | 0.0 |
| | | STDEV | 0.4 | 0.4 | 0.5 | 0.0 | 0.0 | 0.0 | 0.5 | 0.0 | 0.0 | 0.0 |
| | | MEAN | 0.8 | 0.4 | 1.5 | 0.0 | 0.0 | 0.0 | 0.6 | 0.0 | 0.0 | 0.0 |
| UE 30 | 100 | MIN | 0.8 | 0.0 | 1.0 | 0.0 | 0.0 | 0.0 | 1.5 | 0.0 | 0.0 | 0.0 |
| | | MAX | 1.5 | 0.5 | 2.0 | 0.0 | 0.0 | 1.5 | 3.0 | 0.0 | 0.0 | 0.0 |
| | | RANGE | 0.7 | 0.5 | 1.0 | 0.0 | 0.0 | 1.5 | 1.5 | 0.0 | 0.0 | 0.0 |
| | | STDEV | 0.3 | 0.2 | 0.4 | 0.0 | 0.0 | 0.6 | 0.6 | 0.0 | 0.0 | 0.0 |
| | | MEAN | 1.1 | 0.1 | 1.8 | 0.0 | 0.0 | 0.7 | 2.1 | 0.0 | 0.0 | 0.0 |

The mean evaluation scores for the perception of the attributes by the panelists, and the degree of difference from control, are described in table 32.

TABLE 32

Mean evaluation scores for the perception of the attributes and degree of difference for UE-30 in solution.

| | Flinty/Mineral | Umami | Salt | Sweet | Sour | Bitter | Umami FF | Metallic | Numbing | Astringent |
|---|---|---|---|---|---|---|---|---|---|---|
| 1.0 ppb | 0.4 | 0.0 | 1.2 | 0.0 | 0.0 | 0.0 | 0.1 | 0.0 | 0.0 | 0.0 |
| 10.0 ppb | 0.8 | 0.4 | 1.5 | 0.0 | 0.0 | 0.0 | 0.6 | 0.0 | 0.0 | 0.0 |
| 100.0 ppb | 1.1 | 0.1 | 1.8 | 0.0 | 0.0 | 0.7 | 2.1 | 0.0 | 0.0 | 0.0 |

The salt perception level increases slightly in-mouth as the concentration increases.

Mineral/Flinty aromatic increases as the concentration increases.

Umami feeling factor increases as concentrations increases. However, umami aromatic shows no distinct pattern.

FE-35

A summary of the panelists' attribute perception scores on a 15-point scale for the attributes is described in table 33.

TABLE 33

Attribute perception scores for FE-35 in solution.

| Compound | Concentration | Sample | Mineral/Flinty | Umami/brothy | Salt | Sweet | Sour | Bitter | Umami | Metallic | Numbing | Atringent |
|---|---|---|---|---|---|---|---|---|---|---|---|---|
| FE 35 | 1 | MIN | 0.5 | 1.0 | 1.5 | 0.0 | 0.0 | 0.0 | 1.0 | 0.0 | 0.0 | 0.0 |
| | | MAX | 1.0 | 2.0 | 2.0 | 1.0 | 0.0 | 0.5 | 2.0 | 0.0 | 0.0 | 0.0 |
| | | RANGE | 0.5 | 1.0 | 0.5 | 1.0 | 0.0 | 0.5 | 1.0 | 0.0 | 0.0 | 0.0 |
| | | STDEV | 0.2 | 0.3 | 0.3 | 0.4 | 0.0 | 0.2 | 0.5 | 0.0 | 0.0 | 0.0 |
| | | MEAN | 0.9 | 1.5 | 1.8 | 0.3 | 0.0 | 0.1 | 1.5 | 0.0 | 0.0 | 0.0 |
| FE 35 | 10 | MIN | 0.0 | 0.0 | 2.2 | 0.0 | 0.0 | 0.0 | 0.0 | 0.0 | 0.0 | 0.0 |
| | | MAX | 1.2 | 2.0 | 3.0 | 1.0 | 0.0 | 0.0 | 2.0 | 2.0 | 0.0 | 0.0 |
| | | RANGE | 1.2 | 2.0 | 0.8 | 1.0 | 0.0 | 0.0 | 2.0 | 2.0 | 0.0 | 0.0 |
| | | STDEV | 0.4 | 0.8 | 0.4 | 0.5 | 0.0 | 0.0 | 0.9 | 0.8 | 0.0 | 0.0 |
| | | MEAN | 0.9 | 0.8 | 2.6 | 0.3 | 0.0 | 0.0 | 1.1 | 0.3 | 0.0 | 0.0 |
| FE 35 | 100 | MIN | 0.0 | 0.0 | 1.5 | 0.0 | 0.0 | 0.0 | 0.0 | 0.0 | 0.0 | 0.0 |
| | | MAX | 1.5 | 1.0 | 2.5 | 1.0 | 0.0 | 0.0 | 1.5 | 1.0 | 0.0 | 0.0 |
| | | RANGE | 1.5 | 1.0 | 1.0 | 1.0 | 0.0 | 0.0 | 1.5 | 1.0 | 0.0 | 0.0 |
| | | STDEV | 0.6 | 0.4 | 0.3 | 0.4 | 0.0 | 0.0 | 0.6 | 0.4 | 0.0 | 0.0 |
| | | MEAN | 0.7 | 0.2 | 2.0 | 0.2 | 0.0 | 0.0 | 1.1 | 0.3 | 0.0 | 0.0 |

The mean evaluation scores for the perception of the attributes by the panelists, and the degree of difference from control, are described in table 34.

TABLE 34

Mean evaluation scores for the perception of the attributes and degree of difference for FE-35 in solution.

| | Flinty/Mineral | Umami | Salt | Sweet | Sour | Bitter | Umami FF | Metallic | Numbing | Astringent |
|---|---|---|---|---|---|---|---|---|---|---|
| 1.0 ppb | 0.9 | 1.5 | 1.8 | 0.3 | 0.0 | 0.1 | 1.5 | 0.0 | 0.0 | 0.0 |
| 10.0 ppb | 0.9 | 0.8 | 2.6 | 0.3 | 0.0 | 0.0 | 1.1 | 0.3 | 0.0 | 0.0 |
| 100.0 ppb | 0.7 | 0.2 | 2.0 | 0.2 | 0.0 | 0.0 | 1.1 | 0.3 | 0.0 | 0.0 |

Umami aromatic decreases slightly as the aromatic increases. However, umami feeling factor shows no distinct pattern.

Mineral/flinty and salt show no distinct pattern with the increasing concentrations of FE 35.

FE-36

A summary of the panelists' attribute perception scores on a 15-point scale for the attributes is described in table 35.

TABLE 35

Attribute perception scores for FE-36 in solution.

| Compound | Concentration | Sample | Mineral/ Flinty | Umami/ brothy | Salt | Sweet | Sour | Bitter | Umami | Metallic | Numbing | Atringent |
|---|---|---|---|---|---|---|---|---|---|---|---|---|
| FE 36 | 1 | MIN | 0.0 | 0.0 | 2.5 | 0.0 | 0.0 | 0.0 | 1.0 | 0.0 | 0.0 | 0.0 |
| | | MAX | 1.0 | 1.0 | 3.0 | 1.0 | 0.0 | 0.0 | 2.0 | 0.8 | 0.0 | 0.0 |
| | | RANGE | 1.0 | 1.0 | 0.5 | 1.0 | 0.0 | 0.0 | 1.0 | 0.8 | 0.0 | 0.0 |
| | | STDEV | 0.5 | 0.5 | 0.2 | 0.4 | 0.0 | 0.0 | 0.4 | 0.3 | 0.0 | 0.0 |
| | | MEAN | 0.7 | 0.3 | 2.6 | 0.2 | 0.0 | 0.0 | 1.5 | 0.1 | 0.0 | 0.0 |
| FE 36 | 10 | MIN | 0.0 | 0.0 | 1.5 | 0.0 | 0.0 | 0.0 | 0.0 | 0.0 | 0.0 | 0.0 |
| | | MAX | 1.5 | 0.8 | 2.3 | 0.0 | 0.0 | 0.0 | 2.0 | 0.0 | 0.0 | 0.0 |
| | | RANGE | 1.5 | 0.8 | 0.8 | 0.0 | 0.0 | 0.0 | 2.0 | 0.0 | 0.0 | 0.0 |
| | | STDEV | 0.5 | 0.3 | 0.3 | 0.0 | 0.0 | 0.0 | 0.9 | 0.0 | 0.0 | 0.0 |
| | | MEAN | 0.8 | 0.1 | 1.9 | 0.0 | 0.0 | 0.0 | 0.9 | 0.0 | 0.0 | 0.0 |
| FE 36 | 100 | MIN | 0.0 | 0.0 | 1.5 | 0.0 | 0.0 | 0.0 | 0.5 | 0.0 | 0.0 | 0.0 |
| | | MAX | 1.0 | 0.0 | 3.0 | 0.0 | 0.0 | 0.0 | 3.0 | 0.0 | 0.0 | 0.0 |
| | | RANGE | 1.0 | 0.0 | 1.5 | 0.0 | 0.0 | 0.0 | 2.5 | 0.0 | 0.0 | 0.0 |
| | | STDEV | 0.4 | 0.0 | 0.5 | 0.0 | 0.0 | 0.0 | 0.9 | 0.0 | 0.0 | 0.0 |
| | | MEAN | 0.8 | 0.0 | 2.1 | 0.0 | 0.0 | 0.0 | 1.6 | 0.0 | 0.0 | 0.0 |

The mean evaluation scores for the perception of the attributes by the panelists, and the degree of difference from control, are described in table 36.

TABLE 36

Mean evaluation scores for the perception of the attributes and degree of difference for FE-36 in solution.

| | Flinty/ Mineral | Umami | Salt | Sweet | Sour | Bitter | Umami FF | Metallic | Numbing | Astringent |
|---|---|---|---|---|---|---|---|---|---|---|
| 1.0 ppb | 0.7 | 0.3 | 2.6 | 0.2 | 0.0 | 0.0 | 1.5 | 0.1 | 0.0 | 0.0 |
| 10.0 ppb | 0.8 | 0.1 | 1.9 | 0.0 | 0.0 | 0.0 | 0.9 | 0.0 | 0.0 | 0.0 |
| 100.0 ppb | 0.8 | 0.0 | 2.1 | 0.0 | 0.0 | 0.0 | 1.6 | 0.0 | 0.0 | 0.0 |

No distinct patterns are seen in FE 36 as concentrations increase

FE-37

A summary of the panelists' attribute perception scores on a 15-point scale for the attributes is described in table 37.

TABLE 37

Attribute perception scores for FE-37 in solution.

| Compound | Concentration | Sample | Mineral/ Flinty | Umami/ brothy | Salt | Sweet | Sour | Bitter | Umami | Metallic | Numbing | Atringent |
|---|---|---|---|---|---|---|---|---|---|---|---|---|
| FE 37 | 1 | MIN | 0.0 | 0.0 | 2.0 | 0.0 | 0.0 | 0.0 | 0.0 | 0.0 | 0.0 | 0.0 |
| | | MAX | 1.5 | 0.8 | 2.8 | 0.0 | 0.0 | 00 | 2.0 | 0.0 | 0.0 | 0.0 |
| | | RANGE | 1.5 | 0.8 | 0.8 | 0.0 | 0.0 | 0.0 | 2.0 | 0.0 | 0.0 | 0.0 |
| | | STDEV | 0.6 | 0.3 | 0.3 | 0.0 | 0.0 | 0.0 | 0.8 | 0.0 | 0.0 | 0.0 |
| | | MEAN | 0.7 | 0.1 | 2.4 | 0.0 | 0.0 | 0.0 | 1.3 | 0.0 | 0.0 | 0.0 |
| FE 37 | 10 | MIN | 0.0 | 0.0 | 2.5 | 0.0 | 0.0 | 0.0 | 0.0 | 0.0 | 0.0 | 0.0 |
| | | MAX | 1.0 | 1.0 | 3.5 | 0.8 | 0.0 | 0.0 | 2.5 | 0.0 | 0.0 | 0.0 |
| | | RANGE | 1.0 | 1.0 | 1.0 | 0.8 | 0.0 | 0.0 | 2.5 | 0.0 | 0.0 | 0.0 |
| | | STDEV | 0.4 | 0.4 | 0.4 | 0.3 | 0.0 | 0.0 | 0.8 | 0.0 | 0.0 | 0.0 |
| | | MEAN | 0.8 | 0.2 | 3.0 | 0.1 | 0.0 | 0.0 | 1.3 | 0.0 | 0.0 | 0.0 |
| FE 37 | 100 | MIN | 0.0 | 0.0 | 1.5 | 0.0 | 0.0 | 0.0 | 0.0 | 0.0 | 0.0 | 0.0 |
| | | MAX | 1.5 | 1.0 | 4.5 | 1.0 | 0.0 | 0.0 | 3.0 | 0.8 | 0.0 | 0.0 |
| | | RANGE | 1.5 | 1.0 | 3.0 | 1.0 | 0.0 | 0.0 | 3.0 | 0.8 | 0.0 | 0.0 |
| | | STDEV | 0.5 | 0.5 | 1.0 | 0.4 | 0.0 | 0.0 | 1.1 | 0.3 | 0.0 | 0.0 |
| | | MEAN | 0.9 | 0.5 | 2.8 | 0.2 | 0.0 | 0.0 | 1.6 | 0.1 | 0.0 | 0.0 |

The mean evaluation scores for the perception of the attributes by the panelists, and the degree of difference from control, are described in table 38.

TABLE 38

Mean evaluation scores for the perception of the attributes and degree of difference for FE-37 in solution.

| | Flinty/Mineral | Umami | Salt | Sweet | Sour | Bitter | Umami FF | Metallic | Numbing | Astringent |
|---|---|---|---|---|---|---|---|---|---|---|
| 1.0 ppb | 0.7 | 0.1 | 2.4 | 0.0 | 0.0 | 0.0 | 1.3 | 0.0 | 0.0 | 0.0 |
| 10.0 ppb | 0.8 | 0.2 | 3.0 | 0.1 | 0.0 | 0.0 | 1.3 | 0.0 | 0.0 | 0.0 |
| 100.0 ppb | 0.9 | 0.5 | 2.8 | 0.2 | 0.0 | 0.0 | 1.6 | 0.1 | 0.0 | 0.0 |

The salt perception level shows no distinct pattern as concentration increases.

Mineral/Flinty and umami aromatics increase very slightly as the concentration increases.

Umami feeling factor increases very slightly by 100 ppb.

FE-38

A summary of the panelists' attribute perception scores on a 15-point scale for the attributes is described in table 39.

TABLE 39

Attribute perception scores for FE-38 in solution.

| Compound | Concentration | Sample | Mineral/Flinty | Umami/brothy | Salt | Sweet | Sour | Bitter | Umami | Metallic | Numbing | Atringent |
|---|---|---|---|---|---|---|---|---|---|---|---|---|
| FE 38 | 1 | MIN | 0.5 | 0.0 | 2.8 | 0.0 | 0.0 | 0.0 | 0.0 | 0.0 | 0.0 | 0.0 |
| | | MAX | 1.5 | 1.0 | 3.5 | 0.0 | 0.0 | 0.0 | 1.0 | 0.0 | 0.0 | 0.0 |
| | | RANGE | 1.0 | 1.0 | 0.7 | 0.0 | 0.0. | 0.0 | 1.0 | 0.0 | 0.0 | 0.0 |
| | | STDEV | 0.3 | 0.4 | 0.3 | 0.0 | 0.0 | 0.0 | 0.5 | 0.0 | 0.0 | 0.0 |
| | | MEAN | 1.0 | 0.2 | 3.1 | 0.0 | 0.0 | 0.0 | 0.7 | 0.0 | 0.0 | 0.0 |
| FE 38 | 10 | MIN | 0.8 | 0.0 | 3.0 | 0.0 | 0.0 | 0.0 | 0.0 | 0.0 | 0.0 | 0.0 |
| | | MAX | 1.5 | 1.0 | 4.0 | 1.0 | 0.0 | 0.8 | 3.0 | 0.0 | 0.0 | 0.0 |
| | | RANGE | 0.7 | 1.0 | 1.0 | 1.0 | 0.0 | 0.8 | 3.0 | 0.0 | 0.0 | 0.0 |
| | | STDEV | 0.3 | 0.4 | 0.4 | 0.4 | 0.0 | 0.4 | 1.1 | 0.0 | 0.0 | 0.0 |
| | | MEAN | 1.1 | 0.5 | 3.7 | 0.2 | 0.0 | 0.2 | 1.8 | 0.0 | 0.0 | 0.0 |
| FE 38 | 100 | MIN | 0.8 | 0.0 | 3.5 | 0.0 | 0.0 | 0.0 | 0.5 | 0.0 | 0.0 | 0.0 |
| | | MAX | 1.5 | 1.0 | 4.0 | 1.0 | 0.0 | 0.8 | 3.8 | 0.0 | 0.0 | 0.0 |
| | | RANGE | 0.7 | 1.0 | 0.5 | 1.0 | 0.0 | 0.8 | 3.3 | 0.0 | 0.0 | 0.0 |
| | | STDEV | 0.3 | 0.5 | 0.3 | 0.4 | 0.0 | 0.4 | 1.1 | 0.0 | 0.0 | 0.0 |
| | | MEAN | 1.3 | 0.5 | 3.7 | 0.2 | 0.0 | 0.2 | 1.7 | 0.0 | 0.0 | 0.0 |

The mean evaluation scores for the perception of the attributes by the panelists, and the degree of difference from control, are described in table 40.

TABLE 40

Mean evaluation scores for the perception of the attributes and degree of difference for FE-38 in solution.

| | Flinty/Mineral | Umami | Salt | Sweet | Sour | Bitter | Umami FF | Metallic | Numbing | Astringent |
|---|---|---|---|---|---|---|---|---|---|---|
| 1.0 ppb | 1.0 | 0.2 | 3.1 | 0.0 | 0.0 | 0.0 | 0.7 | 0.0 | 0.0 | 0.0 |
| 10.0 ppb | 1.1 | 0.5 | 3.7 | 0.2 | 0.0 | 0.2 | 1.8 | 0.0 | 0.0 | 0.0 |
| 100.0 ppb | 1.3 | 0.5 | 3.7 | 0.2 | 0.0 | 0.2 | 1.7 | 0.0 | 0.0 | 0.0 |

The salt perception level and umami aromatic increase very slightly in-mouth at 10 ppb.

Mineral/Flinty aromatic increases very slightly as the concentration increases.

Umami feeling factor shows no distinct pattern as concentration increases.

Summary

Flavor Composition Peptides in Rice

A summary of the results of the Degree of Difference in rice for the pGlu-Cys (FE-35), pGlu-Cys-Gly (FE-36), pGlu-Cys-Cys (FE-37) and pGlu-Cys-Val (FE-38) flavor composition peptides is shown in table 41.

TABLE 41

Summary of the Degree of Difference in rice for FE-35, FE-36, FE-37 and FE-38.

| | UE 30 | FE 35 | FE 36 | FE 37 | FE 38 |
|---|---|---|---|---|---|
| 1.0 ppb | 4.5 | 3.8 | 5.0 | 4.0 | 4.5 |
| 10.0 ppb | 5.0 | 5.0 | 5.0 | 4.5 | 5.0 |
| 100.0 ppb | 5.0 | 5.0 | 5.5 | 5.0 | 4.5 |

Consumers will likely notice a difference between the Control and:
- 10 and 100 ppb concentrations of UE 30
- and 10 and 100 ppb concentrations of FE 35
- all concentrations of FE 36
- 100 ppb concentration of FE 37
- 10 ppb concentration of FE 38

Consumers may or may not notice a difference between the Control and:
- 1 ppb concentration of UE 30
- and 10 ppb concentrations of FE 37
- 1 and 100 ppb concentrations of FE 38

Consumers will likely not notice the difference between the Control and 1 ppb concentration of FE 35

Overall, differences seen from Control are similar in all salt/flavor enhancers at varying concentrations.

The degree to which the sample differs from the Control changes with changing concentrations of the compound.
- Generally, a mineral/flinty note is present in test samples and tends to increase slight as concentration increases.
- A cooked green vegetable note becomes present in test samples and generally increases slightly as concentration increases.
- Umami feeling factor tends to increase as concentration increases.
- Mouthdrying becomes present in test samples and may increase very slightly as concentration increases.
- In all samples except FE 36, salt generally increases slightly as concentration increases.

Flavor Composition Peptides in Solution

UE 30
- The salt perception level and mineral/flinty aromatic increase slightly in-mouth as the concentration increases.
- Umami feeling factor increases as concentrations increases. However, umami aromatic shows no distinct pattern.

FE 35
- Umami aromatic decreases slightly as the concentration increases. However, umami feeling factor shows no distinct pattern.
- Mineral/flinty and salt show no distinct pattern with the increasing concentrations of FE 35.

FE 36
- No distinct patterns are seen in FE 36 as concentrations increase.

FE 37
- The salt perception level shows no distinct pattern as concentration increases.
- Mineral/Flinty and umami aromatic and feeling factor increase very slightly as the concentration increases.

FE 38
- Salt perception level and mineral/Flinty and umami aromatics increase very slightly as the concentration increases.
- Umami feeling factor shows no distinct pattern as concentration increases.

Example 7—Food Product Compositions Comprising Added Flavor Composition Peptides and Reduced Levels of Salt Food products were prepared as described below, wherein flavor composition peptides of the present application were added to the food compositions, and further, wherein the level of salt (NaCl) in the food product compositions was reduced. As described below, the perception of salt was similar in the test compositions comprising the flavor composition peptides and reduced level of salt compared to a control food product comprising non-reduced salt levels and no flavor composition peptides.

A. 50% NaCl Reduction of Roasted Chicken Flavored Rice with the Addition of 50 ppb of pGlu-Val-Leu Methods:

All Ingredients, except the rice, were placed into a container and mixed. The mixture was heated in a microwave for a total of one minute for two 30 second intervals. The rice and mixture were then mixed in a bowl. The cooking bowl was placed into a rice cooker and the cook cycle was started. After 36 minutes the rice was mixed and then allowed to cook for the remaining time for a total time of 49 minutes.

Three batches of rice were made: a control with 100% NaCl (4.7696 g), a sample with 50% NaCl (2.38 g), and the last sample had 50% NaCl (2.38 g) with 50 ppb of pGlu-Val-Leu. A 200 ppm stock solution of pGlu-Val-Leu in water was made to be added to the rice, as shown in table 42.

TABLE 42

| Ingredients | Control (g) | Sample A (g) | Sample B (g) |
| --- | --- | --- | --- |
| Rice | 170 | 170 | 170 |
| Chicken seasoning blend No NaCl | 13.7704 | 16.1552 | 16.1552 |
| NaCl | 4.7696 | 2.3848 | 2.3848 |
| Oil | 8.82 | 8.82 | 8.82 |
| Water | 306.64 | 306.64 | 306.64 |
| pGlu-Val-Leu 200 ppm solution | 0 | 0 | 0.1 |
| Total (g) | 504 | 504 | 504.1 |

The table above shows the ingredients used to make the control and the 2 test batches. The control had no salt reduction, sample A had a 50% salt reduction, and sample B had a 50% salt reduction with pGlu-Val-Leu.

Chicken seasoning blend used in the experiment.

Chicken Seasoning Blend:

| | |
| --- | --- |
| Salt Granular Fine | 0 g |
| Citric Acid Anhydrous | 0.0835 g |
| Sugar Extra Fine | 1.0393 g |
| Potassium Chloride | 0.2877 g |
| Oleoresin Turmeric | 0.1392 g |
| Guar Gum Food Grade Powder | 0.1670 g |
| Xanthan Gum Fine Grind 200 Mesh Dried | 0.0464 g |
| Vitamin Mix | 0.0278 g |
| Commercial Simmered Chicken Flavor (flavor house) | 0.5939 g |
| Commercial Roasted Chicken Flavor (flavor house) | 3.0529 g |
| Silicone Dioxide | 0.0464 g |
| Yeast Extract | 0.3897 g |
| Ground Black Pepper | 0.0371 g |
| Carrot Granules | 0.7238 g |
| Parsley Flakes | 0.2505 g |

Results:

Sample A (50% NaCl reduction) was significantly less salty tasting than the control. The salty taste of sample B (50% NaCl reduction with 50 ppb pGlu-Val-Leu) was similar to that of the control sample.

B. 50% NaCl Reduction of Roasted Chicken Flavored Rice with the Addition of 50 ppb of pGlu-Val-Val Methods:

All Ingredients, except the rice, were placed into a container and mixed. The mixture was heated in a microwave for a total of one minute for two 30 second intervals. The rice and mixture were then mixed in a bowl. The cooking bowl was placed into a rice cooker and the cook cycle was started. After 36 minutes the rice was mixed and then allowed to cook for the remaining time for a total time of 49 minutes.

Three batches of rice were made: a control with 100% NaCl, a sample with 50% NaCl, and a sample that had 50% NaCl (2.38 g) with 50 ppb of pGlu-Val-Val. A 200 ppm stock solution of pGlu-Val-Val in water was made to be added to the rice, as shown in table 43.

TABLE 43

| Ingredients | Control (g) | Sample A (g) | Sample B (g) |
|---|---|---|---|
| Rice | 170.2 | 170.5 | 170.2 |
| Chicken seasoning blend #1 | 18.5418 | 9.174 | 9.27 |
| Chicken seasoning blend #2 (No NaCl/KCl) | 0 | 9.1276 | 9.124 |
| NaCl | 0 | 0 | 0 |
| KCl | 0 | 0.3075 | 0.146 |
| Oil | 8.8 | 8.8 | 8.85 |
| Water | 306.4 | 306.4 | 306.64 |
| pGlu-Val-Val 200 ppm Solution | 0 | 0 | 0.12 |
| Total (g) | 503.9418 | 504.3091 | 504.35 |

The table above shows the ingredients used to make the control and the 2 test batches. Two chicken seasoning blends were blended together to give a 50% sodium reduced chicken seasoning blend.

Chicken seasoning blend #1 used in the experiment. (Chicken seasoning blend #2 has no sodium chloride or potassium chloride added).
Chicken Seasoning Blend:

| | |
|---|---|
| Salt Granular Fine | 2.3848 g |
| Citric Acid Anhydrous | 0.0835 g |
| Sugar Extra Fine | 1.0393 g |
| Potassium Chloride | 0.2877 g |
| Oleoresin Turmeric | 0.1392 g |
| Guar Gum Food Grade Powder | 0.1670 g |
| Xanthan Gum Fine Grind 200 Mesh Dried | 0.0464 g |
| Vitamin Mix | 0.0278 g |
| Commercial Simmered Chicken Flavor (flavor house) | 0.5939 g |
| Commercial Roasted Chicken Flavor (flavor house) | 3.0529 g |
| Silicone Dioxide | 0.0464 g |
| Yeast Extract | 0.3897 g |
| Ground Black Pepper | 0.0371 g |
| Carrot Granules | 0.7238 g |
| Parsley Flakes | 0.2505 g |

Results:
Sample A (50% NaCl reduction) was significantly less salty tasting than the control. The salty taste of sample B (50% NaCl reduction with 50 ppb pGlu-Val-Val) was similar to that of the control sample but had a salty aftertaste.

C. 50% NaCl Reduction of Roasted Chicken Flavored Rice with the Addition of 50 ppb of pGlu-Val and 50 ppb of pGlu-Pro-Glu Methods:
All Ingredients, except the rice, were placed into a container and mixed. The mixture was heated in a microwave for a total of one minute for two 30 second intervals. The rice and mixture were then mixed in a bowl. The cooking bowl was placed into a rice cooker and the cook cycle was started. After 36 minutes the rice was mixed and then allowed to cook for the remaining time for a total time of 49 minutes.

Two batches of rice were made: a control with 50% NaCl (2.38 g), and the other sample had 50% NaCl (2.38 g) with 50 ppb of pGlu-Val and 50 ppb of pGlu-Pro-Glu. Two stock solutions were made to be added to the rice: a 200 ppm stock solution of pGlu-Val in water and a 200 ppm stock solution of pGlu-Pro-Glu in water, as shown in table 44.

TABLE 44

| Ingredients | Required (g) | Control (g) | Test (g) |
|---|---|---|---|
| Rice | 170 | 170.02 | 170.05 |
| Chicken seasoning blend #1 | 9.27 | 9.2731 | 9.2665 |
| Chicken seasoning blend #2 (No NaCl/KCl) | 8.9823 | 8.9839 | 8.9762 |
| KCl | 0.2877 | 0.2836 | 0.2989 |
| Oil | 8.82 | 8.92 | 8.86 |
| Water | 306.64 | 306.12 | 306.62 |
| pGlu-Val 200 ppm Solution | 0 | 0 | 0.12 |
| pGlu-Pro-Glu 200 ppm Solution | 0 | 0 | 0.09 |
| Total (g) | 504 | 504.2347 | 504.544 |

The table above shows the amount of ingredients added to the control and rice sample.

Chicken seasoning blend #1 used in the experiment. (Chicken seasoning blend #2 has no sodium chloride or potassium chloride added).
Chicken Seasoning Blend:

| | |
|---|---|
| Salt Granular Fine | 2.3848 g |
| Citric Acid Anhydrous | 0.0835 g |
| Sugar Extra Fine | 1.0393 g |
| Potassium Chloride | 0.2877 g |
| Oleoresin Turmeric | 0.1392 g |
| Guar Gum Food Grade Powder | 0.1670 g |
| Xanthan Gum Fine Grind 200 Mesh Dried | 0.0464 g |
| Vitamin Mix | 0.0278 g |
| Commercial Simmered Chicken Flavor (flavor house) | 0.5939 g |
| Commercial Roasted Chicken Flavor (flavor house) | 3.0529 g |
| Silicone Dioxide | 0.0464 g |
| Yeast Extract | 0.3897 g |
| Ground Black Pepper | 0.0371 g |
| Carrot Granules | 0.7238 g |
| Parsley Flakes | 0.2505 g |

Results:
The test sample (50% NaCl reduction with 50 ppb pGlu-Val and 50 ppb pGlu-Pro-Glu) was significantly less salty tasting than the control, had some umami attributes and also had a bitter aftertaste.

D. 60% NaCl Reduction in Chicken Broth with the Addition of 0.667 ppb of pGlu-Val-Leu Methods:
Chicken broth (737 g) was transferred into the 32-oz plastic container and was heated in a microwave for a total of 1 min 45 sec for three 35 second intervals and shaken well each time. Then, either salt or salt with peptide was added to the broth. Again, it was re-heated for 30 seconds and shaken well.

Three batches of chicken broth were made: a control with 100% NaCl (1.474 g), a sample with 60% NaCl reduction (0.5896 g) and the last sample with 60% NaCl reduction (0.4919 g) and 0.667 ppb pGlu-Val-Leu (0.0986 g peptide stock). A 5 ppm stock of pGlu-Val-Leu in salt was made to be added to the chicken broth. Therefore, this peptide stock is a source of both pGlu-Val-Leu and NaCl, as shown in table 45.

TABLE 45

| Ingredients | Control (g) | Sample A (g) | Sample B (g) |
|---|---|---|---|
| Chicken broth (Swanson unsalted cooking stock) | 737 | 737 | 737 |
| NaCl | 1.474 | 0.5896 | 0.4919 |
| pGlu-Val-Leu 5 ppm | 0.0 | 0.0 | 0.0986 |
| Total (g) | 738.474 | 737.590 | 737.590 |

The table above shows the ingredients used to make the control and the 2 test batches. The control had no salt reduction, sample A had a 60% salt reduction, and sample B had a 60% salt reduction with pGlu-Val-Leu.
Results:
Sample A (60% NaCl reduction) was significantly less salty tasting than the control. The salty taste of sample B (60% NaCl reduction with pGlu-Val-Leu) was similar to that of the control sample.

E. 50% NaCl Reduction in Tomato Sauce with the Addition of 50 ppb of pGlu-Val-Leu
Methods:
Tomato sauce (1 bottle, 680 g) was transferred into a 32-oz plastic container and was heated in a microwave for a total of 1 min 45 sec for three 35 second intervals and was shaken well in between each interval.
Three batches of tomato sauce were made: a control with 100% NaCl (0.1 g), a sample with 50% NaCl reduction (0.05 g) and the last sample with 50% NaCl reduction and 50 ppb pGlu-Val-Leu (0.05 g). A 50 ppm stock of pGlu-Val-Leu in salt was made to be added to the tomato sauce. Therefore, this peptide stock is a source of both pGlu-Val-Leu and NaCl, as shown in table 46.

TABLE 46

| Ingredients | Control (g) | Sample A (g) | Sample B (g) |
|---|---|---|---|
| Tomato sauce (Bionaturae Organic Strained Tomatoes; no salt added) | 50 | 50 | 50 |
| NaCl | 0.1 | 0.05 | 0.0 |
| pGlu-Val-Leu 50 ppm | 0.0 | 0.0 | 0.05 |
| Total (g) | 50.1 | 50.05 | 50.05 |

The table above shows the ingredients used to make the control and the 2 test batches. The control had no salt reduction, sample A had a 50% salt reduction, and sample B had a 50% salt reduction with pGlu-Val-Leu.
Results:
Sample A (50% NaCl reduction) was significantly less salty tasting than the control. The salty taste of sample B (50% NaCl reduction with 50 ppb pGlu-Val-Leu) was similar to that of the control sample.

F. 50% NaCl Reduction in Peanut Butter with the Addition of 267 ppb of pGlu-Val-Leu Methods:
All Ingredients were added into the mixing bowl and milled on the Retsch mill (model RM200) for a total of 30 minutes for two 15 minute intervals. After 15 minutes, the walls of the bowl were scraped with a spatula and then, milling was resumed.
Three batches of peanut butter were made: a control with 100% NaCl (0.05 g), a sample with 100% NaCl (0.05 g) and 267 ppb pGlu-Val-Leu, and a sample with 50% NaCl reduction (0.025 g) and with 267 ppb pGlu-Val-Leu.

A 1000 ppm stock of pGlu-Val-Leu in salt was made to be added to the peanut butter. Therefore, this peptide stock is a source of both pGlu-Val-Leu and NaCl, as shown in table 47.

TABLE 47

| Ingredients | Control (g) | Sample A (g) | Sample B (g) |
|---|---|---|---|
| Peanut butter (organic, no salt added) | 50 | 75 | 75 |
| NaCl | 0.05 | 0.05 | 0.025 |
| pGlu-Val-Leu 1000 ppm | 0.0 | 0.02 | 0.02 |
| Total (g) | 50.05 | 75.07 | 75.045 |

The table above shows the ingredients used to make the control and the 2 test batches. The control had no salt reduction, sample A had no salt reduction with pGlu-Val-Leu and sample B had 50% salt reduction with pGlu-Val-Leu.
Results:
Sample A (no salt reduction and 267 ppb ppm pGlu-Val-Leu) was saltier than the control. The salty taste of sample B (50% NaCl reduction with 267 ppb pGlu-Val-Leu) was similar to that of the control sample.

G. 50% NaCl Reduction in Potato Chips with the Addition of 1150 ppb of pGlu-Val-Leu
Methods:
All Ingredients were added into a plastic container and mixed gently.
Two batches of potato chips were made: a control with 100% NaCl (0.5 g) and a sample with 50% NaCl (0.25 g) and 1150 ppb pGlu-Val-Leu.
A 1000 ppm stock of pGlu-Val-Leu in salt was made to be added to the potato chips. Therefore, this peptide stock is a source of both pGlu-Val-Leu and NaCl, as shown in table 48.

TABLE 48

| Ingredients | Control (g) | Sample A (g) |
|---|---|---|
| Potato chips (Kettle Brand, unsalted) | 10 | 10 |
| NaCl | 0.5 | 0.25 |
| pGlu-Val-Leu 1000 ppm | 0.0 | 0.0118 |
| Total (g) | 10.5 | 10.2618 |

The table above shows the ingredients used to make the control and sample. The control had no salt reduction and sample A had a 50% salt reduction with pGlu-Val-Leu.
Results:
Sample A (50% salt reduction with 1150 ppb pGlu-Val-Leu) was saltier than the control.

H. 60% NaCl Reduction of Roasted Chicken Flavored Rice with the Addition of 1 ppb of pGlu-Val-Leu and 1 ppb of pGlu-Val-Cys
Methods:
All Ingredients, except the rice, were placed into a container and mixed. The mixture was heated in a microwave for a total of one minute for two 30 second intervals. The rice and mixture were then mixed in a bowl. The cooking bowl was placed into a rice cooker and the cook cycle was started. After 36 minutes the rice was mixed and then allowed to cook for the remaining time for a total time of 49 minutes.
Three batches of rice were made: a control with 100% NaCl (4.7696 g), a sample with 40% NaCl (1.9 g), and the last sample had 40% NaCl (1.9 g) with 1 ppb of pGlu-Val- Leu and 1 ppb of pGlu-Val-Cys. Two stock solutions were made to be added to the rice: a 2 ppm stock solution of pGlu-Val-Leu in water and a 2 ppm stock solution of pGlu-Val-Cys in water, as shown in table 49.

TABLE 49

| Ingredients | Control (g) | Sample A (g) | Sample B (g) |
|---|---|---|---|
| Rice | 170 | 170 | 170 |
| Chicken seasoning blend No NaCl | 13.7704 | 16.63216 | 16.63216 |
| NaCl | 4.7696 | 1.90784 | 1.90784 |
| Oil | 8.82 | 8.82 | 8.82 |
| Water | 306.64 | 306.64 | 306.64 |
| pGlu-Val-Leu 2 ppm Solution | 0 | 0 | 0.2 |
| pGlu-Val-Cys 2 ppm Solution | 0 | 0 | 0.2 |
| Total (g) | 504 | 504 | 504.4 |

The table above shows the ingredients used to make the control and the 2 test batches. The control had no salt reduction, sample A had 40% salt, and sample B had 40% salt with pGlu-Val-Leu and pGlu-Val-Cys added. Chicken seasoning blend used in the experiment.

Chicken Seasoning Blend:

| | |
|---|---|
| Salt Granular Fine | 0 g |
| Citric Acid Anhydrous | 0.0835 g |
| Sugar Extra Fine | 1.0393 g |
| Potassium Chloride | 0.2877 g |
| Oleoresin Turmeric | 0.1392 g |

-continued

| | |
|---|---|
| Guar Gum Food Grade Powder | 0.1670 g |
| Xanthan Gum Fine Grind 200 Mesh Dried | 0.0464 g |
| Vitamin Mix | 0.0278 g |
| Commercial Simmered Chicken Flavor (flavor house) | 0.5939 g |
| Commercial Roasted Chicken Flavor (flavor house) | 3.0529 g |
| Silicone Dioxide | 0.0464 g |
| Yeast Extract | 0.3897 g |
| Ground Black Pepper | 0.0371 g |
| Carrot Granules | 0.7238 g |
| Parsley Flakes | 0.2505 g |

Results:

Sample A (60% NaCl reduction) tasted less salty than the control. The salty taste of sample B (60% NaCl reduction with 1 ppb pGlu-Val-Leu and 1 ppb pGlu-Val-Cys) was similar to that of the control sample and was also more complex, well rounded and had higher umami attributes than the control.

Example 8—Food Product Compositions Comprising Added Flavor Composition Peptides and Reduced Levels of Salt Food product compositions were prepared by admixing flavor composition peptide(s) of the present application with food compositions, wherein the level of sodium (NaCl) in the food product compositions was reduced. The level of sodium was reduced by 25%, 50% or 75% compared to food products compositions that were not admixed with flavor composition peptides. The food product compositions comprising the flavor composition peptides were tasted by a panel of trained tasters and the level of saltiness was compared to the control food products.

Results

The peptides pGlu-Val-Leu (identified as "SE-13"), pGlu-Val-Cys (identified as "UE-30") and pGlu-Val-Val (identified as "SE-17") were tested in Pasta Sauce. The control pasta sauce comprised 540 mg sodium (NaCl) in a 125 g serving. The assessment of the panel of testers (n=4) is shown in table 50.

TABLE 50

| Food System | Sodium (Na) mg/Serving | Compounds Assessed | Assessment |
|---|---|---|---|
| Pasta Sauce | Control 540 mg. Test- Different levels (25, 50, 75%) reduction. | SE-13 at 10 ppb and 1 ppb. | Test variables perceived less salty than control. SE-13 was evaluated at many reduction levels (75%, 50%, 25%) both 10 and 1 ppb. 25% reduction closest to control, slightly less salty. |
| | Control-540 mg. Test-405 mg. | SE-13 (10 ppb) + UE-30 (1 ppb) | Test variables perceived less salty than control. Combination was perceived saltier than SE-13 alone but less salty than full salt control, but was very flavorful. 10 ppb of UE-30 had a metallic taste |
| | Control-540 mg Test-405 mg | SE-17 (10 ppb), SE-17 (10 ppb) + UE-30 (1 ppb) | Test variables perceived significantly less salty than control. SE-17 and SE-17 + UE-30 did not provide a big jump in salt enhancement. However, these test variables were perceived more flavorful. |

Full salt control at 540 mg was paneled (n = 21) against SE-13 and UE-30 combination for saltiness and preference. Control was perceived as significantly more salty (17/21) and test variable was directionally preferred (14/21)

The peptides pGlu-Val-Leu (identified as "SE-13"), pGlu-Val-Cys (identified as "UE-30"), pGlu-Val-Val (identified as "SE-17") and pGlu-Cys-Cys (identified as "FE-37") were tested in cottage cheese, tortilla chips, ketchup, cream of mushroom soup, alfredo sauce, sausage, mixed nuts, peanuts, soy sauce and chicken broth. The level of sodium in the test food products comprising the peptides was reduced by 25% compared to the control food products. The assessment of the panel of testers (n=4) is shown in table 51.

TABLE 51

| Food System | Sodium Levels (mg) | Compounds Assessed | Assessment |
|---|---|---|---|
| Cottage Cheese | Control - 350. Test - 262. | SE-13 (10 ppb), SE-17 (10 ppb), SE-13 + UE-30 (10 ppb's each), SE-17 + UE-30 (10 ppb's each) | Test samples notably less salty/flavorful than control. SE-17 and SE-17 + UE-30 combination preferred compared to SE-13 and SE-13 + UE-30 combination. SE-17 and SE-17 + UE-30 combination masks the acidity at the end. |
| Tortilla Chips | Control - 103. Test - 77. | SE-13 (10 ppb), SE-13 + UE-30 (10 ppb each) | Test samples saltier than control. SE-13 + UE-30 combination perceived saltier than the Full salt control, more corn flavor from the combination. |
| Chicken Broth | Control - 860. Test - 645. | SE-13 (10 ppb), SE-17 (10 ppb), SE-13 + UE-30 (10 ppb's each), SE-13 + FE-37 (10 ppb's each), SE-17 + UE-30 (10 ppb's each) | Test samples saltier than control. SE-17 + UE-30 combination more flavorful than the control. Adds a meaty character to the test variable. Similar results were seen with SE-13 + FE-37. |
| Cream of Mushroom Soup | Control - 870. Test - 652. | SE-13 + UE-30 (10 ppb's each); SE-17 + UE-30 (10 ppb's each); SE-13 + FE-37 (10 ppb's each); SE-17 + FE-37 (10 ppb's each) | Test samples notably less salty but more flavorful than control. SE-17 + UE-30 combination was perceived to be the most flavorful compared to other test variables. |
| Alfredo Sauce | Control - 330. Test - 247. | SE-13 + UE-30 (10 ppb's each); SE-17 + UE-30 (10 ppb's each); SE-13 + FE-37 (10 ppb's each); SE-17 + FE-37 (10 ppb's each) | Test samples notably less salty but more flavorful than control. SE-13 + UE-30 combination was perceived to be the most flavorful compared to other test variables. |
| Sausage | Control - 500. Test - 375. | SE-13 + UE-30 (10 ppb's each); SE-17 + UE-30 (10 ppb's each); SE-13 + FE-37 (10 ppb's each); SE-17 + FE-37 (10 ppb's each) | Test samples notably less salty but more flavorful than control. SE-13 + FE-37 was perceived to be the most flavorful. |
| Mixed nuts | Control - 110. Test - 82.5. | SE-13 + UE-30 (10 ppb's each); SE-17 + UE-30 (10 ppb's each); SE-13 + FE-37 (10 ppb's each); SE-17 + FE-37 (10 ppb's each) | Test samples notably less salty but more flavorful than control. SE-13 + UE-30 showed improved flavor. |
| Peanuts | Control - 200. Test - 150. | SE-13 + UE-30 (10 ppb's each); SE-17 + UE-30 (10 ppb's each); SE-13 + FE-37 (10 ppb's each); SE-17 + FE-37 (10 ppb's each) | Test samples equi-salty to the control. SE-17 + UE-30 most preferred sample |
| Soy sauce | Control - 920. Test - 690. | SE-13 + UE-30 (10 ppb's each); SE-17 + UE-30 (10 ppb's each); SE-13 + FE-37 (10 ppb's each); SE-17 + FE-37 (10 ppb's each) | Test samples equi-salty to the control. SE-13 + FE-37 most preferred sample. |
| Ketchup | Control - 160. Test - 120. | SE-13 + UE-30 (10 ppb's each); SE-17 + UE-30 (10 ppb's each) | Test samples notably less salty than control, unbalanced. SE-13 more salty than SE-17. Acid/Sweetness balance altered with addition of SE + UE - acid masked. |

Although the presently disclosed subject matter and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, means, methods, or steps.

Patents, patent applications publications product descriptions, and protocols are cited throughout this application the disclosures of which are incorporated herein by reference in their entireties for all purposes.

What is claimed:

1. A flavor composition comprising a peptide selected from the group consisting of: Phe-Leu/Ile, Leu/Ile-Val-Glu, Phe-Val-Asp, Val-Asp-Leu/Ile-Leu/Ile, Phe-Phe, Val-Phe-Val, Phe-Leu/Ile-Val, Leu/Ile-Leu/Ile-Gly, Phe-Leu/Ile-Gly, Phe-Asp-Val, Phe-Tyr, Leu/Ile-Val, Gln-Val-Leu, Glu-Val-Leu, Leu-Phe-Arg-Val, and combinations thereof; wherein the peptide is an acetate salt, a trifluoroacetate salt, or a formate salt.

2. The flavor composition of claim 1, wherein the flavor composition further comprises a salt selected from the group consisting of sodium chloride, potassium chloride, and combinations thereof.

3. The flavor composition of claim 1, wherein the peptide is prepared from a food product source.

4. The flavor composition of claim 3, wherein the food product source is selected from the group consisting of cacao, wheat, and soy.

5. The flavor composition of claim 1, wherein the peptide is a synthetic peptide.

6. A food product comprising the flavor composition of claim 1, wherein the peptide is present at a concentration of from about 0.0000001 to about 1.0% weight/weight of the food product.

7. A method of increasing a saltiness intensity in a food product comprising admixing the food product with the flavor composition of claim 1, wherein the peptide is present at a concentration of from about 0.0000001 to about 1.0% in the admixture.

8. The method of claim 7, wherein the increase in saltiness intensity comprises an increase in saltiness aftertaste.

9. A method of reducing an amount of sodium chloride in a food product comprising admixing the food product with the flavor composition of claim 1, wherein the peptide is present at a concentration of from about 0.1 to about 1000 ppb in the admixture.

10. The method of claim 9, wherein the amount of sodium chloride in the food system is reduced by at least 10%.

11. A method of increasing an umami intensity in a food product comprising admixing the food product with the flavor composition of claim 1, wherein the peptide is present at a concentration of from about 0.1 to about 1000 ppt in the admixture.

12. The method of claim 11, wherein the increase in umami intensity comprises an increase in umami aftertaste.

13. A method of increasing a bitter intensity in a food product comprising admixing the food product with the flavor composition of claim 1, wherein the peptide is present at a concentration of from about 0.0000001 to about 1.0% in the admixture.

14. A method of increasing an astringent intensity in a food product comprising admixing the food product with the flavor composition of claim 1, wherein the peptide is present at a concentration of from about 0.0000001 to about 1.0% in the admixture.

15. A method of increasing a sourness intensity in a chocolate confection comprising admixing the chocolate confection with the flavor composition of claim 1, wherein the peptide is present at a concentration of from about 0.00001 to about 1.0% w/w in the admixture.

* * * * *